(12) United States Patent
Kuba

(10) Patent No.: US 7,079,328 B2
(45) Date of Patent: Jul. 18, 2006

(54) PATH-BENDING ZOOM OPTICAL SYSTEM

(75) Inventor: Keiichi Kuba, Hachioji (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 10/738,011

(22) Filed: Dec. 18, 2003

(65) Prior Publication Data

US 2004/0130647 A1    Jul. 8, 2004

(30) Foreign Application Priority Data

Dec. 25, 2002  (JP) .............................. 2002-374606

(51) Int. Cl.
*G02B 15/14* (2006.01)
*G02B 17/00* (2006.01)

(52) U.S. Cl. ...................... 359/689; 359/726
(58) Field of Classification Search ................ 359/686, 359/689
See application file for complete search history.

(56) References Cited

U.S. PATENT DOCUMENTS 6,590,716 B1 * 7/2003 Narimatsu ................. 359/679
6,594,087 B1 * 7/2003 Uzawa et al. ............... 359/685

FOREIGN PATENT DOCUMENTS

JP    HEI 9-211287    8/1997
JP    HEI 10-020191   1/1998

* cited by examiner

*Primary Examiner*—Loha Ben
*Assistant Examiner*—Jack Dinh
(74) *Attorney, Agent, or Firm*—Pillsbury Winthrop Shaw Pittman LLP

(57) ABSTRACT

A zoom optical system includes, in order from the object side, a first lens unit with negative refracting power, a second lens unit with positive refracting power, and a lens unit with negative refracting power. When the magnification of the zoom lens is changed in the range from a wide-angle position to a telephoto position, at least, the second lens unit is moved along the optical axis, and the first lens unit includes a path-bending element for bending the optical path. The path-bending element includes at least one reflecting surface for bending the optical path, an entrance surface, and an exit surface, and at least one of the entrance surface and the exit surface is configured as a curved surface rotationally symmetrical with respect to the optical axis. Whereby, a slim design of the optical system can be achieved.

7 Claims, 24 Drawing Sheets

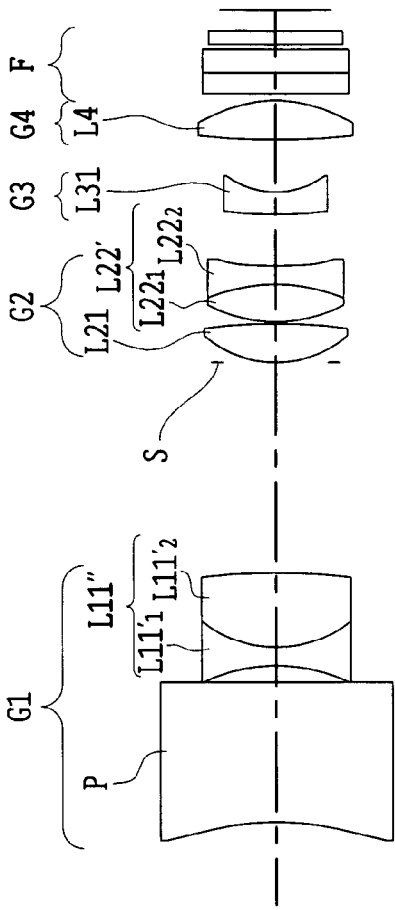
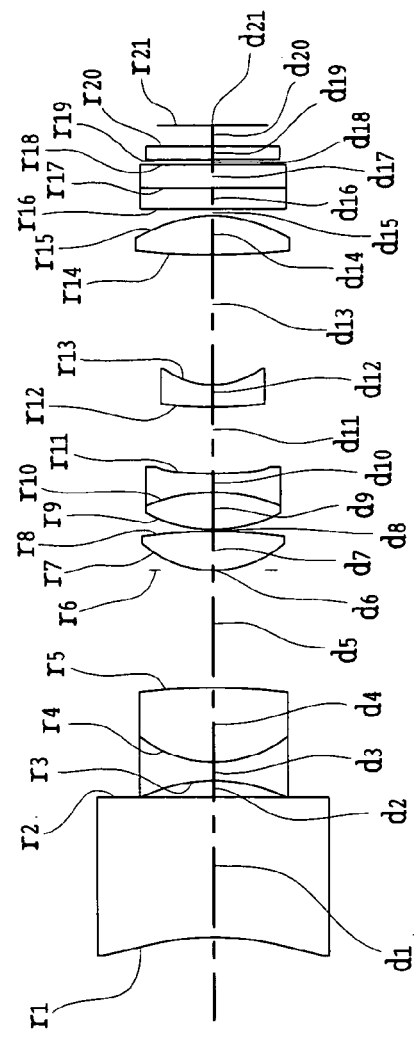
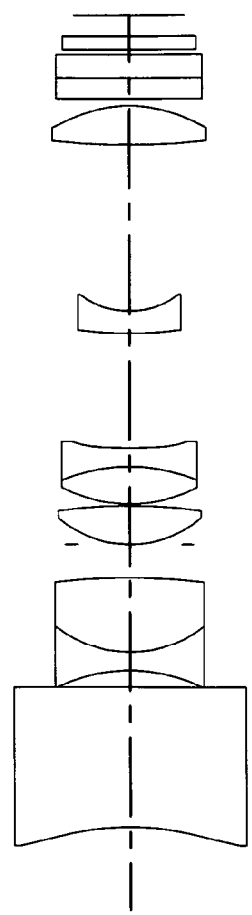
FIG. 8A
FIG. 8B
FIG. 8C

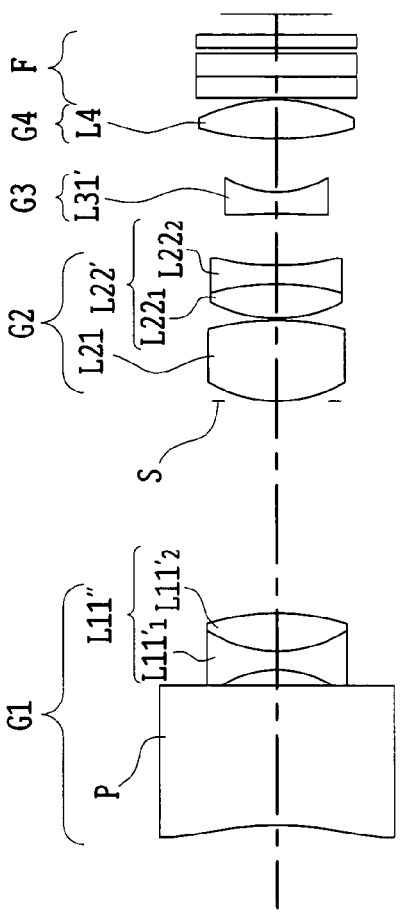
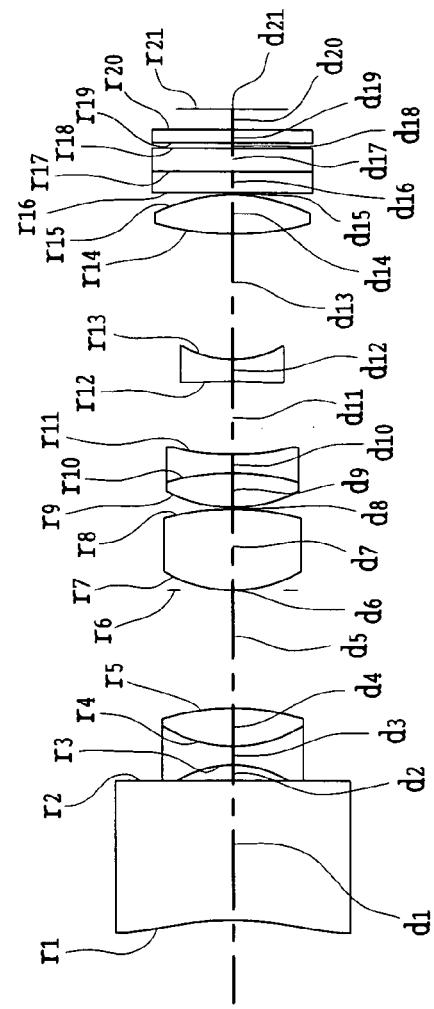
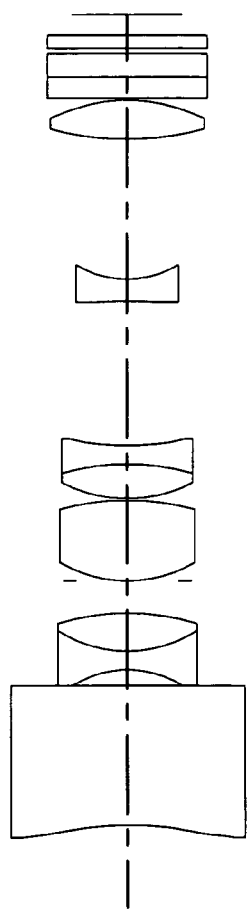
FIG.10A
FIG.10B
FIG.10C

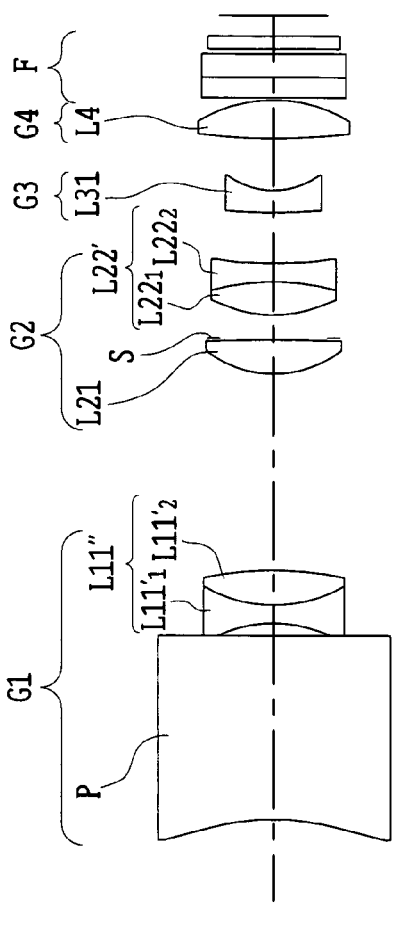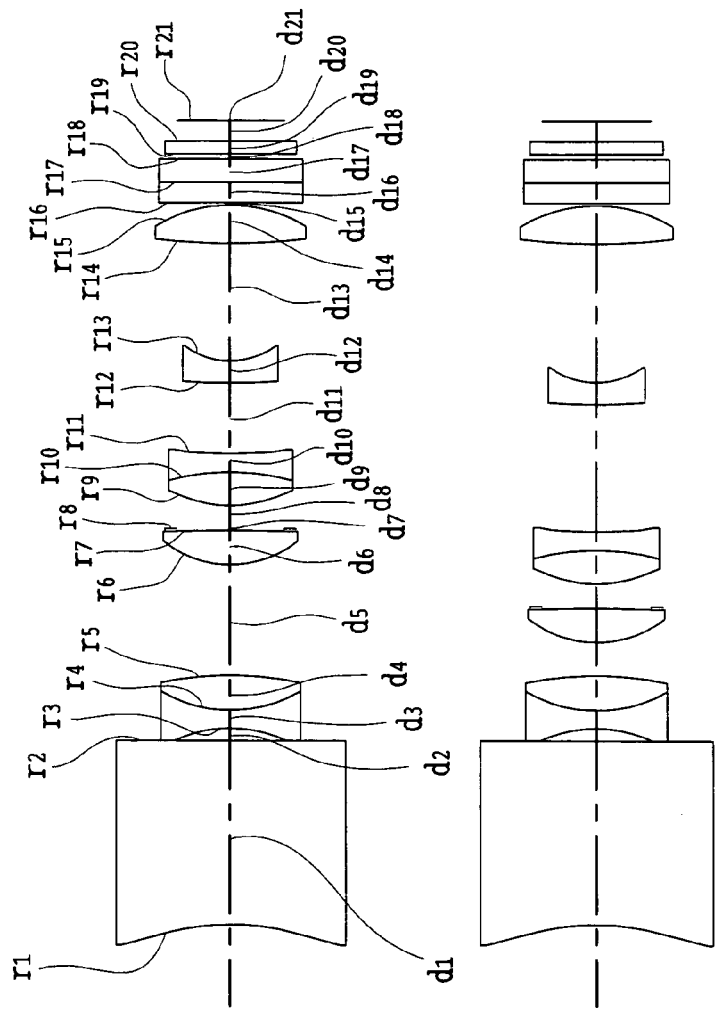
FIG. 18A
FIG. 18B
FIG. 18C

PATH-BENDING ZOOM OPTICAL SYSTEM

BACKGROUND OF THE INVENTION

1. Field of the Invention

This invention relates to a zoom optical system whose optical axis is bent, and in particular, to a path-bending zoom optical system in which a path-bending prism is placed in order to achieve a slim design with respect to the depth of a digital camera or a personal digital assistant, mounting a zoom optical system.

2. Description of Related Art

In imaging optical systems incorporated in compact cameras, personal digital assistants, and mobile phones which use electronic image sensors such as CCDs, the need for compact design, notably slim design, is emphasized. The optical systems of this type are known by prior art publications described below.

Japanese Patent Kokai No. Hei 10-20191 discloses a zoom optical system constructed with four lens units in which a rectangular prism cemented to a plano-convex lens in the third lens unit is interposed between the third lens unit and the fourth lens unit, and thereby the optical path is bent.

Japanese Patent Kokai No. Hei 9-211287 set forth an optical system in which optical power is imparted to a path-bending prism.

SUMMARY OF THE INVENTION

The path-bending zoom optical system according to the present invention comprises, in order from the object side, a first lens unit with negative refracting power, a second lens unit with positive refracting power, and at least one lens unit with negative refracting power. When the magnification of the optical system is changed in the range from a wide-angle position to a telephoto position, at least one lens unit including the second lens unit is moved along the optical axis. In this case, the first lens unit includes a path-bending element for bending the optical path.

Further, the path-bending zoom optical system according to the present invention comprises, in order from the object side, a first lens unit with negative refracting power, a second lens unit with positive refracting power, and at least one lens unit with negative refracting power. When the magnification of the optical system is changed in the range from a wide-angle position to a telephoto position, at least one lens unit including the second lens unit is moved along the optical axis. In this case, the first lens unit has a path-bending prism which includes at least one reflecting surface for bending the optical path, an entrance surface, and an exit surface, and at least one of the entrance surface and the exit surface of the path-bending prism is configured as a curved surface rotationally symmetrical with respect to the optical axis.

Still further, the path-bending zoom optical system according to the present invention, comprises, in order from the object side, a first lens unit with negative refracting power, a second lens unit with positive refracting power, a third lens unit with negative refracting power, and a fourth lens unit with positive refracting power. When the magnification of the optical system is changed in the range from a wide-angle position to a telephoto position, at least one lens unit including the second lens unit is moved along the optical axis. In this case, the first lens unit has a path-bending prism which includes at least one reflecting surface for bending the optical path, an entrance surface, and an exit surface, and the path-bending prism is a prism with negative refracting power in which at least one of the entrance surface and the exit surface is configured as a curved surface rotationally symmetrical with respect to the optical axis.

According to the present invention, the path-bending optical system which is a slim-design zoom optical system which can be mounted in a compact digital still camera or a personal digital assistant and in which the optical axis is bent to achieve the slim design and power is imparted to the path-bending prism can be realized.

The features and advantages of the present invention will become apparent from the following detailed description of the preferred embodiments when taken in conjunction with the accompanying drawings.

BRIEF DESCRIPTION OF THE DRAWINGS

FIGS. 8A, 8B, and 8C are sectional views showing optical arrangements, developed along the optical axis, at wide-angle, middle, and telephoto positions, respectively, in focusing of the infinite object point, of a seventh embodiment of the path-bending zoom optical system according to the present invention;

FIGS. 10A, 10B, and 10C are sectional views showing optical arrangements, developed along the optical axis, at wide-angle, middle, and telephoto positions, respectively, in focusing of the infinite object point, of a ninth embodiment of the path-bending zoom optical system according to the present invention;

FIGS. 18A, 18B, and 18C are sectional views showing optical arrangements, developed along the optical axis, at wide-angle, middle, and telephoto positions, respectively, in focusing of the infinite object point, of a seventeenth embodiment of the path-bending zoom optical system according to the present invention;

DETAILED DESCRIPTION OF THE PREFERRED EMBODIMENTS

Before undertaking the description of the embodiments, the function and effect of the present invention will be explained with reference to FIGS. 1A–1C.

Figure 1A:
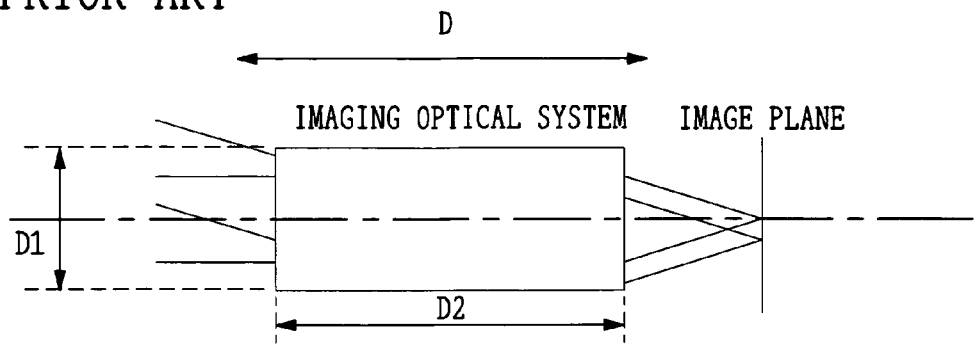
FIGS. 1A, 1B, and 1C are conceptual views for explaining the function and effect of the present invention, showing a conventional imaging optical system in which the optical path is constructed in a straight line, a path-bending optical system using a path-bending element according to the present invention, and a path-bending optical system using a path-bending prism according to the present invention, respectively.

As shown in FIG. 1A, when the optical path from the most object-side lens of an imaging optical system to an image plane is constructed in a straight line, the depth of an imaging device (corresponding to symbol D in FIG. 20) becomes longer than an overall length D2 of the imaging optical system. Here, symbol D1 represents the effective diameter of the imaging optical system.

Figure 1B:
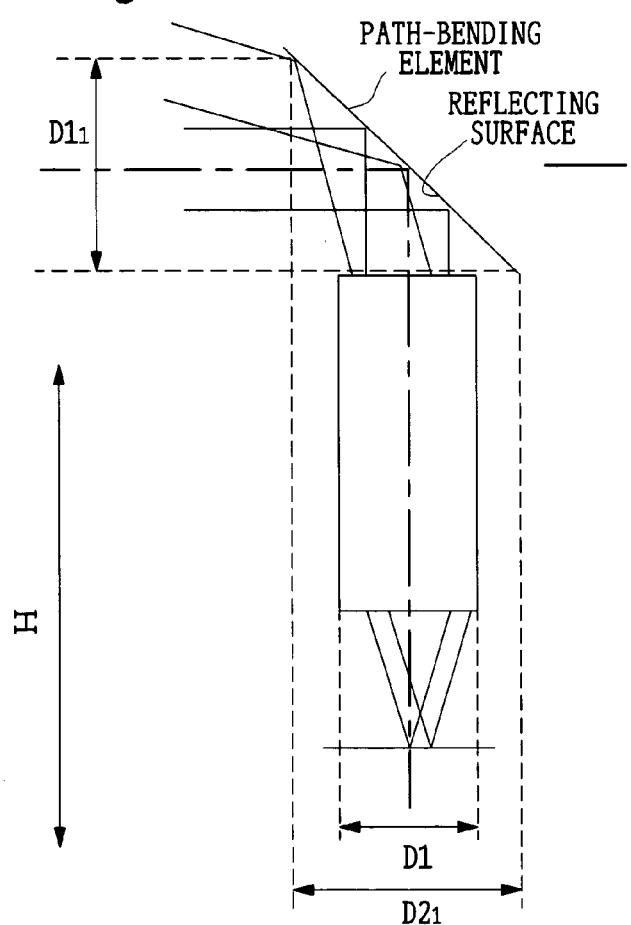

In contrast to this, as shown in FIG. 1B, when a path-bending element for bending the optical path is used in the present invention to bend the optical path of the imaging optical system, the length of the imaging optical system extending along the depth of the imaging device, which formerly has been D2, can be reduced to $D2_1$. In the depth, there is no need to ensure a distance from the imaging optical system to the image plane. As a result, in contrast with the case of FIG. 1A, a thickness D extending along the depth of the entire imaging device can be extremely decreased although an effective diameter $D1_1$, on the object side is somewhat increased.

Also, it is rather desirable that the optical path is bent on the object side as far as possible. This is because the dimension of the depth (thickness) of the optical system and the effective diameter on the object side can be made smaller. Thus, it is favorable that the first lens unit (the most object-side lens unit) is designed to include the path-bending element.

When the first lens unit is also designed to have the negative refracting power, the lens diameter of the first lens unit can be reduced. When the imaging optical system is constructed so that the optical path is bent, the effective diameter of the imaging optical system after the optical path is bent can be reduced, and thus the slim design of the imaging device can be attained.

When the negative refracting power is imparted to the first lens unit and the entire imaging optical system is constructed as a retrofocus type, the back focal distance can be sufficiently increased even at the wide-angle position where the focal length is shortest, and image side telecentricity is easily ensured.

Behind the second lens unit with positive refractive power (namely, on the image side of the second lens unit), at least one lens unit with negative refracting power is placed.

Whereby, the second lens unit with positive refracting power and this lens unit with negative refracting power constitute a positive-negative telephoto optical system. Consequently, the position of the front principal point of a synthesized optical system extending from the second lens unit to the lens unit with negative refracting power can be shifted toward the first lens unit. The distance between the principal points of the first lens unit and the synthesized optical system can thus be reduced, and the focal length of the synthesized optical system can also be reduced. As a result, the overall lens length can be diminished.

This means that when the optical path, as shown in FIG. 1B, is bent by the path-bending element, the vertical dimension of the imaging device can be minimized. Moreover, since the magnification of the second lens unit can be increased, the amount of movement of the second lens unit required for the magnification change of the optical system can be reduced.

As mentioned above, if the optical path from the object-side lens of the imaging optical system to the image plane is constructed in a straight line, the length corresponding to the depth of the imaging device becomes greater than the overall length of the imaging optical system.

Figure 1C:
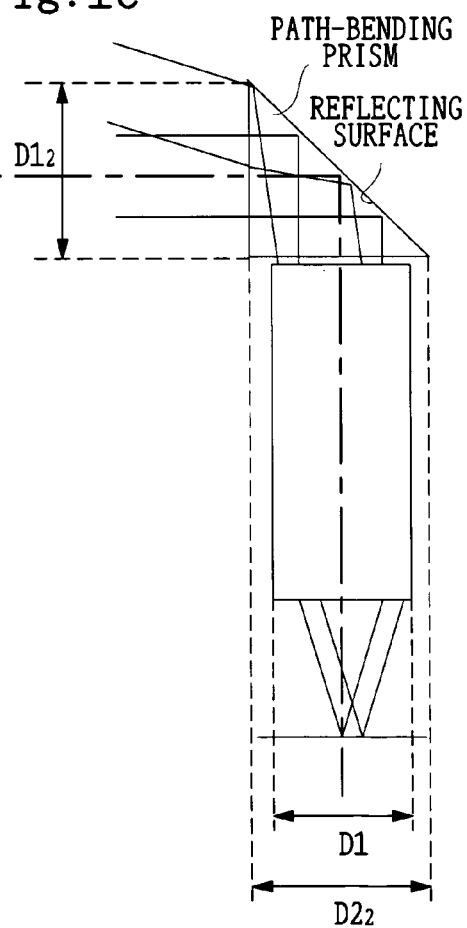

In contrast to this, as shown in FIG. 1C, when the optical path of the imaging optical system is bent by a reflecting surface for bending the optical path, the length of the imaging optical system extending along the depth of the imaging device, which formerly has been D2, can be reduced to $D2_2$. In the depth, there is no need to ensure a distance from the imaging optical system to the image plane. As a result, in contrast with the case of FIG. 1A, the thickness extending along the depth of the entire imaging device can be extremely decreased although an effective diameter $D1_2$ on the object side is somewhat increased.

When the reflecting surface for bending the optical path, as shown in FIG. 1C, is constructed as the reflecting surface of a prism, an equivalent-air medium length is increased in terms of the same optical path length because light passes through a medium with a refractive index higher than 1. Consequently, the length of the imaging optical system extending along a height H of the imaging device can be reduced, compared with the case of FIG. 1B. The effective diameter $D2_2$ on the object side can be made smaller.

In this case, it is desirable that the path-bending prism is constructed so that at least one of its entrance surface and exit surface has refracting power. By doing so, the length of the imaging optical system extending along the height of the imaging device and the effective diameter $D2_2$ on the object side can be made smaller. In addition to increasing the effect of such a compact design, it is possible to improve the performance of the optical system and to lessen the number of lenses.

Also, as mentioned above, it is rather desirable that the optical path is bent on the object side as far as possible. This is because the dimension of the depth of the optical system and the effective diameter on the object side can be made smaller. Thus, it is favorable that the first lens unit (the most object-side lens unit) is designed to include the path-bending element.

When the first lens unit is also designed to have the negative refracting power, the lens diameter of the first lens unit can be reduced. When the imaging optical system is constructed so that the optical path is bent, the diameter of the imaging optical system after the optical path is bent can be reduced, and thus the slim design of the imaging device can be attained. When the negative refracting power is imparted to the first lens unit and the entire imaging optical system is constructed as a retrofocus type, the back focal distance can be sufficiently increased even at the wide-angle position where the focal length is shortest, and image side telecentricity is easily ensured.

As in the above case, when the second lens unit with positive refracting power and at least one lens unit with negative refracting power constitute the positive-negative telephoto optical system, the position of the front principal point of the synthesized optical system extending from the second lens unit to the lens unit with negative refracting power can be shifted toward the first lens unit. The distance between the principal points of the first lens unit and the synthesized optical system can thus be reduced, and the focal length of the synthesized optical system can also be reduced. As a result, the overall lens length can be diminished.

This means that when the optical path, as shown in FIG. 1C, is bent by the path-bending prism, the vertical dimension of the imaging device can be minimized.

Moreover, since the magnification of the second lens unit can be increased, the amount of movement of the second lens unit required when the magnification of the system is changed can be reduced.

As mentioned above, if the optical path from the object-side lens of the imaging optical system to the image plane is constructed in a straight line, the degree of an increase in the thickness of the imaging device becomes larger than in the case of the overall length of the imaging optical system.

In contrast to this, when the prism is provided as mentioned above, the length of the imaging optical system extending along the depth of the imaging device, which formerly has been D2, can be reduced to $D2_2$. In the depth, there is no need to ensure a distance from the imaging optical system to the image plane. As a result, in contrast with the case of FIG. 1A, the thickness extending along the depth of the entire imaging device can be extremely decreased although an effective diameter $D1_2$ on the object side is somewhat increased.

Since light passes through a medium with a refractive index higher than 1, the equivalent-air medium length is increased in terms of the same optical path length. Consequently, the length of the imaging optical system extending along the height H of the imaging device can be reduced, compared with the case of FIG. 1B. The effective diameter $D2_2$ on the object side can be made smaller.

In this case, it is desirable that the path-bending prism is constructed so that at least one of its entrance surface and exit surface has the refracting power. By doing so, the length of the imaging optical system extending along the height of the imaging device and the effective diameter $D2_2$ on the object side can be made smaller. In addition to increasing the effect of such a compact design, it is possible to improve the performance of the optical system and to lessen the number of lenses.

Also, as mentioned above, it is rather desirable that the optical path is bent on the object side as far as possible. This is because the dimension of the depth of the optical system and the effective diameter on the object side can be made smaller. Thus, it is favorable that the first lens unit (the most object-side lens unit) is designed to include the path-bending element.

When the first lens unit is designed to have the negative refracting power, a ray height produced behind the second lens unit can be lowered, and hence the lens diameter can be reduced. As a result, when the optical path of the imaging optical system is bent, the slim design of the imaging device can be attained. Moreover, the back focal distance can be sufficiently increased even at the wide-angle position where the focal length is shortest.

When the path-bending prism is designed to have the negative refracting power, the ray height of the path-bending prism can be lowered. Whereby, the effective diameter of the optical system is minimized and the slim design of the imaging device can be attained. Since the path-bending prism is capable of sharing the negative refracting power of the first lens unit, the number of lenses of the first lens unit can be reduced and compactness of the optical system is accomplished.

In order to reduce the overall lens length, it is necessary to diminish a synthesized focal length of the second and third lens units. On the other hand, in order to ensure the range of movement of the second and third lens units required when the magnification is changed, it is necessary to increase to some degree the spacing between the first and second lens units. As a result, it becomes difficult to make a reduction in the overall lens length (in the synthesized focal length of the second and third lens units) compatible with the maintenance of the spacing for zooming.

When the arrangement of four lens units with negative, positive, positive, and positive powers is actually designed, it is difficult to reduce the synthesized focal length of the second and third lens units. The second lens unit is considerably moved toward the first lens unit at the telephoto position. In addition, the amount of movement of a lens unit (for example, the third lens unit) for correcting a shift of the position of the image plane caused when the magnification is changed becomes large, with the result that it is difficult to reduce the length of the entire lens system.

In contrast to this, when the third lens unit is designed to have the negative refracting power, the second lens unit with positive refracting power and the third lens unit with negative refracting power constitute the positive-negative telephoto optical system. As a result, the position of the front principal point of the synthesized optical system of the second and third lens units is shifted toward the first lens unit. The distance between the principal points of the first lens unit and the synthesized optical system of the second and third lens units can thus be reduced. Whereby, the magnification of the second lens unit can be increased, and therefore the amount of movement of the second lens unit required when the magnification of the system is changed can be reduced. As described above, when the optical system is constructed to have negative, positive, and negative refracting powers, a reduction in the synthesized focal length of the second and third lens units is compatible with a reduction in the spacing for the magnification change, and the overall lens length can be diminished.

In this case, as shown in FIG. 1C, when the optical path is bent by the path-bending prism, the vertical dimension of the imaging device can be diminished.

When the optical system is constructed to move the second lens unit and the third lens unit along the optical axis, the magnification is changed and at the same time, correction for a shift of the position of the image plane caused by this magnification change can be performed. In the magnification change, other lens units than the second and third lens units may remain fixed so that the magnification is changed or focusing is performed by only moving the second and third lens units.

In the use of an image sensor such as a CCD, oblique incidence of off-axis light (an off-axis chief ray) on the CCD causes the shortage of the amount of light. Thus, it is necessary to space the exit pupil of the optical system away from the image plane (ideally, to construct a telecentric system on the CCD side). According to the present invention, the exit pupil can be spaced away from the image plane by the fourth lens unit with positive refracting power.

The path-bending zoom optical system of the present invention is preferably constructed as described below.

In the path-bending zoom optical system according to the present invention, it is desirable that the lens units located on the image side of the path-bending prism or lenses of the lens units located on the image side of the path-bending prism are moved along the optical axis and thereby the magnification is changed or focusing is performed.

If the optical system includes a lens located on the object side of the path-bending prism to change the magnification or perform focusing, space for moving this lens must be ensured on the object side before the optical path is bent. As such, the thickness of the imaging device is increased. If the magnification is changed or focusing is performed by both the lens unit located on the object side of the path-bending prism and the lens unit on the image side, a mechanical structure for moving the lens units will be complicated and the imaging device becomes oversized. According to the present invention, by contrast, such problems are not caused.

In the path-bending zoom optical system of the present invention, it is desirable that the magnification is changed by the second lens unit with positive refracting power and the lens unit with negative refracting power, located behind the second lens unit. Also, at least one lens unit with negative refracting power, located behind the second lens unit, is hereinafter referred to as a "rear lens unit".

Where the magnification is changed in the range from the wide-angle position to the telephoto position, the optical system is constructed to move the second lens unit and the rear lens unit along the optical axis so that the spacing between the first lens unit and the second lens unit is reduced and the spacing between the second lens unit and the rear lens unit is increased. By doing so, the focal length can be increased.

On the other hand, if the third lens unit is constructed to have the positive refracting power, the second lens unit and the third lens unit must be moved toward the first lens unit at the telephoto position, and thus the range of movement of the second and third lens units is widened. In addition, it is difficult to increase the focal length. However, when the optical system is designed so that the magnification is changed by the second lens unit with positive refracting power and the lens unit with negative refracting power, located behind the second lens unit, the spacing between the second lens unit and the rear lens unit is increased, and hence the range of movement of the rear lens unit is narrowed.

From the above description, it is desirable to distribute negative, positive, negative, and positive refracting powers to the lens units. In the case of the arrangement of four lens units with negative, positive, negative, and positive refracting powers, it is only necessary to construct the optical system so that the magnification is changed by the second lens unit with positive refracting power and the third lens unit with negative refracting power.

In the path-bending zoom optical system of the present invention, it is desirable that focusing is performed by the lens unit with negative refracting power, located behind the second lens unit (namely, the rear lens unit).

When the position of the object point approaches a near point from infinity, there is the need to move the second lens unit with positive refracting power along the optical axis in order to perform focusing by the second lens unit with positive refracting power.

This is the same as in the case where the second lens unit is moved along the optical axis when the magnification is changed in the range from the wide-angle position to the telephoto position. Consequently, the range of movement of the second lens unit is widened, and it becomes difficult to reduce the overall lens length. Moreover, the load of an actuator moving the lens units is increased. The maintenance of the spacing between the first lens unit and the second lens unit will be thought of as the condition of design restriction.

In contrast to this, when focusing is performed by the rear lens unit, it is only necessary to move the rear lens unit toward the image plane along the optical axis. Thus, the range of movement of the rear lens unit is not widened. As a result, the maintenance of the spacing between the first lens unit and the second lens unit is not thought of as the condition of design restriction, and the mechanical structure for moving the lens units is simplified.

By comparison with the case where the lens units with negative, positive, positive, and positive refracting powers are arranged and focusing is performed by the third lens unit with positive refracting power, the above optical system has the following advantages. When the lens units have negative, positive, negative, and positive refracting powers as in the present invention and focusing is performed by the third lens unit with negative refracting power, the distance between the principal points of the first lens unit and the synthesized optical system of the second and third lens units is reduced. Since the focal length of the synthesized optical system of the second and third lens units is reduced, the third lens unit requires a narrower range of movement in focusing. As a result, the maintenance of the range of lens movement is not thought of as the condition of design restriction, and the mechanical structure for moving the lens units is simplified.

In this case, when the rear lens unit is constructed with a single negative lens, the weight of the system is lessened. When the rear lens unit is light in weight, the load of the actuator in focusing is decreased. In addition, time required for focusing is reduced.

When the magnification is changed by the second lens unit and the rear lens unit, focusing is performed by the lens units moved along the optical axis in the magnification change. As such, the mechanical structure for moving the lens units is simplified, which is favorable.

In the path-bending zoom optical system of the present invention, it is desirable that when the magnification is changed in the range from the wide-angle position to the telephoto position, the first lens unit is fixed.

In the case where the first lens unit is moved toward the image side along the optical axis when the magnification is changed in the range from the wide-angle position to the telephoto position, the first lens unit requires a larger effective lens diameter at the wide-angle position. In contrast to this, when the first lens unit is fixed in the magnification change, the effective lens diameter can be reduced at the wide-angle position.

Also, when the first lens unit includes the path-bending prism which is large in volume (heavy in weight), the movement of the whole of the first lens unit along the optical axis in the magnification change imposes a load on the mechanical structure. It is thus desirable that the path-bending prism remains fixed in the magnification change.

In the arrangement that the path-bending prism is fixed in the magnification change, if lenses other than the path-bending prism (however, lenses located ahead of the path-bending prism) in the first lens unit are moved along the optical axis, the thickness of the imaging device will be increased. If the magnification is changed or focusing is performed by both the lens unit located on the object side of the path-bending prism and the lens unit on the image side, the mechanical structure for moving the lens units will be complicated and the imaging device becomes oversized.

Thus, when only the lens units located on the image side of the path-bending prism are moved along the optical axis, the above problems can be obviated.

In the path-bending zoom optical system of the present invention, it is desirable that the first lens unit includes the positive refracting power and the negative refracting power.

The most object-side lens unit or the most image-side lens unit is of considerable ray height of an off-axis ray, and thus chromatic aberration of magnification and off-axis aberration can effectively corrected. Where the image side telecentric system is constructed, the position of a light beam passing through the most image-side lens unit is not seriously shifted in the magnification change, while the position of a light beam passing through the most object-side lens unit is remarkably shifted in the magnification change. Consequently, chromatic aberration of magnification produced in the most object-side lens unit fluctuates heavily when the magnification is changed. Thus, as in the present invention, the optical system is constructed so that the first lens unit located at the most object-side position includes the positive refracting power and the negative refracting power to suppress off-axis aberration, chromatic aberration, or the fluctuation of chromatic aberration caused by the magnification change. Whereby, off-axis aberration, chromatic aberration, or the fluctuation of chromatic aberration caused by the magnification change in the entire optical system can be suppressed.

In the path-bending zoom optical system of the present invention, it is desirable that the first lens unit is constructed to include a cemented lens of a lens with positive refracting power and a lens with negative refracting power.

The first lens unit includes the cemented lens in addition to the path-bending prism and thereby aberrations including chromatic aberration can be favorably corrected. The cemented lens renders errors of decentration and spacing hard to occur and the mechanical structure simple.

In this case, when the lenses with negative and positive refracting powers constituting the cemented lens are cemented in this order from the object side, the ray height produced behind the second lens unit can be rendered lower. When the negative lens in the cemented lens is configured as a biconcave lens, the negative refracting power of the first lens unit can be strengthened and therefore the effective diameter of any lens unit located behind the second lens unit can be rendered smaller.

In the case where the path-bending prism included in the first lens unit has the negative refracting power, it is favorable for correction for aberration that the cemented lens is configured as a meniscus lens with a concave surface directed toward the object side as a whole. In this case, the position of the principal point is shifted to the image side. By such a configuration, the distance between the principal points of the first and second lens units, followed by the entire lens length, can be reduced.

In the path-bending zoom optical system of the present invention, it is desirable that the first lens unit is constructed to have at least one aspherical surface.

The first lens unit located at the most object-side position is of considerable ray height, and thus when at least one aspherical surface is included in the first lens unit, off-axis aberrations, such as distortion, astigmatism, and coma, can be effectively corrected. In this case, when the most object-side surface of the first lens unit is configured to be aspherical, a better effect is brought about.

In the path-bending zoom optical system of the present invention, it is desirable that at least one of the entrance surface and the exit surface of the path-bending prism is aspherical.

The path-bending prism included in the first lens unit is of considerable ray height. Thus, when at least one of the entrance surface and the exit surface of the path-bending prism is constructed to be aspherical, off-axis aberrations, such as distortion, coma, and, astigmatism can be effectively corrected. When the path-bending prism is fabricated by molding, there is little if any difference of difficulty or ease of fabrication in cases where the path-bending prism has a spherical function and it has an aspherical function. Hence, it is only necessary to fabricate the path-bending prism which has the aspherical function.

It is desirable that the path-bending prism, as mentioned above, is located on the object side of any moving lens unit in the magnification change or focusing. It is more desirable that it is located at the most object-side position. When at least one of the entrance surface and the exit surface of the path-bending prism is configured to be aspherical, a greater effect is obtained because the path-bending prism is of considerable ray height.

In this case, it is more favorable for correction for aberration that the aspherical surface of the path-bending prism is designed to have the function that its refracting power becomes weaker than paraxial refracting power progressively in going from the optical axis to the peripery. Moreover, it is more favorable for correction for aberration that the spherical surface of the path-bending prism is constructed so that its profile has an inflection point and optical functions at the center of the effective diameter and in the periphery of the effective diameter are reversed, for example, the center of the effective diameter has a negative function and the periphery of the effective diameter has a positive function.

In the path-bending zoom optical system of the present invention, it is desirable to satisfy the following condition:

$$-5 < f1/\sqrt{(fW \times fT)} < -0.2 \quad (1)$$

where f1 is the focal length of the first lens unit, fW is the focal length of the entire system in focusing of an infinite object point at the wide-angle position, and fT is the focal length of the entire system in focusing of the infinite object point at the telephoto position. (Also, when the first lens unit has movable lenses (lens components), $f1=\sqrt{(f1W \times f1T)}$, where f1W is the focal length of the first lens unit at the wide-angle position and f1T is the focal length of the first lens unit at the telephoto position).

If the upper limit of Condition (1) is exceeded, the negative refracting power of the first lens unit will be extremely strengthened and distortion, notably negative distortion at the wide-angle position, will be increased. Below the lower limit of Condition (1), the negative refracting power of the first lens unit becomes too weak, and thus the effective diameter must be increased.

In order to achieve a smaller design while holding better optical performance, it is rather desirable to satisfy the following condition:

$$-2.5 < f1/\sqrt{(fW \times fT)} < -0.5 \quad (1\text{-}1)$$

In order to achieve a further smaller design while holding better optical performance, it is more desirable to satisfy the following condition:

$$-1.3 < f1/\sqrt{(fW \times fT)} < -0.7 \quad (1\text{-}2)$$

In the path-bending zoom optical system of the present invention, it is desirable to satisfy the following condition:

$$1.2 < fp/f1 < 7 \quad (2)$$

where fp is the focal length of the path-bending prism.

Beyond the upper limit of Condition (2), the negative refracting power of the path-bending prism is extremely weakened and the path-bending prism is made oversized. Below the lower limit of Condition (2), the negative refracting power of the path-bending prism is extremely strengthened, and therefore it becomes difficult to correct chromatic aberration, coma, or astigmatism, produced in the first lens unit.

In order to achieve a smaller design while holding better optical performance, it is rather desirable to satisfy the following condition:

$$1.5 < fp/f1 < 5 \quad (2\text{-}1)$$

In order to achieve a further smaller design while holding better optical performance, it is more desirable to satisfy the following condition:

$$1.8 < fp/f1 < 3.7 \quad (2\text{-}2)$$

In the path-bending zoom optical system of the present invention, it is desirable that the second lens unit includes at least two lenses with positive refracting powers and a single lens with negative refracting power.

The second lens unit needs to have the function that converges light diverged by the first lens unit with negative refracting power. Thus, it is favorable that the second lens unit is constructed so that the object-side lens has the positive refracting power. In order to ensure good performance and reduce the focal length of the second lens unit, it is necessary that the second lens unit includes at least two lenses with positive refracting powers.

When the second lens unit is constructed to have, in order from the object side, the positive refracting power and the negative refracting power, the focal length of the second lens unit can be reduced. Furthermore, the position of the principal point is shifted toward the first lens unit and hence the distance between the principal points of the first and second lens units can be reduced. Consequently, since the overall lens length is reduced and the magnification of the second lens unit can be increased, the amount of movement of the second lens unit required for the magnification change can be decreased.

The second lens unit is moved along the optical axis when the magnification is changed in the range from the wide-angle position to the telephoto position. When the second lens unit is thus constructed to include at least one lens with negative refracting power, fluctuations in aberrations including chromatic aberration, caused by the magnification changed can be suppressed.

In this case, when the second lens unit includes a lens with positive refracting power and a cemented lens of a lens with positive refracting power and a lens with negative refracting power, the above effect is secured with a small number of lenses, and the cemented lens renders errors of decentration and spacing hard to occur and the mechanical structure simple, which is favorable.

In this case, when the cemented lens is constructed to include, in order from the object side, a biconvex lens and a biconcave lens and to assume a meniscus shape with a concave surface directed toward the image side as a whole, the position the principal point is shifted toward the first lens unit and the distance between the principal points of the first and second lens units can be reduced. Consequently, the overall lens length is reduced. In addition, the magnification of the second lens unit can be increased, and thus the amount of movement of the second lens unit required for the magnification change can be decreased. Since the negative refracting power can be strengthened, chromatic aberration produced in the second lens unit can be favorably corrected, and the fluctuation of chromatic aberration caused by the magnification change can be suppressed.

In the path-bending zoom optical system, it is desirable that the last surface of the second lens unit is configured as a concave surface directed toward the image side.

By doing so, the position of the principal point of the second lens unit is shifted toward the first lens unit and the distance between the principal points of the first and second lens units can be reduced. As a result, since the overall lens length is reduced and the magnification of the second lens unit can be increased, the amount of movement of the second lens unit required for the magnification change can be decreased.

In the path-bending zoom optical system of the present invention, it is desirable to satisfy the following condition:

$$0.2 < M3/M2 < 2.0 \qquad (3)$$

where m2 is the range of movement of the second lens unit with positive refracting power and m3 is the range of movement of at least one lens unit with negative refracting power, located behind the second lens unit.

When the magnification is changed in the range from the wide-angle position to the telephoto position, the spacing between the second lens unit with positive refracting power and the rear lens unit is gradually increased. In this case, the spacing is slightly changed in the proximity of the wide-angle position and is considerably changed in the proximity of the telephoto position. As a result, coma and astigmatism, which cannot be completely corrected by the second lens unit, are corrected by the second lens unit and the third lens unit in a pair, notably in the proximity of the wide-angle position.

Beyond the upper limit of Condition (3), the range of movement of the rear lens unit becomes wide. Consequently, the function of correction for aberration is impaired and it becomes difficult to ensure performance. Moreover, since the amount of movement of the second lens unit is small, zooming for the magnification change becomes difficult. Below the lower limit of Condition (3), the range of movement of the second lens unit is extremely increased, and thus it is difficult to ensure the air spacing between the first lens unit and the second lens unit at the telephoto position. As a result, the overall length of the optical system must be increased.

In order to achieve a smaller design while holding optical performance, it is rather desirable to satisfy the following condition:

$$0.3 < M3/M2 < 1.5 \qquad (3\text{-}1)$$

In order to achieve a further smaller design while holding optical performance, it is more desirable to satisfy the following condition:

$$0.4 < M3/M2 < 0.9 \qquad (3\text{-}2)$$

In the path-bending zoom optical system of the present invention, it is desirable that the second lens unit includes at least one spherical surface.

Since a beam diameter is spread by the first lens unit with negative refracting power, the beam diameter of the second lens unit is larger. As such, when at least one aspherical surface is included in the second lens unit, a considerable effect of correction for aberration is brought about.

In this case, when the most object-side surface of the second lens unit or a surface opposite to an aperture stop is configured as an aspherical surface, spherical aberration can be effectively corrected, which is favorable. When this aspherical surface has an aspherical function such that the paraxial refracting power weakens progressively in going from the optical axis to the peripery, positive spherical aberration produced in the second lens unit can be suppressed, which is desirable.

When the most image-side surface of the lens with negative refracting power in the second lens unit is configured to be aspherical, off-axis aberrations, such as astigmatism and coma, can be effectively corrected, which is desirable.

If the last surface of the second lens unit is the concave surface of the negative lens directed toward the image side, high-order aberration will be liable to be produced. Hence, this surface is configured as an aspherical surface, and thereby the production of high-order aberration can be suppressed. In this case, it is desirable that this aspherical surface has a function such that the paraxial refracting power strengthens progressively in going from the optical axis to the peripery.

It is further desirable that both the most object-side surface of the second lens unit and the image-side surface of the lens with negative refracting power in the second lens unit are aspherical.

By configuring both surfaces to be aspherical, the ability to correct aberrations is highly increased. Therefore, the fluctuation, caused by zooming, of spherical aberration produced in the second lens unit and astigmatism produced in the second lens unit can be corrected. In this case, the lens with positive refracting power and the lens with negative refracting power assume a state close to cementation. Even though these lenses are cemented, the degradation of performance is kept to a minimum, which is favorable. The amount of movement of the second and third lens units required for the magnification change is further decreased, which is favorable. It is desirable that the aspherical surface which is the image-side surface of the lens with negative refracting power in the second lens unit has an effect that all aberrations (spherical aberration, coma, astigmatism, and distortion) produced by the spherical effect of the most object-side surface of the second lens unit are canceled. Thus, when both surfaces are configured to be aspherical as mentioned above, the production of all aberrations in the second lens unit can be effectively suppressed.

In the path-bending zoom optical system of the present invention, it is desirable to include, in order from the object side, the first lens unit with negative refracting power, the second lens unit with positive refracting power, the third lens unit with negative refracting power, and the fourth lens unit with positive refracting power and to satisfy the following condition:

$$0.3 < f2/f4 < 3 \qquad (4)$$

where f2 is the focal length of the second lens unit and f4 is the focal length of the fourth lens unit. Here, the fourth lens unit is located closest to the image plane. As such, it can be said that f4 is the focal length of the lens unit located closest to the image plane.

In the present invention, a light beam diverged by the first lens unit with negative refracting power is converged by a triplet of the second, third, and fourth lens units with positive, negative, and positive refracting powers.

Beyond the upper limit of Condition (4), the positive refracting power on the image side of the triplet is weakened. Thus, the second lens unit must be considerably moved toward the first lens unit at the telephoto position, and it becomes difficult to ensure the air spacing between the first lens unit and the second lens unit. Moreover, the positive refracting power of the fourth lens unit is extremely strengthened and hence negative distortion is considerably produced.

Below the lower limit of Condition (4), the positive refracting power of the fourth lens unit is extremely weakened and thus it becomes difficult to ensure the back focal distance at the wide-angle position. In addition, the amount of correction for coma is insufficient.

In order to achieve high-magnification zooming with complete imaging performance and back focal distance, it is desirable to satisfy the following condition:

$$0.5 < f2/f4 < 2 \qquad (4\text{-}1)$$

In order to achieve high-magnification zooming with more complete imaging performance and back focal distance, it is desirable to satisfy the following condition:

$$0.7 < f2/f4 < 1.1 \qquad (4\text{-}2)$$

In the path-bending zoom optical system of the present invention, it is desirable that the last surface of the rear lens unit is a concave surface directed toward the image side.

In the rear lens unit, aberration is produced so that aberration produced in the second lens unit with positive refracting power is canceled. For example, outer coma is liable to be produced in the second lens unit at the wide-angle position, and thus when inner coma is produced by configuring the last surface of the rear lens unit as the concave surface directed toward the image side, aberration of the entire lens system can be favorably corrected.

In the path-bending zoom optical system of the present invention, it is desirable that when the magnification is changed in the range from the wide-angle position to the telephoto position and focusing is performed, the most image-side lens unit remains fixed.

By fixing the most image-side lens unit in the magnification change, the fluctuation of aberration and the shift of the pupil position, caused by the magnification change, can be suppressed.

In the path-bending zoom optical system of the present invention, it is desirable that the most image-side lens unit is construced with a single positive lens.

In order to reduce the overall lens length, it is only necessary that the fourth lens unit is designed to chiefly control the pupil position, and there is no need to construct the fourth lens unit with too many lenses. When the fourth lens unit is constructed with a single positive lens, the effect that the pupil position is controlled with a small number of lenses is obtained. In this case, the positive lens should preferably be a biconvex lens in order to correct aberration.

In the path-bending zoom optical system of the present invention, it is desirable that the most image-side lens unit includes at least one aspherical surface.

The most image-side lens unit is of considerable ray height, and thus by including at least one aspherical surface, off-axis aberrations, such as distortion, astigmatism, and coma, and pupil aberration can be effectively corrected. Since a retrofocus optical system facilitates the production of negative distortion, it is desirable that the optical system has the aspherical function that the refracting power becomes weaker than the paraxial refracting power progressively in going from the optical axis to the peripery.

In the path-bending zoom optical system of the present invention, it is desirable to satisfy the following condition:

$$0.3 < f4/\sqrt{(fW \times fT)} < 4 \qquad (5)$$

where f4 is the focal length of the most image-side lens unit. When the optical system is constructed with four lens units, f4 is the focal length of the fourth lens unit.

Below the lower limit of Condition (5), the refracting power of the most image-side lens unit is extremely strengthened. Consequently, the number of lenses for suppressing the production of aberration in the most image-side lens unit must be increased, and the overall lens length is increased. Beyond the upper limit of Condition (5), the overall lens length is increased. Moreover, the production of outer coma becomes remarkable.

In order to achieve a smaller design while holding better optical performance, it is desirable to satisfy the following condition:

$$0.7 < f4/\sqrt{(fW \times fT)} < 2 \qquad (5\text{-}1)$$

In order to achieve a further smaller design while holding better optical performance, it is desirable to satisfy the following condition:

$$0.9 < f4/\sqrt{(fW \times fT)} < 1.2 \qquad (5\text{-}2)$$

In the path-bending zoom optical system of the present invention, it is desirable that the optical axis is bent parallel to the minor side of the imaging surface of the image sensor.

In the case of a rectangular imaging surface like the CCD, when the optical axis is bent parallel to the minor side of the imaging surface, the thickness of the imaging device can be reduced. (Specifically, when a direction along the plane of the page in FIGS. 1A–1C is the minor side of the imaging surface and a direction perpendicular to the plane of the page is the major side of the imaging surface, dimensions represented by symbols D1, D1$_1$, D1$_2$, D2$_1$, and D2$_2$ can be diminished.) In this case, the effective diameter of the surface in the proximity of the imaging surface is particularly approximate to the shape of the imaging surface, and thus when an outer lens diameter is shaped not into a circle, with the optical axis as its center, but into a rectangle, the imaging optical system can be down-sized.

An information processor according to the present invention includes the path-bending zoom optical system according to the present invention, an electronic image sensor located at the position where an object image formed by the zoom optical system is received, a processing means for processing an electronic signal converted into photoelectricity by the electronic image sensor, an input section for inputting an information signal which should be input into the processing means by an operator, a display element displaying an output from the processing means, and a recording medium recording the output from the processing means. The processing means is constructed so that the object image formed by the path-bending zoom optical system and received by the electronic image sensor is displayed on the display element. By doing so, the thickness extending along the depth of the zoom optical system to be mounted can be extremely decreased, and a slim design of the information processor can be achieved.

A personal computer according to the present invention is such that, in the information processor, the input section is constructed with a keyboard, and the path-bending zoom optical system and the electronic image sensor are housed in the periphery of the display element or of the keyboard.

Specific aspects of the path-bending zoom optical system to be used here are shown in the first to seventeenth embodiments which will be described later. By constructing the optical system as mentioned above, the thickness extending along the depth of the zoom optical system to be mounted can be extremely decreased, and a slim design of the personal computer can be achieved.

A telephone device according to the present invention includes the path-bending zoom optical system according to the present invention, an electronic image sensor located at the position where an object image formed by the zoom optical system is received, an antenna for transmitting and receiving a telephone signal, an input section for inputting signals such as telephone numbers, and a signal processing section converting the object image received by the electronic image sensor into a transmittable signal. Specific aspects of the path-bending zoom optical system to be used here are shown in the first to seventeenth embodiments which will be described later. By constructing the optical system as mentioned above, the thickness extending along the depth of the zoom optical system to be mounted can be extremely decreased, and a slim design of the telephone device can be achieved.

An electronic camera device according to the present invention includes the path-bending zoom optical system according to the present invention, an electronic image sensor located at the position where an object image formed by the zoom optical system is received, a processing means for processing an electronic signal converted into photoelectricity by the electronic image sensor, and a display element displaying the object image received by the electronic image sensor to be observable. A recording medium for recording the information of the object image received by the electronic image sensor is housed in, or is movable in and out of, the camera device. The processing means has a display processing function for displaying the object image received by the electronic image sensor on the display element and a record processing function for recording the object image received by the electronic image sensor in the recording medium. Specific aspects of the path-bending zoom optical system to be used here are shown in the first to seventeenth embodiments which will be described later. By constructing the optical system as mentioned above, the thickness extending along the depth of the zoom optical system to be mounted can be extremely decreased, and a slim design of the electronic camera device can be achieved.

In accordance with the drawings, the embodiments of the present invention will be described below. The sectional views, developed along the optical axis, at wide-angle, middle, and telephoto positions in focusing of an infinite object point, of individual embodiments are shown in FIGS. 2A–18C. For convenience of design, these sectional views show not states where light is reflected by the reflecting surface of the path-bending prism, but optical arrangements in which the optical path is constructed in a straight line.

In the figures, G1 denotes a first lens unit, G2 denotes a second lens unit, G3 denotes a third lens unit, G4 denotes a fourth lens unit, P denotes a path-bending prism, S denotes an aperture stop, and F denotes a plane-parallel plate unit including a near-infrared cutoff filter, a low-pass filter, and a cover glass of a CCD which is an electronic image sensor.

FIRST EMBODIMENT

Figure 2A:
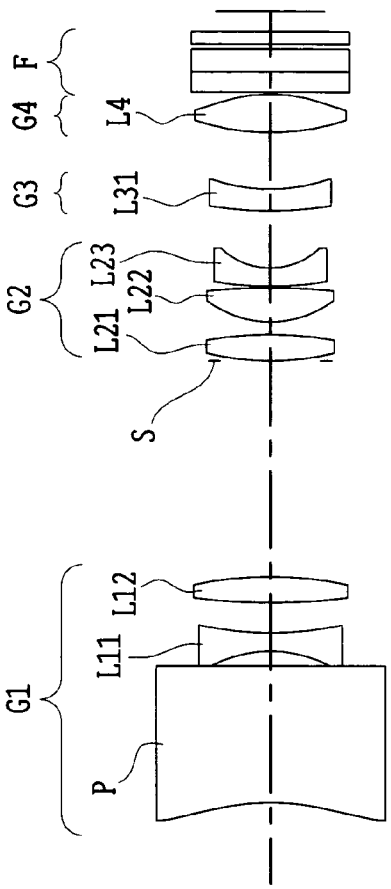
FIGS. 2A, 2B, and 2C are sectional views showing optical arrangements, developed along the optical axis, at wide-angle, middle, and telephoto positions, respectively, in focusing of an infinite object point, of a first embodiment of the path-bending zoom optical system according to the present invention.
Figure 2B:
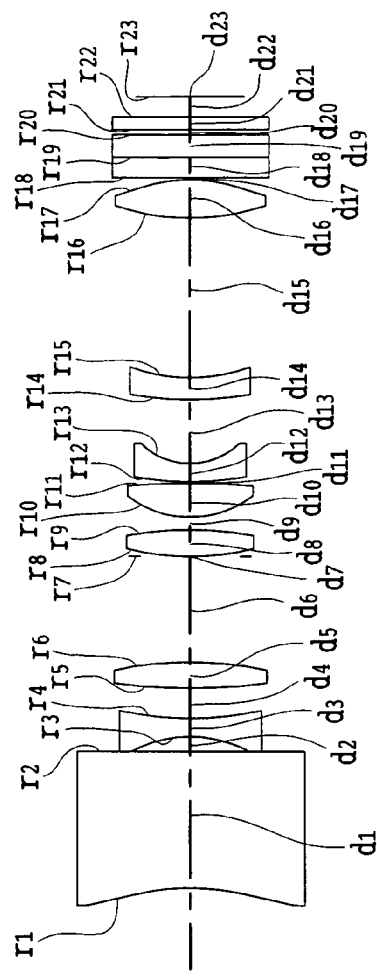
Figure 2C:
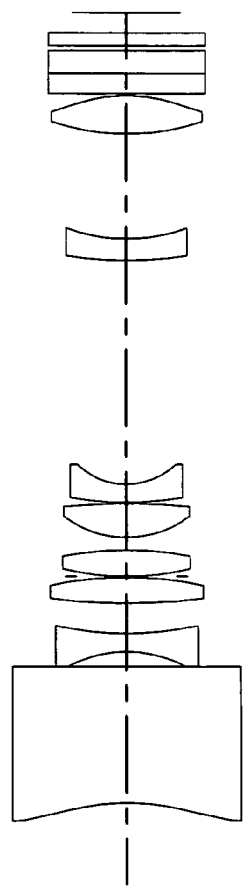

FIGS. 2A, 2B, and 2C show optical arrangements, developed along the optical axis, at wide-angle, middle, and telephoto positions, respectively, in focusing of an infinite object point, of the first embodiment of the path-bending zoom optical system according to the present invention.

The path-bending optical system of this embodiment comprises four lens units: in order from the object side, the first lens unit G1 with negative refracting power, the second lens unit G2 with positive refracting power, the third lens unit G3 with negative refracting power, and the fourth lens unit G4 with positive refracting power. The lens units arranged on the image side of the aperture stop S are constructed as a triplet with positive, negative, and positive refracting powers.

The first lens unit G1 includes, in order from the object side, the path-bending prism P, a biconcave negative lens L11, and a biconvex positive lens L12.

The second lens unit G2 includes, in order from the object side, a biconvex positive lens L21, a biconvex positive lens L22, and a negative meniscus lens L23 with a concave surface directed toward the image side.

The third lens unit G3 has a negative meniscus lens L31 with a concave surface directed toward the image side.

The fourth lens unit G4 is constructed with a biconvex positive lens L4.

In the first embodiment, when the magnification is changed in the range from the wide-angle position to the telephoto position, the first lens unit G1 is fixed, the aperture stop S and the second lens unit G2 are integrally moved toward the object side, and the third lens unit G3, after being moved once toward the object side, is moved toward the image side. The fourth lens unit G4 remains fixed together with the filters F. When the second lens unit G2 and the aperture stop S are integrally moved in the magnification change as mentioned above, the fluctuation of aberration caused by the magnification change is minimized.

The second lens unit G2 is movable in the magnification change to chiefly perform the function of the magnification change.

The third lens unit G3 is movable in the magnification change to chiefly perform the function of correcting the shift of the position of the image plane caused by the magnification change. When the object point approaches the imaging optical system from infinity, the third lens unit G3 is moved toward the image plane along the optical axis to thereby carry out focusing.

The second lens unit G2 needs to converge light diverged by the first lens unit G1 with negative refracting power. Thus, in order to ensure good performance and reduce the focal length, the second lens unit G2, as mentioned above, is constructed to include at least two lenses L21 and L22 with positive refracting powers. Moreover, since the second lens unit G2 is moved along the optical axis when the magnification is changed in the range from the wide-angle position to the telephoto position, the second lens unit G2, as mentioned above, is constructed to include at least one lens L23 with negative refracting power in order to suppress fluctuations in aberrations including chromatic aberration, caused by the magnification change. When the second lens unit G2 is constructed with three lenses, as in the first embodiment, the arrangement of lenses which has, in order from the object side, positive, positive, and negative refracting powers is favorable for correction for aberration.

In the first embodiment, the last surface of the second lens unit G2 is configured as a concave surface directed toward the image side. Hence, the position of the principal point is shifted toward the first lens unit G1, and the distance between the principal points of the first and second lens units G1 and G2 can be reduced. As a result, in addition to the fact that the overall lens length is reduced, the magnification of the second lens unit G2 can be increased, and thus the amount of movement of the second lens unit G2 required for the magnification change can be decreased.

In the first embodiment, since the first lens unit G1 is constructed to have the negative refracting power, the image point of the first lens unit G1 (that is, the object point of the second lens unit G2) is formed at a considerable distance away from the second lens unit G2 on the object side thereof.

In order to reduce the overall lens length, it is necessary to diminish the synthesized focal length of the second and third lens units G2 and G3. However, in order to maintain the range of movement of the second and third lens units G2 and G3, the spacing between the first and second lens units G1 and G2 must be ensured to some extent. Consequently, the compatibility of a reduction of the overall lens length (by a reduction of the synthesized focal length of the second and third lens units G2 and G3) with the maintenance of the spacing for zooming becomes difficult.

Where the third lens unit G3 is actually designed to have the positive refracting power, the overall lens length is thought of as the condition of restriction for ensuring performance. However, when the third lens unit G3 is constructed to have the negative refracting power as in the first embodiment, the positions of the principal points of the second and third lens units G2 and G3 project toward the object side (toward the first lens unit G1), and hence the spacing between the principal points of the first lens unit G1 and the second and third lens units G2 and G3 can be reduced. Since the synthesized focal length of the second and third lens units G2 and G3 can also be reduced and the magnification of the second lens unit G2 can be increased, the amount of movement of the second lens unit G2 required for the magnification change can be decreased. In consequence, the reduction of the overall lens length (by the reduction of the synthesized focal length of the second and third lens units G2 and G3) and the maintenance of the spacing for the magnification change and of a high magnification can be achieved at the same time.

Aspherical surfaces are used for four ones: the entrance surface of the path-bending prism P in the first lens unit G1, the object-side surface of the biconcave negative lens L11 in the first lens unit G1, the most object-side surface of the second lens unit G2, and the image-side surface of the fourth lens unit G4.

Also, in the first embodiment, when the imaging surface is rectangular like the CCD, the optical axis is bent parallel to the minor side of the imaging surface so that the thickness of the imaging device can be reduced. (When a direction along the plane of the page in FIGS. 1A–1C is the minor side of the imaging surface and a direction perpendicular to the plane of the page is the major side of the imaging surface, dimensions represented by symbols D1, D1$_1$, D1$_2$, D2$_1$, and D2$_2$ can be diminished.) In this case, the effective diameters of the object-side surface and of the surface in the proximity of the imaging surface are particularly approximate to the shape of the imaging surface, and thus when an outer lens diameter is shaped not into a circle, with the optical axis as its center, but into a rectangle, the imaging optical system can be down-sized.

In the first embodiment, the path-bending prism P is made of plastic.

As in the first embodiment, when the first lens unit G1 or the most image-side lens unit G4 is provided with the aspherical surface, it is desirable that any lens or prism which has the aspherical surface is made of glass and its transition point Tg satisfies the following condition:

$$60° \text{ C.} < Tg < 620° \text{ C.} \tag{6}$$

The aspherical surface cannot be accurately shaped by grinding, and it is difficult to shape a large number of aspherical surfaces by grinding. If the lens or prism which has the aspherical surface is made of glass such as to satisfy Condition (6), the aspherical surface can be configured by a glass molding method, which facilitates mass production. The optical system is thus reduced in cost.

When the first lens unit G1 or the most image-side lens unit G4 is provided with the aspherical surface as in the first embodiment, it is desirable that the lens or prism which has the aspherical surface is configured by the glass molding method.

As mentioned above, the aspherical surface cannot be accurately shaped by grinding, and it is difficult to shape a large number of aspherical surfaces by grinding. When the lens or prism which has the aspherical surface is configured by the glass molding method, mass production can be facilitated and the optical system is reduced in cost.

When the first lens unit G1 or the most image-side lens unit G4 is provided with the aspherical surface, the lens or prism which has the aspherical surface can be constructed of organic-inorganic hybrid material.

The organic-inorganic hybrid material, as set forth in, for example, Japanese Patent Kokai No. Hei 7-90181, includes that in which the organic material is dispersed in the inorganic material or that in which the inorganic material is dispersed in the organic material. In the hybrid material, its melting point is lower than that of glass, molding takes place at low temperature, mass production can be facilitated, and the optical system is reduced in cost. The hybrid material, in contrast with plastic, is capable of acquiring the optical properties of high refractive index and low dispersion and excels in heat resistance. Moreover, it hardly damages and can also be used for the front lens of the optical system, for instance. As such, it is desirable that such an organic-inorganic hybrid material is used for the lens or prism which has the aspherical surface.

When the first lens unit G1 or the most image-side lens unit G4 is provided with the aspherical surface as in the first embodiment, the lens or prism which has the aspherical surface may be made of plastic.

When the prism or lens is constructed of plastic, a large number of prisms or lenses which have aspherical surfaces can be easily produced by a plastic molding method. Since material cost is low, inexpensive prisms and optical systems can be obtained. Plastic is lighter in weight than glass, and thus a lightweight design of the optical system is also achieved.

In the path-bending zoom optical system of the present invention, as mentioned above, the prism can be constructed of plastic.

The prism is larger in volume than the lens, and when the prism is made of light plastic, a special effect is brought about on the lightweight design. The prism can be produced by the plastic molding method, which facilitates mass production. In addition, the material cost is low and hence inexpensive optical systems can be obtained.

In the path-bending zoom optical system of the present invention, any lens and prism may be constructed of plastic.

By doing so, any lens and prism can be produced by the plastic molding method, and mass production can be facilitated. In addition, the material cost is low and hence inexpensive optical systems can be obtained.

Subsequently, numerical data of optical members constituting the path-bending zoom optical system of the first embodiment are shown below.

In the numerical data of the first embodiment, $r_1, r_2, \ldots$ denote radii of curvature of surfaces of individual lenses and a prism; $d_1, d_2, \ldots$ denote thicknesses of individual lenses and the prism or air spacings between them; $n_{d1}, n_{d2}, \ldots$ denote refractive indices of individual lenses and the prism at the d line; $\nu_{d1}, \nu_{d2}, \ldots$ denote Abbe's numbers of individual lenses and the prism; Fno denotes an F-number; f denotes the focal length of the entire system; and $2\omega$ denotes the total angle of view.

Also, when z is the direction of the optical axis, h is a distance from the optical axis (however, $h^2=X^2+y^2$), c is the curvature of the vertex, k is a conic constant, and $A_4, A_6, A_8,$ and $A_{10}$ are aspherical coefficients, the configuration of a rotationally symmetrical aspherical surface is expressed by the following equation:

$$z = ch^2/[1+\{1-(1+k)c^2h^2\}^{1/2}] + A_4h^4 + A_6h^6 + A_8h^8 + A_{10}h^{10}$$

These symbols are also used for the numerical data of other embodiments to be described later.

Numerical data 1

| | | | |
|---|---|---|---|
| $r_1 = -12.10$ (aspherical surface [1]) | $d_1 = 8.30$ | $n_{d1} = 1.5091$ | $\nu_{d1} = 56.2$ |
| $r_2 = \infty$ | $d_2 = 0.92$ | | |
| $r_3 = -7.82$ (aspherical surface [2]) | $d_3 = 1.10$ | $n_{d3} = 1.6204$ | $\nu_{d3} = 60.3$ |
| $r_4 = 17.62$ | $d_4 = 1.90$ | | |
| $r_5 = 32.07$ | $d_5 = 1.62$ | $n_{d5} = 1.7234$ | $\nu_{d5} = 38.0$ |
| $r_6 = -20.18$ | $d_6 = D6$ | | |
| $r_7 =$ stop surface | $d_7 = 0.00$ | | |
| $r_8 = 12.55$ (aspherical surface [3]) | $d_8 = 1.64$ | $n_{d8} = 1.6204$ | $\nu_{d8} = 60.3$ |
| $r_9 = -19.00$ | $d_9 = 0.78$ | | |
| $r_{10} = 5.96$ | $d_{10} = 2.02$ | $n_{d10} = 1.4875$ | $\nu_{d10} = 70.2$ |
| $r_{11} = -43.51$ | $d_{11} = 0.10$ | | |
| $r_{12} = 18.74$ | $d_{12} = 1.10$ | $n_{d12} = 1.7552$ | $\nu_{d12} = 27.5$ |
| $r_{13} = 4.11$ | $d_{13} = D13$ | | |
| $r_{14} = 22.73$ | $d_{14} = 1.30$ | $n_{d14} = 1.6779$ | $\nu_{d14} = 50.7$ |
| $r_{15} = 9.90$ | $d_{15} = D15$ | | |
| $r_{16} = 13.96$ | $d_{16} = 2.30$ | $n_{d16} = 1.4875$ | $\nu_{d16} = 70.2$ |
| $r_{17} = -8.06$ (aspherical surface [4]) | $d_{17} = 0.10$ | | |
| $r_{18} = \infty$ | $d_{18} = 1.20$ | $n_{d18} = 1.5163$ | $\nu_{d18} = 64.1$ |
| $r_{19} = \infty$ | $d_{19} = 1.34$ | $n_{d19} = 1.5477$ | $\nu_{d19} = 62.8$ |
| $r_{20} = \infty$ | $d_{20} = 0.30$ | | |
| $r_{21} = \infty$ | $d_{21} = 0.75$ | $n_{d21} = 1.5163$ | $\nu_{d21} = 64.1$ |
| $r_{22} = \infty 0$ | $d_{22} = 1.19$ | | |
| $r_{23} = \infty$ (image plane) | $d_{23} = 0.00$ | | |

Aspherical coefficients

Aspherical surface[1]

First surface k = 0.0000
$A_4 = 5.3449 \times 10^{-4}$   $A_6 = -3.5580 \times 10^{-6}$   $A_8 = 3.3473 \times 10^{-8}$ Aspherical surface[2]

Third surface k = 0.0000
$A_4 = -1.9012 \times 10^{-4}$   $A_6 = 3.2872 \times 10^{-6}$   $A_8 = -1.0062 \times 10^{-7}$ Aspherical surface[3]

Eighth surface k = 0.0000
$A_4 = -3.6453 \times 10^{-4}$   $A_6 = -1.0539 \times 10^{-6}$   $A_8 = -5.2965 \times 10^{-8}$ Aspherical surface[4]

Seventeenth surface k = 0.0000
$A_4 = 1.2316 \times 10^{-3}$   $A_6 = -1.8396 \times 10^{-5}$   $A_8 = 1.9162 \times 10^{-7}$ Zoom Data (Infinite Object Point)

| | Wide-angle | Middle | Telephoto |
|---|---|---|---|
| f (mm) | 5.600 | 9.699 | 16.800 |
| Fno | 2.800 | 3.944 | 5.334 |
| $2\omega$ (°) | 58.86 | 33.74 | 56.36 |
| D6 | 13.1802 | 6.5072 | 0.1000 |
| D13 | 3.4399 | 3.9506 | 13.6367 |
| D15 | 3.4089 | 9.5712 | 6.2923 |

SECOND EMBODIMENT

Figure 3A:
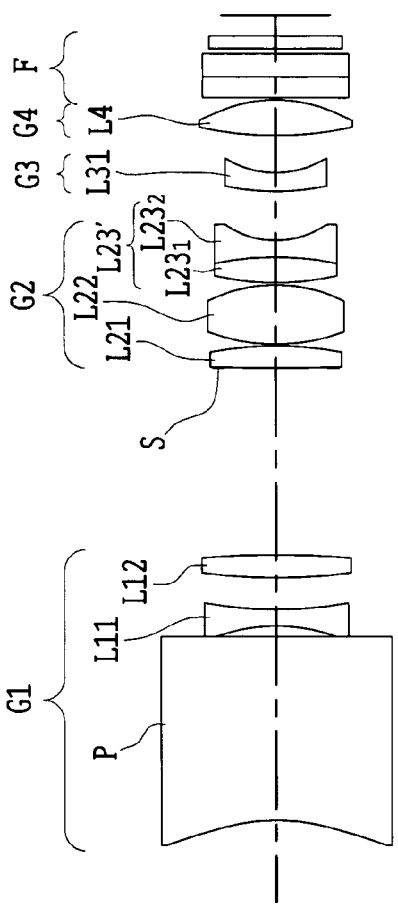
FIGS. 3A, 3B, and 3C are sectional views showing optical arrangements, developed along the optical axis, at wide-angle, middle, and telephoto positions, respectively, in focusing of the infinite object point, of a second embodiment of the path-bending zoom optical system according to the present invention.
Figure 3B:
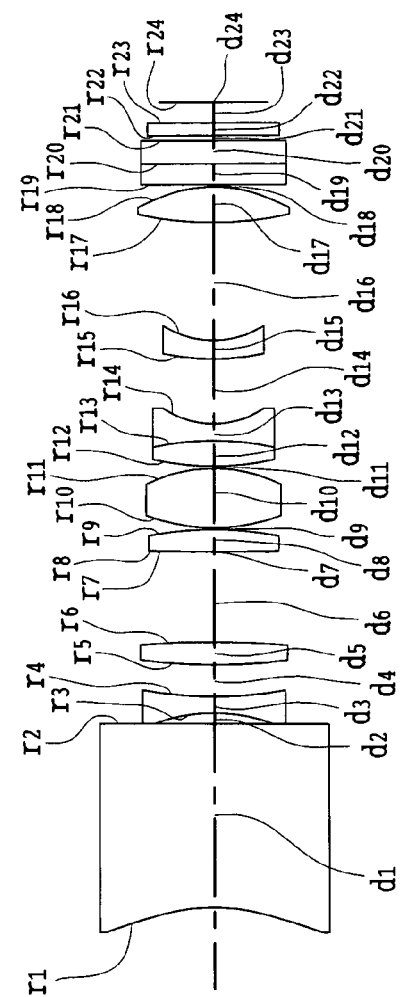
Figure 3C:
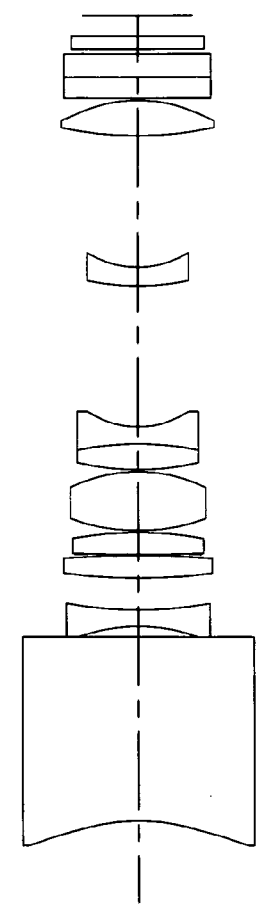

FIGS. 3A, 3B, and 3C show optical arrangements, developed along the optical axis, at wide-angle, middle, and telephoto positions, respectively, in focusing of an infinite object point, of the second embodiment of the path-bending zoom optical system according to the present invention.

The path-bending optical system of this embodiment comprises four lens units: in order from the object side, the first lens unit G1 with negative refracting power, the second lens unit G2 with positive refracting power, the third lens unit G3 with negative refracting power, and the fourth lens unit G4 with positive refracting power. The lens units arranged on the image side of the aperture stop S are constructed as a triplet with positive, negative, and positive refracting powers.

The first lens unit G1 includes, in order from the object side, the path-bending prism P, the biconcave negative lens L11, and the biconvex positive lens L12.

The second lens unit G2 includes, in order from the object side, the biconvex positive lens L21, the biconvex positive lens L22, and a cemented lens L23' of a biconvex positive lens L23$_1$ and a biconcave negative lens L23$_2$.

The third lens unit G3 has the negative meniscus lens L31 with a concave surface directed toward the image side.

The fourth lens unit G4 is constructed with the biconvex positive lens L4.

In the second embodiment, when the magnification is changed in the range from the wide-angle position to the telephoto position, the first lens unit G1 is fixed, the aperture stop S and the second lens unit G2 are integrally moved toward the object side, the third lens unit G3 is moved toward the object side while widening the spacing between the second and third lens units G2 and G3, and the fourth lens unit G4 remains fixed together with the filters F (the low-pass filter and the IR cutoff filter).

In the second lens unit G2, when the single lens L23$_1$ with positive refracting power and the single lens L23$_2$ with negative refracting power are cemented as in the second embodiment, errors of decentration and spacing become hard to occur and the mechanical structure is simplified. It is desirable that the cemented lens L23' is configured as a meniscus lens with a concave surface directed toward the image side. By doing so, the lens $L23_1$ with positive refracting power and the lens $L23_2$ with negative refracting power in the cemented lens L23' can be configured as the biconvex lens and the biconcave lens, respectively. The refracting powers of the concave surfaces of the negative lens $L23_2$, which are strong, are effective for correction for axial chromatic aberration.

In the second embodiment, when the object point approaches the imaging optical system from infinity, the third lens unit G3 is moved toward the image plane along the optical axis to thereby carry out focusing.

Aspherical surfaces are used for four ones: the entrance surface of the path-bending prism P in the first lens unit G1, the object-side surface of the biconcave negative lens L11 in the first lens unit G1, the most object-side surface of the second lens unit G2, and the image-side surface of the fourth lens unit G4.

Subsequently, numerical data of optical members constituting the path-bending zoom optical system of the second embodiment are shown below.

Numerical data 2

| | | | |
|---|---|---|---|
| $r_1 = -10.41$ (aspherical surface [1]) | $d_1 = 11.00$ | $n_{d1} = 1.5091$ | $v_{d1} = 56.2$ |
| $r_2 = \infty$ | $d_2 = 0.67$ | | |
| $r_3 = -10.88$ (aspherical surface [2]) | $d_3 = 1.00$ | $n_{d3} = 1.6204$ | $v_{d3} = 60.3$ |
| $r_4 = 23.19$ | $d_4 = 1.90$ | | |
| $r_5 = 29.47$ | $d_5 = 1.37$ | $n_{d5} = 1.7552$ | $v_{d5} = 27.5$ |
| $r_6 = -52.76$ | $d_6 = D6$ | | |
| $r_7 = $ stop surface | $d_7 = 0.00$ | | |
| $r_8 = 30.73$ (aspherical surface [3]) | $d_8 = 1.37$ | $n_{d8} = 1.7000$ | $v_{d8} = 48.1$ |
| $r_9 = -20.07$ | $d_9 = 0.10$ | | |
| $r_{10} = 11.11$ | $d_{10} = 3.54$ | $n_{d10} = 1.4875$ | $v_{d10} = 70.2$ |
| $r_{11} = -8.53$ | $d_{11} = 0.10$ | | |
| $r_{12} = 15.11$ | $d_{12} = 1.53$ | $n_{d12} = 1.6204$ | $v_{d12} = 60.3$ |
| $r_{13} = -18.43$ | $d_{13} = 1.00$ | $n_{d13} = 1.7408$ | $v_{d13} = 27.8$ |
| $r_{14} = 5.27$ | $d_{14} = D14$ | | |
| $r_{15} = 14.03$ | $d_{15} = 1.10$ | $n_{d15} = 1.7440$ | $v_{d15} = 44.8$ |
| $r_{16} = 5.36$ | $d_{16} = D16$ | | |
| $r_{17} = 21.09$ | $d_{17} = 2.10$ | $n_{d17} = 1.5750$ | $v_{d17} = 41.5$ |
| $r_{18} = -7.31$ (aspherical surface [4]) | $d_{18} = 0.10$ | | |
| $r_{19} = \infty$ | $d_{19} = 1.20$ | $n_{d19} = 1.5163$ | $v_{d19} = 64.1$ |
| $r_{20} = \infty$ | $d_{20} = 1.34$ | $n_{d20} = 1.5477$ | $v_{d20} = 62.8$ |
| $r_{21} = \infty$ | $d_{21} = 0.30$ | | |
| $r_{22} = \infty$ | $d_{22} = 0.75$ | $n_{d22} = 1.5163$ | $v_{d22} = 64.1$ |
| $r_{23} = \infty$ | $d_{23} = 1.19$ | | |
| $r_{24} = \infty$ (image plane) | $d_{24} = 0.00$ | | |

Aspherical coefficients

Aspherical surface[1]

First surface $k = 0.0000$
$A_4 = 4.9528 \times 10^{-4}$  $A_6 = -2.4701 \times 10^{-6}$  $A_8 = 2.3110 \times 10^{-8}$ Aspherical surface[2]

Third surface $k = 0.0000$
$A_4 = -2.1296 \times 10^{-4}$  $A_6 = -4.2742 \times 10^{-7}$  $A_8 = 2.9407 \times 10^{-8}$ Aspherical surface[3]

Eighth surface $k = 0.0000$
$A_4 = -5.8394 \times 10^{-4}$  $A_6 = -4.0436 \times 10^{-6}$  $A_8 = -3.7473 \times 10^{-7}$ Aspherical surface[4]

Eighteenth surface $k = 0.0000$
$A_4 = 9.5204 \times 10^{-4}$  $A_6 = -1.6085 \times 10^{-5}$  $A_8 = 2.5809 \times 10^{-7}$ Zoom Data (Infinite Object Point)

| | Wide-angle | Middle | Telephoto |
|---|---|---|---|
| f (mm) | 5.600 | 9.699 | 16.800 |
| Fno | 2.800 | 3.910 | 5.245 |
| 2 ω (°) | 58.91 | 33.96 | 19.49 |
| D6 | 11.2349 | 5.5422 | 0.1000 |
| D14 | 2.8963 | 3.8370 | 8.5123 |
| D16 | 2.2103 | 6.9622 | 7.7290 |

THIRD EMBODIMENT

Figure 4A:
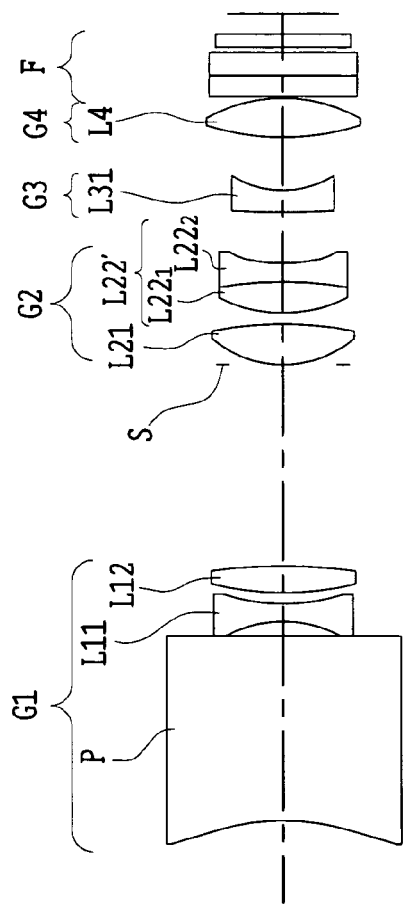
FIGS. 4A, 4B, and 4C are sectional views showing optical arrangements, developed along the optical axis, at wide-angle, middle, and telephoto positions, respectively, in focusing of the infinite object point, of a third embodiment of the path-bending zoom optical system according to the present invention.
Figure 4B:
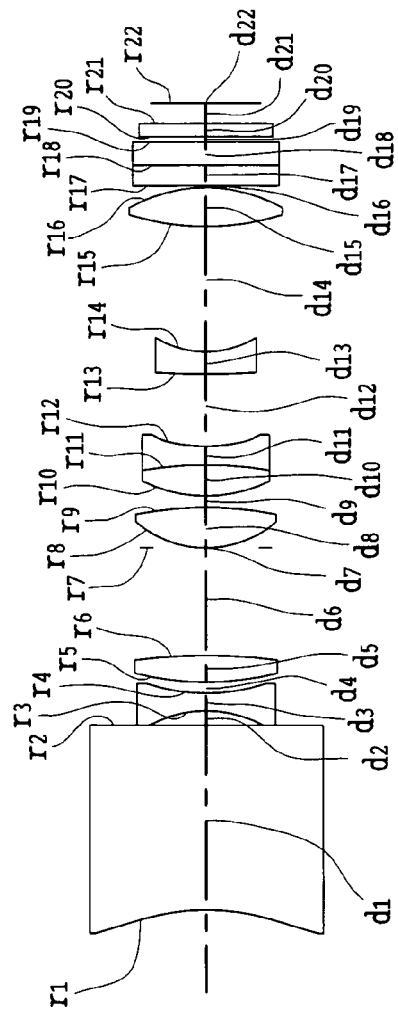
Figure 4C:
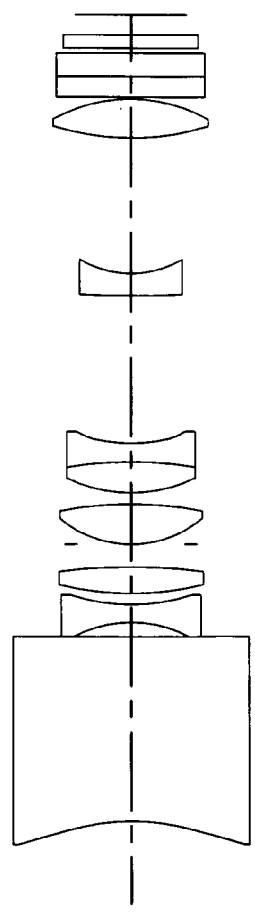

FIGS. 4A, 4B, and 4C show optical arrangements, developed along the optical axis, at wide-angle, middle, and telephoto positions, respectively, in focusing of an infinite object point, of the third embodiment of the path-bending zoom optical system according to the present invention.

The path-bending optical system of this embodiment comprises four lens units: in order from the object side, the first lens unit G1 with negative refracting power, the second lens unit G2 with positive refracting power, the third lens unit G3 with negative refracting power, and the fourth lens unit G4 with positive refracting power. The lens units arranged on the image side of the aperture stop S are constructed as a triplet with positive, negative, and positive refracting powers.

The first lens unit G1 includes, in order from the object side, the path-bending prism P, the biconcave negative lens L11, and the biconvex positive lens L12.

The second lens unit G2 includes, in order from the object side, the biconvex positive lens L21 and a cemented lens L22' of a biconvex positive lens $L22_1$ and a biconcave negative lens $L22_2$.

The third lens unit G3 has the negative meniscus lens L31 with a concave surface directed toward the image side.

The fourth lens unit G4 is constructed with the biconvex positive lens L4.

In the third embodiment, when the magnification is changed in the range from the wide-angle position to the telephoto position, the first lens unit G1 is fixed, the aperture stop S and the second lens unit G2 are integrally moved toward the object side, the third lens unit G3 is moved toward the object side while widening the spacing between the second and third lens units G2 and G3, and the fourth lens unit G4 remains fixed together with the filters F.

In the third embodiment, when the object point approaches the imaging optical system from infinity, the third lens unit G3 is moved toward the image plane along the optical axis to thereby carry out focusing.

Aspherical surfaces are used for five ones: the entrance surface of the path-bending prism P in the first lens unit G1, the object-side surface of the biconcave negative lens L11 in the first lens unit G1, the most object-side surface of the second lens unit G2, the most image-side surface of the second lens unit G2, and the image-side surface of the fourth lens unit G4.

Subsequently, numerical data of optical members constituting the path-bending zoom optical system of the third embodiment are shown below.

Numerical data 3

| | | | |
|---|---|---|---|
| $r_1 = -10.43$ (aspherical surface [1]) | $d_1 = 11.00$ | $n_{d1} = 1.5091$ | $v_{d1} = 56.2$ |
| $r_2 = \infty$ | $d_2 = 0.90$ | | |
| $r_3 = -6.94$ (aspherical surface [2]) | $d_3 = 1.10$ | $n_{d3} = 1.5481$ | $v_{d3} = 45.8$ |
| $r_4 = 11.19$ | $d_4 = 0.64$ | | |
| $r_5 = 16.57$ | $d_5 = 1.61$ | $n_{d5} = 1.7552$ | $v_{d5} = 27.5$ |
| $r_6 = -28.56$ | $d_6 = D6$ | | |
| $r_7 = $ stop surface | $d_7 = 0.00$ | | |
| $r_8 = 5.74$ (aspherical surface [3]) | $d_8 = 2.45$ | $n_{d8} = 1.4875$ | $v_{d8} = 70.2$ |
| $r_9 = -20.57$ | $d_9 = 0.68$ | | |
| $r_{10} = 8.23$ | $d_{10} = 1.84$ | $n_{d10} = 1.4875$ | $v_{d10} = 70.2$ |
| $r_{11} = -20.78$ | $d_{11} = 1.10$ | $n_{d11} = 1.7552$ | $v_{d11} = 27.5$ |
| $r_{12} = 10.98$ (aspherical surface [4]) | $d_{12} = D12$ | | |
| $r_{13} = 50.10$ | $d_{13} = 1.30$ | $n_{d13} = 1.6204$ | $v_{d13} = 60.3$ |
| $r_{14} = 5.44$ | $d_{14} = D14$ | | |
| $r_{15} = 14.52$ | $d_{15} = 2.30$ | $n_{d15} = 1.5163$ | $v_{d15} = 64.1$ |
| $r_{16} = -7.28$ (aspherical surface [5]) | $d_{16} = 0.10$ | | |
| $r_{17} = \infty$ | $d_{17} = 1.20$ | $n_{d17} = 1.5163$ | $v_{d17} = 64.1$ |
| $r_{18} = \infty$ | $d_{18} = 1.34$ | $n_{d18} = 1.5477$ | $v_{d18} = 62.8$ |
| $r_{19} = \infty$ | $d_{19} = 0.30$ | | |
| $r_{20} = \infty$ | $d_{20} = 0.75$ | $n_{d20} = 1.5163$ | $v_{d20} = 64.1$ |
| $r_{21} = \infty$ | $d_{21} = 1.19$ | | |
| $r_{22} = \infty$ (image plane) | $d_{22} = 0.00$ | | |

Aspherical coefficients

Aspherical surface [1]

First surface $k = 0.0000$
$A_4 = 5.7771 \times 10^{-4}$  $A_6 = -4.1960 \times 10^{-6}$  $A_8 = 4.5171 \times 10^{-8}$ Aspherical surface [2]

Third surface $k = 0.0000$
$A_4 = -7.5746 \times 10^{-5}$  $A_6 = 1.3426 \times 10^{-5}$  $A_8 = -4.4485 \times 10^{-7}$ Aspherical surface [3]

Eighth surface $k = 0.0000$
$A_4 = -2.6322 \times 10^{-4}$  $A_6 = -7.9055 \times 10^{-6}$  $A_8 = -3.5821 \times 10^{-7}$ Aspherical surface [4]

Twelfth surface $k = 0.0000$
$A_4 = 1.6139 \times 10^{-3}$  $A_6 = 2.1287 \times 10^{-5}$  $A_8 = 5.4056 \times 10^{-6}$ Aspherical surface [5]

Sixteenth surface $k = 0.0000$
$A_4 = 1.1681 \times 10^{-3}$  $A_6 = -2.2091 \times 10^{-5}$  $A_8 = 3.8194 \times 10^{-7}$ Zoom Data (Infinite Object Point)

| | Wide-angle | Middle | Telephoto |
|---|---|---|---|
| f (mm) | 5.600 | 9.699 | 16.800 |
| Fno | 2.800 | 3.908 | 5.276 |
| 2 ω (°) | 58.86 | 33.86 | 19.42 |
| D6 | 12.0755 | 6.4943 | 1.3576 |
| D12 | 3.0000 | 4.3199 | 8.8507 |
| D14 | 3.1196 | 7.3809 | 7.9868 |

FOURTH EMBODIMENT

Figure 5A:
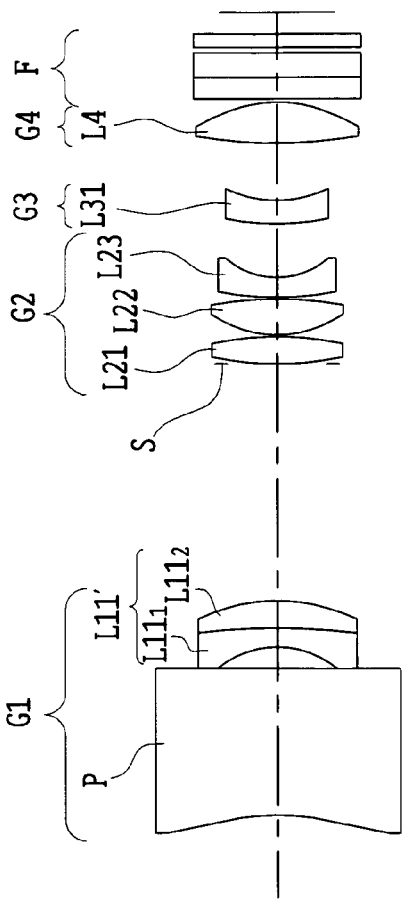
FIGS. 5A, 5B, and 5C are sectional views showing optical arrangements, developed along the optical axis, at wide-angle, middle, and telephoto positions, respectively, in focusing of the infinite object point, of a fourth embodiment of the path-bending zoom optical system according to the present invention.
Figure 5B:
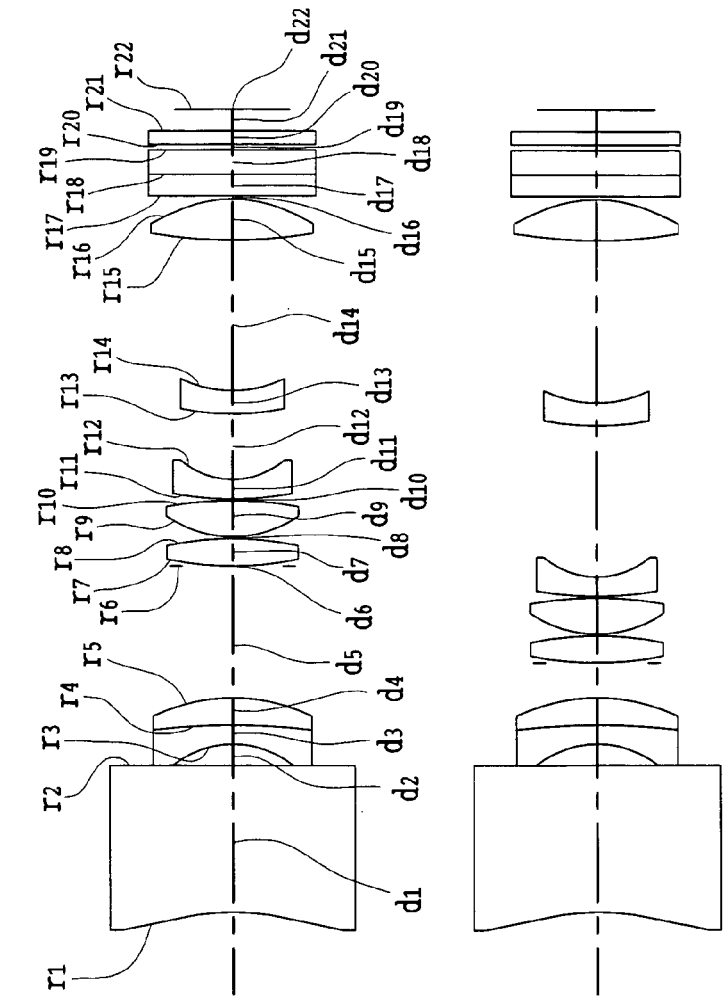
Figure 5C:

FIGS. 5A, 5B, and 5C show optical arrangements, developed along the optical axis, at wide-angle, middle, and telephoto positions, respectively, in focusing of an infinite object point, of the fourth embodiment of the path-bending zoom optical system according to the present invention.

The path-bending optical system of this embodiment comprises four lens units: in order from the object side, the first lens unit G1 with negative refracting power, the second lens unit G2 with positive refracting power, the third lens unit G3 with negative refracting power, and the fourth lens unit G4 with positive refracting power. The lens units arranged on the image side of the aperture stop S are constructed as a triplet with positive, negative, and positive refracting powers.

The first lens unit G1 includes, in order from the object side, the path-bending prism P and a cemented lens L11' of a negative meniscus lens L11$_1$ with a concave surface directed toward the object side and a positive meniscus lens L11$_2$ with a concave surface directed toward the object side.

The second lens unit G2 includes, in order from the object side, the biconvex positive lens L21, the biconvex positive lens L22, and the negative meniscus lens L23 with a concave surface directed toward the image side.

The third lens unit G3 has the negative meniscus lens L31 with a concave surface directed toward the image side.

The fourth lens unit G4 is constructed with the biconvex positive lens L4.

In the fourth embodiment, when the magnification is changed in the range from the wide-angle position to the telephoto position, the first lens unit G1 is fixed, the aperture stop S and the second lens unit G2 are integrally moved toward the object side, the third lens unit G3 is moved toward the object side while widening the spacing between the second and third lens units G2 and G3, and the fourth lens unit G4 remains fixed together with the filters F.

In the fourth embodiment, when the object point approaches the imaging optical system from infinity, the third lens unit G3 is moved toward the image plane along the optical axis to thereby carry out focusing.

Aspherical surfaces are used for four ones: the entrance surface of the path-bending prism P in the first lens unit G1, the object-side surface of the negative meniscus lens L11$_1$ in the first lens unit G1, the most object-side surface of the second lens unit G2, and the image-side surface of the fourth lens unit G4.

Subsequently, numerical data of optical members constituting the path-bending zoom optical system of the fourth embodiment are shown below.

Numerical data 4

| | | | |
|---|---|---|---|
| $r_1 = -11.75$ (aspherical surface [1]) | $d_1 = 8.30$ | $n_{d1} = 1.5091$ | $\nu_{d1} = 56.2$ |
| $r_2 = \infty$ | $d_2 = 1.22$ | | |
| $r_3 = -5.35$ (aspherical surface [2]) | $d_3 = 1.10$ | $n_{d3} = 1.7000$ | $\nu_{d3} = 48.1$ |
| $r_4 = -33.69$ | $d_4 = 1.56$ | $n_{d4} = 1.7552$ | $\nu_{d4} = 27.5$ |
| $r_5 = -9.87$ | $d_5 = D5$ | | |
| $r_6 =$ stop surface | $d_6 = 0.00$ | | |
| $r_7 = 13.26$ aspherical surface [3] | $d_7 = 1.58$ | $n_{d7} = 1.6204$ | $\nu_{d7} = 60.3$ |
| $r_8 = -16.59$ | $d_8 = 0.10$ | | |
| $r_9 = 6.22$ | $d_9 = 2.04$ | $n_{d9} = 1.4875$ | $\nu_{d9} = 70.2$ |
| $r_{10} = -20.99$ | $d_{10} = 0.10$ | | |
| $r_{11} = 18.85$ | $d_{11} = 1.10$ | $n_{d11} = 1.7552$ | $\nu_{d11} = 27.5$ |
| $r_{12} = 4.41$ | $d_{12} = D12$ | | |
| $r_{13} = 15.61$ | $d_{13} = 1.30$ | $n_{d13} = 1.7440$ | $\nu_{d13} = 44.8$ |
| $r_{14} = 6.41$ | $d_{14} = D14$ | | |
| $r_{15} = 26.05$ | $d_{15} = 2.30$ | $n_{d15} = 1.5182$ | $\nu_{d15} = 58.9$ |
| $r_{16} = -6.28$ (aspherical surface [4]) | $d_{16} = 0.16$ | | |
| $r_{17} = \infty$ | $d_{17} = 1.20$ | $n_{d17} = 1.5163$ | $\nu_{d17} = 64.1$ |
| $r_{18} = \infty$ | $d_{18} = 1.34$ | $n_{d18} = 1.5477$ | $\nu_{d18} = 62.8$ |
| $r_{19} = \infty$ | $d_{19} = 0.30$ | | |
| $r_{20} = \infty$ | $d_{20} = 0.75$ | $n_{d20} = 1.5163$ | $\nu_{d20} = 64.1$ |
| $r_{21} = \infty$ | $d_{21} = 1.19$ | | |
| $r_{22} = \infty$ (image plane) | $d_{22} = 0.00$ | | |

Aspherical coefficients

Aspherical surface[1]

First surface $k = 0.0000$
$A_4 = 5.5070 \times 10^{-4}$   $A_6 = -1.8114 \times 10^{-6}$   $A_8 = 2.4842 \times 10^{-8}$ Aspherical surface[2]

Third surface $k = 0.0000$
$A_4 = 8.7085 \times 10^{-6}$   $A_6 = 1.9425 \times 10^{-6}$   $A_8 = 4.8464 \times 10^{-7}$ Aspherical surface[3]

Seventh surface $k = 0.0000$
$A_4 = -5.7107 \times 10^{-4}$   $A_6 = -1.1350 \times 10^{-6}$   $A_8 = -1.5046 \times 10^{-7}$ Aspherical surface[4]

Sixteenth surface $k = 0.0000$
$A_4 = 1.4347 \times 10^{-3}$   $A_6 = -1.7252 \times 10^{-5}$   $A_8 = 4.0451 \times 10^{-7}$ Zoom Data (Infinite Object Point)

| | Wide-angle | Middle | Telephoto |
|---|---|---|---|
| f (mm) | 5.600 | 9.699 | 16.800 |
| Fno | 2.800 | 3.936 | 5.353 |
| 2 ω (°) | 58.87 | 34.00 | 19.44 |
| D5 | 13.4631 | 7.5206 | 2.0000 |
| D12 | 3.0000 | 3.7365 | 8.5914 |
| D14 | 3.2164 | 8.4225 | 9.0882 |

FIFTH EMBODIMENT

Figure 6A:
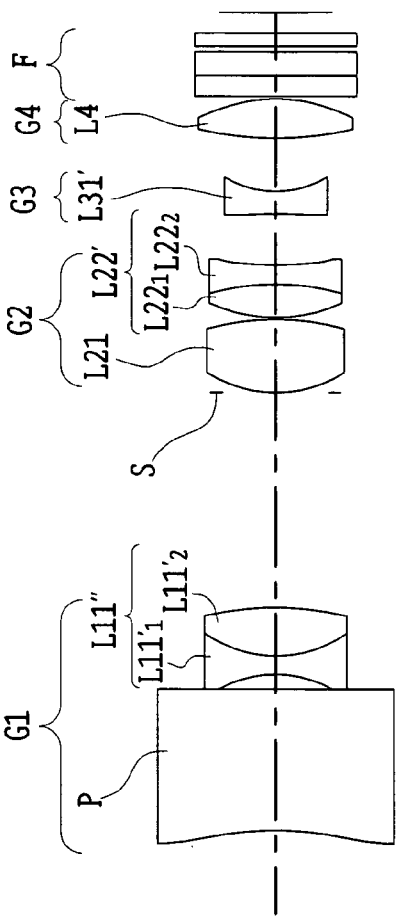
FIGS. 6A, 6B, and 6C are sectional views showing optical arrangements, developed along the optical axis, at wide-angle, middle, and telephoto positions, respectively, in focusing of the infinite object point, of a fifth embodiment of the path-bending zoom optical system according to the present invention.
Figure 6B:
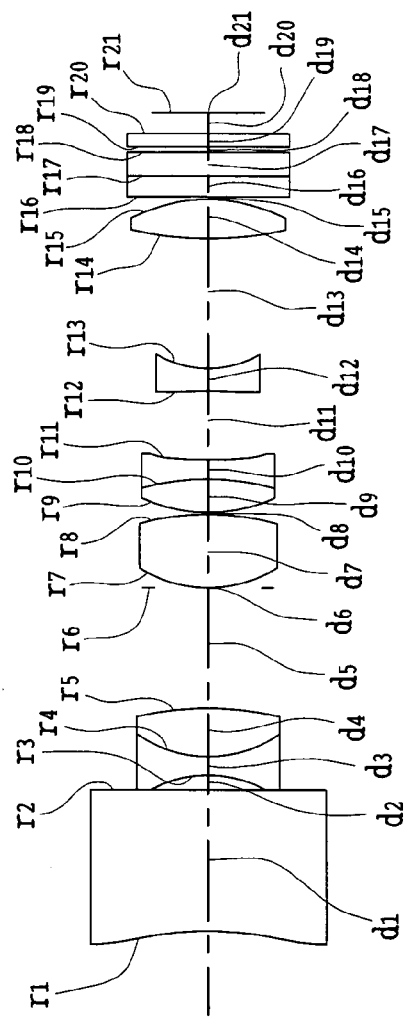
Figure 6C:
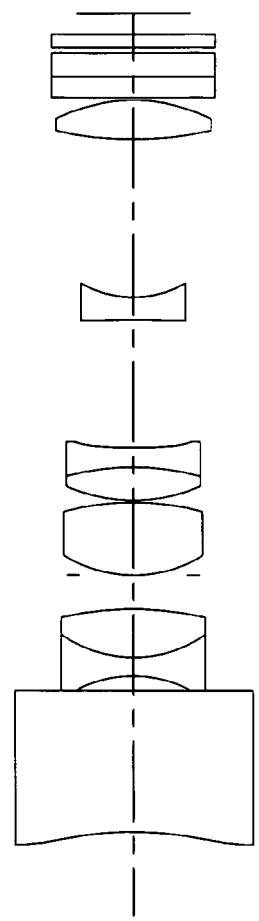

FIGS. 6A, 6B, and 6C show optical arrangements, developed along the optical axis, at wide-angle, middle, and telephoto positions, respectively, in focusing of an infinite object point, of the fifth embodiment of the path-bending zoom optical system according to the present invention.

The path-bending optical system of this embodiment comprises four lens units: in order from the object side, the first lens unit G1 with negative refracting power, the second lens unit G2 with positive refracting power, the third lens unit G3 with negative refracting power, and the fourth lens unit G4 with positive refracting power. The lens units arranged on the image side of the aperture stop S are constructed as a triplet with positive, negative, and positive refracting powers.

The first lens unit G1 includes, in order from the object side, the path-bending prism P and a cemented lens L11" of a biconcave negative lens L11$_1$' and a biconvex positive lens L11$_2$'.

The second lens unit G2 includes, in order from the object side, the biconvex positive lens L21 and the cemented lens L22' of the biconvex positive lens L22$_1$ and the biconcave negative lens L22$_2$.

The third lens unit G3 is constructed with a biconcave negative lens L31'.

The fourth lens unit G4 is constructed with the biconvex positive lens L4.

In the fifth embodiment, since the positive lens L22$_1$ and the negative lens L22$_2$ are configured as the cemented lens L22', the thickness and decentering tolerances of these lenses are moderated and the mechanical structure can be simplified.

In the fifth embodiment, when the magnification is changed in the range from the wide-angle position to the telephoto position, the first lens unit G1 is fixed, the aperture stop S and the second lens unit G2 are integrally moved toward the object side, the third lens unit G3 is moved toward the object side while widening the spacing between the second and third lens units G2 and G3, and the fourth lens unit G4 remains fixed together with the filters F.

In the fifth embodiment, when the object point approaches the imaging optical system from infinity, the third lens unit G3 is moved toward the image plane along the optical axis to thereby carry out focusing.

Aspherical surfaces are used for four ones: the entrance surface of the path-bending prism P in the first lens unit G1, the most object-side surface of the second lens unit G2, the most image-side surface of the second lens unit G2, and the image-side surface of the fourth lens unit G4.

When the most object-side surface of the second lens unit G2 is configured as the aspherical surface, spherical aberration can be effectively corrected. When this aspherical surface has the aspherical function that the paraxial refracting power weakens progressively in going from the optical axis to the peripery, positive spherical aberration produced in the second lens unit G2 can be suppressed. Further, when the most image-side surface of the second lens unit G2 is configured as the aspherical surface, off-axis aberrations, such as astigmatism and coma, can be effectively corrected. This surface, which makes high-order aberration liable to be produced, is configured as the aspherical surface, and thereby the production of high-order aberration can be suppressed. In this case, it is desirable that the aspherical surface has the function that the paraxial refracting power strengthens progressively in going from the optical axis to the peripery. When both the most object-side surface and the most image-side surface of the second lens unit G2 are configured to be aspherical, the amount of correction for aberration is considerably increased, and the fluctuation, caused by zooming, of spherical aberration produced in the second lens unit G2 and astigmatism produced in the second lens unit G2 can be corrected. Moreover, since the lens with positive refracting power and the lens with negative refracting power assume a state close to cementation, there is little if any degradation of performance caused by the cementation, and the amount of movement of the second and third lens units G2 and G3 is decreased. The aspherical surface which is the most object-side surface of the second lens unit G2 has the effect that any aberration (spherical aberration, coma, astigmatism, or distortion) is canceled by the spherical effect of the most image-side surface of the second lens unit G2, and when both surfaces are configured to be aspherical, any aberration produced in the second lens unit G2 can be effectively suppressed. Also, the object-side surface of the fourth lens unit G4 may be configured as the aspherical surface. This somewhat improves imaging performance, but it is desirable that the aspherical surface has the aspherical function that the paraxial refracting power weakens progressively in going from the optical axis to the peripery so that negative refracting power is provided in the most peripheral portion.

Subsequently, numerical data of optical members constituting the path-bending zoom optical system of the fifth embodiment are shown below.

Numerical data 5

| | | | |
|---|---|---|---|
| $r_1 = -15.01$ (aspherical surface [1]) | $d_1 = 8.30$ | $n_{d1} = 1.5091$ | $v_{d1} = 56.2$ |
| $r_2 = \infty$ | $d_2 = 0.90$ | | |
| $r_3 = -6.59$ | $d_3 = 1.10$ | $n_{d3} = 1.7440$ | $v_{d3} = 44.8$ |
| $r_4 = 6.89$ | $d_4 = 2.89$ | $n_{d4} = 1.6989$ | $v_{d4} = 30.1$ |
| $r_5 = -16.61$ | $d_5 = D5$ | | |
| $r_6 =$ stop surface | $d_6 = 0.00$ | | |
| $r_7 = 6.80$ (aspherical surface [2]) | $d_7 = 4.36$ | $n_{d7} = 1.4875$ | $v_{d7} = 70.2$ |
| $r_8 = -14.79$ | $d_8 = 0.10$ | | |
| $r_9 = 8.99$ | $d_9 = 1.96$ | $n_{d9} = 1.4875$ | $v_{d9} = 70.2$ |
| $r_{10} = -13.39$ | $d_{10} = 1.10$ | $n_{d10} = 1.7552$ | $v_{d10} = 27.5$ |
| $r_{11} = 24.94$ (aspherical surface [3]) | $d_{11} = D11$ | | |
| $r_{12} = -30.73$ | $d_{12} = 1.30$ | $n_{d12} = 1.5174$ | $v_{d12} = 52.4$ |
| $r_{13} = 5.55$ | $d_{13} = D13$ | | |
| $r_{14} = 20.18$ | $d_{14} = 2.30$ | $n_{d14} = 1.5750$ | $v_{d14} = 41.5$ |
| $r_{15} = -7.62$ (aspherical surface [4]) | $d_{15} = 0.11$ | | |
| $r_{16} = \infty$ | $d_{16} = 1.20$ | $n_{d16} = 1.5163$ | $v_{d16} = 64.1$ |
| $r_{17} = \infty$ | $d_{17} = 1.34$ | $n_{d17} = 1.5477$ | $v_{d17} = 62.8$ |
| $r_{18} = \infty$ | $d_{18} = 0.30$ | | |
| $r_{19} = \infty$ | $d_{19} = 0.75$ | $n_{d19} = 1.5163$ | $v_{d19} = 64.1$ |
| $r_{20} = \infty$ | $d_{20} = 1.19$ | | |
| $r_{21} = \infty$ (image plane) | $d_{21} = 0.00$ | | |

Aspherical coefficients

Aspherical surface[1]

First surface $k = 0.0000$
$A_4 = 4.1390 \times 10^{-4}$   $A_6 = -1.7765 \times 10^{-6}$   $A_8 = 2.2553 \times 10^{-8}$ Aspherical surface[2]

Seventh surface $k = 0.0000$
$A_4 = -2.1132 \times 10^{-4}$   $A_6 = -4.9603 \times 10^{-6}$   $A_8 = -5.6814 \times 10^{-8}$ Aspherical surface[3]

Eleventh surface $k = 0.0000$
$A_4 = 7.6745 \times 10^{-4}$   $A_6 = 3.0761 \times 10^{-6}$   $A_8 = 9.3343 \times 10^{-7}$ -continued Numerical data 5

Aspherical surface[4]

Fifteenth surface $k = 0.0000$
$A_4 = 1.0585 \times 10^{-3}$   $A_6 = -1.4810 \times 10^{-5}$   $A_8 = 1.4562 \times 10^{-7}$ Zoom Data (Infinite Object Point)

| | Wide-angle | Middle | Telephoto |
|---|---|---|---|
| f (mm) | 5.600 | 9.699 | 16.800 |
| Fno | 2.800 | 3.850 | 5.085 |
| 2 ω (°) | 58.86 | 33.76 | 19.36 |
| D5 | 12.7002 | 7.1366 | 2.0000 |
| D11 | 3.0000 | 4.0616 | 7.6089 |
| D13 | 3.0968 | 7.5989 | 9.1882 |

SIXTH EMBODIMENT

Figure 7A:
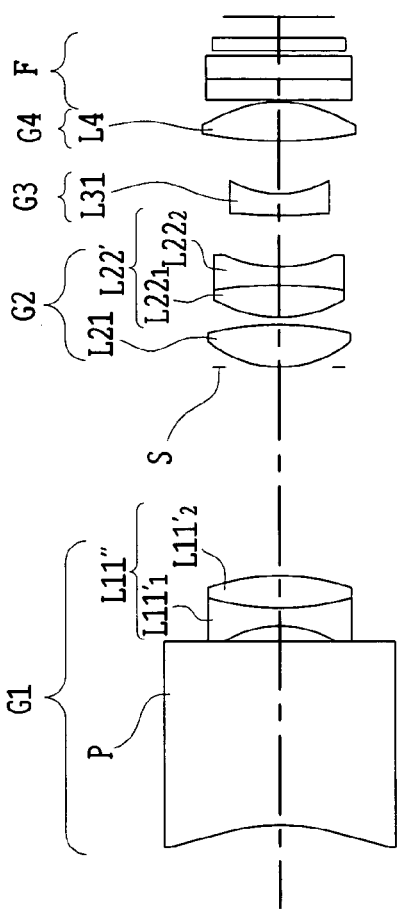
FIGS. 7A, 7B, and 7C are sectional views showing optical arrangements, developed along the optical axis, at wide-angle, middle, and telephoto positions, respectively, in focusing of the infinite object point, of a sixth embodiment of the path-bending zoom optical system according to the present invention.
Figure 7B:
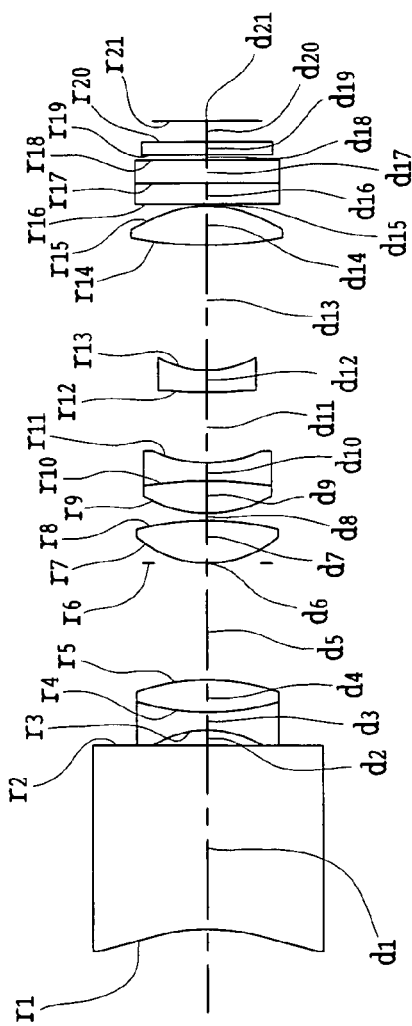
Figure 7C:
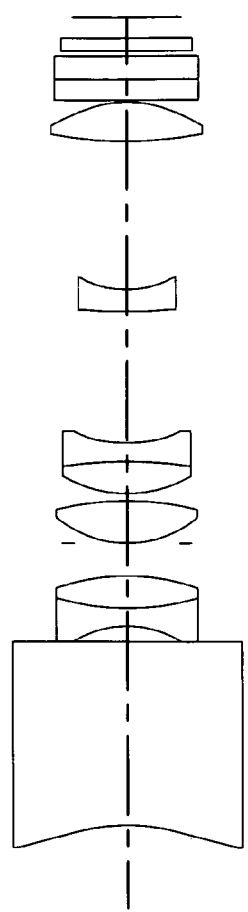

FIGS. 7A, 7B, and 7C show optical arrangements, developed along the optical axis, at wide-angle, middle, and telephoto positions, respectively, in focusing of an infinite object point, of the sixth embodiment of the path-bending zoom optical system according to the present invention.

The path-bending optical system of the sixth embodiment is constructed so that the path-bending prism P is thicker than in the fifth embodiment.

The path-bending optical system of this embodiment comprises four lens units: in order from the object side, the first lens unit G1 with negative refracting power, the second lens unit G2 with positive refracting power, the third lens unit G3 with negative refracting power, and the fourth lens unit G4 with positive refracting power. The lens units arranged on the image side of the aperture stop S are constructed as a triplet with positive, negative, and positive refracting powers.

The first lens unit G1 includes, in order from the object side, the path-bending prism P and the cemented lens L11" of the biconcave negative lens $L11_1'$ and the biconvex positive lens $L11_2'$.

The second lens unit G2 includes, in order from the object side, the biconvex positive lens L21 and the cemented lens L22' of the biconvex positive lens $L22_1$ and the biconcave negative lens $L22_2$.

The third lens unit G3 is constructed with the negative meniscus lens L31 with a concave surface directed toward the image side.

The fourth lens unit G4 is constructed with the biconvex positive lens L4.

In the sixth embodiment, when the magnification is changed in the range from the wide-angle position to the telephoto position, the first lens unit G1 is fixed, the aperture stop S and the second lens unit G2 are integrally moved toward the object side, the third lens unit G3 is moved toward the object side while widening the spacing between the second and third lens units G2 and G3, and the fourth lens unit G4 remains fixed together with the filters F.

In the sixth embodiment, when the object point approaches the imaging optical system from infinity, the third lens unit G3 is moved toward the image plane along the optical axis to thereby carry out focusing.

Aspherical surfaces are used for four ones: the entrance surface of the path-bending prism P in the first lens unit G1, the most object-side surface of the second lens unit G2, the most image-side surface of the second lens unit G2, and the image-side surface of the fourth lens unit G4.

Subsequently, numerical data of optical members constituting the path-bending zoom optical system of the sixth embodiment are shown below.

| Numerical data 6 | | | |
|---|---|---|---|
| $r_1 = -11.04$ (aspherical surface [1]) | $d_1 = 11.00$ | $n_{d1} = 1.5091$ | $\nu_{d1} = 56.2$ |
| $r_2 = \infty$ | $d_2 = 0.93$ | | |
| $r_3 = -6.28$ | $d_3 = 1.10$ | $n_{d3} = 1.7440$ | $\nu_{d3} = 44.8$ |
| $r_4 = 15.21$ | $d_4 = 1.93$ | $n_{d4} = 1.7215$ | $\nu_{d4} = 29.2$ |
| $r_5 = -12.64$ | $d_5 = D5$ | | |
| $r_6 = $ stop surface | $d_6 = 0.00$ | | |
| $r_7 = 6.01$ (aspherical surface [2]) | $d_7 = 2.52$ | $n_{d7} = 1.4875$ | $\nu_{d7} = 70.2$ |
| $r_8 = -18.19$ | $d_8 = 0.45$ | | |
| $r_9 = 7.51$ | $d_9 = 1.88$ | $n_{d9} = 1.4875$ | $\nu_{d9} = 70.2$ |
| $r_{10} = -30.25$ | $d_{10} = 1.10$ | $n_{d10} = 1.7552$ | $\nu_{d10} = 27.5$ |
| $r_{11} = 10.28$ (aspherical surface [3]) | $d_{11} = D11$ | | |
| $r_{12} = 34.25$ | $d_{12} = 1.30$ | $n_{d12} = 1.7440$ | $\nu_{d12} = 44.8$ |
| $r_{13} = 5.41$ | $d_{13} = D13$ | | |
| $r_{14} = 24.90$ | $d_{14} = 2.30$ | $n_{d14} = 1.5481$ | $\nu_{d14} = 45.8$ |
| $r_{15} = -6.29$ (aspherical surface [4]) | $d_{15} = 0.10$ | | |
| $r_{16} = \infty$ | $d_{16} = 1.20$ | $n_{d16} = 1.5163$ | $\nu_{d16} = 64.1$ |
| $r_{17} = \infty$ | $d_{17} = 1.34$ | $n_{d17} = 1.5477$ | $\nu_{d17} = 62.8$ |
| $r_{18} = \infty$ | $d_{18} = 0.30$ | | |
| $r_{19} = \infty$ | $d_{19} = 0.75$ | $n_{d19} = 1.5163$ | $\nu_{d19} = 64.1$ |
| $r_{20} = \infty$ | $d_{20} = 1.19$ | | |
| $r_{21} = \infty$ (image plane) | $d_{21} = 0.00$ | | |

Aspherical coefficients

Aspherical surface[1]

First surface $k = 0.0000$
$A_4 = 4.7928 \times 10^{-4}$   $A_6 = -1.6120 \times 10^{-6}$   $A_8 = 1.6422 \times 10^{-8}$ Aspherical surface[2]

Seventh surface $k = 0.0000$
$A_4 = -2.2255 \times 10^{-4}$   $A_6 = -7.7229 \times 10^{-6}$   $A_8 = -2.7706 \times 10^{-7}$ Aspherical surface[3]

Eleventh surface $k = 0.0000$
$A_4 = 1.5404 \times 10^{-3}$   $A_6 = 2.3369 \times 10^{-5}$   $A_8 = 3.6073 \times 10^{-6}$ Aspherical surface[4]

Fifteenth surface $k = 0.0000$
$A_4 = 1.3920 \times 10^{-3}$   $A_6 = -1.8566 \times 10^{-5}$   $A_8 = 4.1574 \times 10^{-7}$ Zoom Data (Infinite Object Point)

| | Wide-angle | Middle | Telephoto |
|---|---|---|---|
| f (mm) | 5.600 | 9.699 | 16.800 |
| Fno | 2.800 | 3.918 | 5.293 |
| 2ω (°) | 58.87 | 33.82 | 19.39 |
| D5 | 12.5077 | 7.0582 | 2.0000 |
| D11 | 3.0000 | 4.1396 | 7.8858 |
| D13 | 3.1015 | 7.4115 | 8.7234 |

SEVENTH EMBODIMENT

FIGS. 8A, 8B, and 8C show optical arrangements, developed along the optical axis, at wide-angle, middle, and telephoto positions, respectively, in focusing of an infinite object point, of the seventh embodiment of the path-bending zoom optical system according to the present invention.

The path-bending optical system of the seventh embodiment is constructed so that the aspherical surface at the stop surface is excluded from the arrangement of the fifth embodiment. That is, the path-bending optical system of this embodiment comprises four lens units: in order from the object side, the first lens unit G1 with negative refracting power, the second lens unit G2 with positive refracting power, the third lens unit G3 with negative refracting power, and the fourth lens unit G4 with positive refracting power. The lens units arranged on the image side of the aperture stop S are constructed as a triplet with positive, negative, and positive refracting powers.

The first lens unit G1 includes, in order from the object side, the path-bending prism P and the cemented lens L11″ of the biconcave negative lens L11$_1$' and the biconvex positive lens L11$_2$'.

The second lens unit G2 includes, in order from the object side, the biconvex positive lens L21 and the cemented lens L22' of the biconvex positive lens L22$_1$ and the biconcave negative lens L22$_2$.

The third lens unit G3 has the negative meniscus lens L31 with a concave surface directed toward the image side.

The fourth lens unit G4 is constructed with the biconvex positive lens L4.

In the seventh embodiment, when the magnification is changed in the range from the wide-angle position to the telephoto position, the first lens unit G1 is fixed, the aperture stop S and the second lens unit G2 are integrally moved toward the object side, the third lens unit G3 is moved toward the object side while widening the spacing between the second and third lens units G2 and G3, and the fourth lens unit G4 remains fixed together with the filters F.

In the seventh embodiment, when the object point approaches the imaging optical system from infinity, the third lens unit G3 is moved toward the image plane along the optical axis to thereby carry out focusing.

Aspherical surfaces are used for three ones: the entrance surface of the path-bending prism P in the first lens unit G1, the most image-side surface of the second lens unit G2, and the image-side surface of the fourth lens unit G4.

Subsequently, numerical data of optical members constituting the path-bending zoom optical system of the seventh embodiment are shown below.

| Numerical data 7 | | | |
|---|---|---|---|
| $r_1 = -14.09$ (aspherical surface [1]) | $d_1 = 8.30$ | $n_{d1} = 1.5091$ | $\nu_{d1} = 56.2$ |
| $r_2 = \infty$ | $d_2 = 0.99$ | | |

-continued

Numerical data 7

| | | | |
|---|---|---|---|
| $r_3 = -10.05$ | $d_3 = 1.10$ | $n_{d3} = 1.7440$ | $v_{d3} = 44.8$ |
| $r_4 = 6.81$ | $d_4 = 4.47$ | $n_{d4} = 1.6889$ | $v_{d4} = 31.1$ |
| $r_5 = -42.22$ | $d_5 = D5$ | | |
| $r_6 = $ stop surface | $d_6 = 0.00$ | | |
| $r_7 = 6.21$ | $d_7 = 2.33$ | $n_{d7} = 1.4875$ | $v_{d7} = 70.2$ |
| $r_8 = -31.34$ | $d_8 = 0.10$ | | |
| $r_9 = 8.25$ | $d_9 = 2.19$ | $n_{d9} = 1.4875$ | $v_{d9} = 70.2$ |
| $r_{10} = -10.30$ | $d_{10} = 1.10$ | $n_{d10} = 1.7234$ | $v_{d10} = 38.0$ |
| $r_{11} = 37.95$ (aspherical surface [2]) | $d_{11} = D 11$ | | |
| $r_{12} = 22.96$ | $d_{12} = 1.30$ | $n_{d12} = 1.7552$ | $v_{d12} = 27.5$ |
| $r_{13} = 4.64$ | $d_{13} = D13$ | | |
| $r_{14} = 43.75$ | $d_{14} = 2.30$ | $n_{d14} = 1.6200$ | $v_{d14} = 36.3$ |
| $r_{15} = -6.85$ (aspherical surface [3]) | $d_{15} = 0.38$ | | |
| $r_{16} = \infty$ | $d_{16} = 1.20$ | $n_{d16} = 1.5163$ | $v_{d16} = 64.1$ |
| $r_{17} = \infty$ | $d_{17} = 1.34$ | $n_{d17} = 1.5477$ | $v_{d17} = 62.8$ |
| $r_{18} = \infty$ | $d_{18} = 0.30$ | | |
| $r_{19} = \infty$ | $d_{19} = 0.75$ | $n_{d19} = 1.5163$ | $v_{d19} = 64.1$ |
| $r_{20} = \infty$ | $d_{20} = 1.19$ | | |
| $r_{21} = \infty$ (image plane) | $d_{21} = 0.00$ | | |

Aspherical coefficients

Aspherical surface [1]

First surface $k = 0.0000$
$A_4 = 3.0115 \times 10^{-4}$  $A_6 = -8.8229 \times 10^{-7}$ Aspherical surface [2]

Eleventh surface $k = 0.0000$
$A_4 = 1.2618 \times 10^{-3}$  $A_6 = 9.0715 \times 10^{-6}$  $A_8 = 3.3265 \times 10^{-6}$ Aspherical surface [3]

Fifteenth surface $k = 0.0000$
$A_4 = 1.1349 \times 10^{-3}$  $A_6 = -2.0536 \times 10^{-5}$  $A_8 = 3.9088 \times 10^{-7}$ Zoom Data (Infinite Object Point)

| | Wide-angle | Middle | Telephoto |
|---|---|---|---|
| f (mm) | 5.600 | 9.699 | 16.800 |
| Fno | 2.800 | 3.892 | 5.202 |
| 2 ω (°) | 58.88 | 33.64 | 19.39 |
| D5 | 12.5621 | 7.0736 | 2.0000 |
| D11 | 3.0000 | 3.9417 | 6.8781 |
| D13 | 3.0831 | 7.6299 | 9.7671 |

EIGHTH EMBODIMENT

Figure 9A:
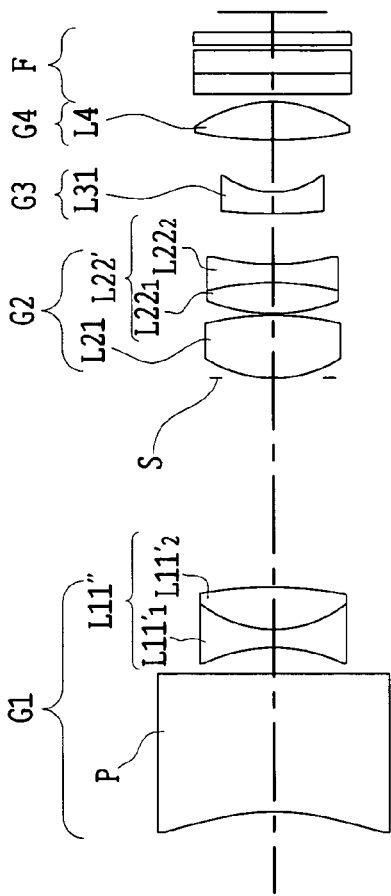
FIGS. 9A, 9B, and 9C are sectional views showing optical arrangements, developed along the optical axis, at wide-angle, middle, and telephoto positions, respectively, in focusing of the infinite object point, of an eighth embodiment of the path-bending zoom optical system according to the present invention.
Figure 9B:
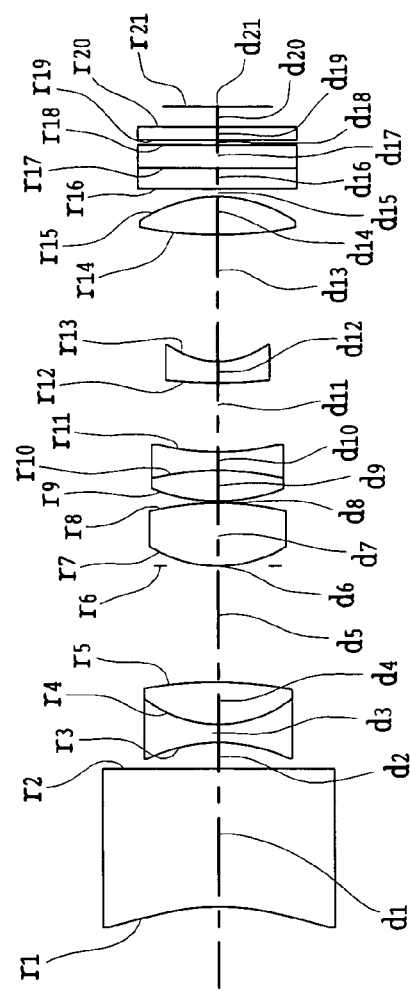
Figure 9C:
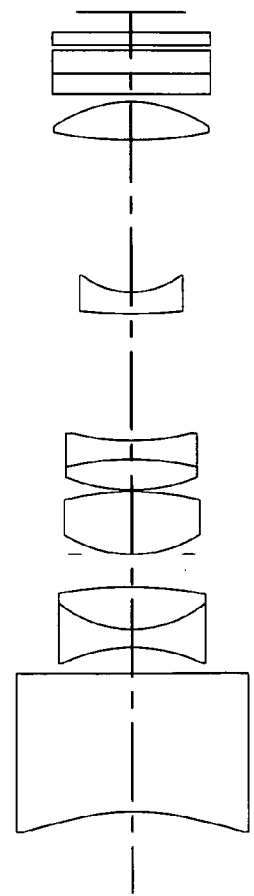

FIGS. 9A, 9B, and 9C show optical arrangements, developed along the optical axis, at wide-angle, middle, and telephoto positions, respectively, in focusing of an infinite object point, of the eighth embodiment of the path-bending zoom optical system according to the present invention.

The path-bending optical system of the eighth embodiment is constructed so that the aspherical surface which is the entrance surface of the path-bending prism P in the fifth embodiment has no inflection point. That is, the path-bending optical system of this embodiment comprises four lens units: in order from the object side, the first lens unit G1 with negative refracting power, the second lens unit G2 with positive refracting power, the third lens unit G3 with negative refracting power, and the fourth lens unit G4 with positive refracting power. The lens units arranged on the image side of the aperture stop S are constructed as a triplet with positive, negative, and positive refracting powers.

The first lens unit G1 includes, in order from the object side, the path-bending prism P and the cemented lens L11'' of the biconcave negative lens L11$_1$' and the biconvex positive lens L11$_2$'.

The second lens unit G2 includes, in order from the object side, the biconvex positive lens L21 and the cemented lens L22' of the biconvex positive lens L22$_1$ and the biconcave negative lens L22$_2$.

The third lens unit G3 has the negative meniscus lens L31 with a concave surface directed toward the image side.

The fourth lens unit G4 is constructed with the biconvex positive lens L4.

In the eighth embodiment, when the magnification is changed in the range from the wide-angle position to the telephoto position, the first lens unit G1 is fixed, the aperture stop S and the second lens unit G2 are integrally moved toward the object side, the third lens unit G3 is moved toward the object side while widening the spacing between the second and third lens units G2 and G3, and the fourth lens unit G4 remains fixed together with the filters F.

In the eighth embodiment, when the object point approaches the imaging optical system from infinity, the third lens unit G3 is moved toward the image plane along the optical axis to thereby carry out focusing.

Aspherical surfaces are used for four ones: the entrance surface of the path-bending prism P in the first lens unit G1, the most object-side surface of the second lens unit G2, the most image-side surface of the second lens unit G2, and the image-side surface of the fourth lens unit G4.

Subsequently, numerical data of optical members constituting the path-bending zoom optical system of the eighth embodiment are shown below.

Numerical data 8

| | | | |
|---|---|---|---|
| $r_1 = -12.52$ (aspherical surface [1]) | $d_1 = 8.30$ | $n_{d1} = 1.5091$ | $v_{d1} = 56.2$ |
| $r_2 = \infty$ | $d_2 = 1.58$ | | |
| $r_3 = -9.42$ | $d_3 = 1.10$ | $n_{d3} = 1.7440$ | $v_{d3} = 44.8$ |
| $r_4 = 6.49$ | $d_4 = 2.58$ | $n_{d4} = 1.6989$ | $v_{d4} = 30.1$ |
| $r_5 = -27.57$ | $d_5 = D5$ | | |
| $r_6 = $ stop surface | $d_6 = 0.00$ | | |
| $r_7 = 6.84$ (aspherical surface [2]) | $d_7 = 3.82$ | $n_{d7} = 1.4875$ | $v_{d7} = 70.2$ |
| $r_8 = -16.44$ | $d_8 = 0.10$ | | |
| $r_9 = 10.51$ | $d_9 = 1.82$ | $n_{d9} = 1.6204$ | $v_{d9} = 60.3$ |
| $r_{10} = -16.81$ | $d_{10} = 1.10$ | $n_{d10} = 1.7552$ | $v_{d10} = 27.5$ |
| $r_{11} = 17.76$ (aspherical surface [3]) | $d_{11} = D11$ | | |
| $r_{12} = 28.57$ | $d_{12} = 1.30$ | $n_{d12} = 1.6667$ | $v_{d12} = 48.3$ |
| $r_{13} = 4.68$ | $d_{13} = D13$ | | |
| $r_{14} = 22.61$ | $d_{14} = 2.30$ | $n_{d14} = 1.5174$ | $v_{d14} = 52.4$ |
| $r_{15} = -6.30$ (aspherical surface [4]) | $d_{15} = 0.44$ | | |
| $r_{16} = \infty$ | $d_{16} = 1.20$ | $n_{d16} = 1.5163$ | $v_{d16} = 64.1$ |
| $r_{17} = \infty$ | $d_{17} = 1.34$ | $n_{d17} = 1.5477$ | $v_{d17} = 62.8$ |
| $r_{18} = \infty$ | $d_{18} = 0.30$ | | |
| $r_{19} = \infty$ | $d_{19} = 0.75$ | $n_{d19} = 1.5163$ | $v_{d19} = 64.1$ |
| $r_{20} = \infty$ | $d_{20} = 1.19$ | | |
| $r_{21} = \infty$ (image plane) | $d_{21} = 0.00$ | | |

-continued

Numerical data 8

Aspherical coefficients

Aspherical surface [1]

First surface k = 0.0000
$A_4 = 3.5644 \times 10^{-4}$    $A_6 = -9.2420 \times 10^{-7}$ Aspherical surface [2]

Seventh surface k = 0.0000
$A_4 = -2.5223 \times 10^{-4}$    $A_6 = -4.8904 \times 10^{-6}$    $A_8 = -4.5376 \times 10^{-8}$ Aspherical surface [3]

Eleventh surface k = 0.0000
$A_4 = 7.1900 \times 10^{-4}$    $A_6 = 3.9484 \times 10^{-6}$    $A_8 = 8.4844 \times 10^{-7}$ Aspherical surface [4]

Fifteenth surface k = 0.0000
$A_4 = 1.3799 \times 10^{-3}$    $A_6 = -2.3288 \times 10^{-5}$    $A_8 = 5.4928 \times 10^{-7}$ Zoom Data (Infinite Object Point)

|  | Wide-angle | Middle | Telephoto |
| --- | --- | --- | --- |
| f (mm) | 5.600 | 9.699 | 16.800 |
| Fno | 2.800 | 3.850 | 5.085 |
| 2 ω (°) | 58.87 | 33.79 | 19.40 |
| D5 | 12.6672 | 7.0869 | 2.000 |
| D11 | 3.0000 | 4.1455 | 7.6837 |
| D13 | 3.0928 | 7.5276 | 9.0763 |

NINTH EMBODIMENT

FIGS. 10A, 10B, and 10C show optical arrangements, developed along the optical axis, at wide-angle, middle, and telephoto positions, respectively, in focusing of an infinite object point, of the ninth embodiment of the path-bending zoom optical system according to the present invention.

The path-bending optical system of the ninth embodiment is constructed so that an aspherical surface is added to the arrangement of the fifth embodiment. That is, the path-bending optical system of this embodiment comprises four lens units: in order from the object side, the first lens unit G1 with negative refracting power, the second lens unit G2 with positive refracting power, the third lens unit G3 with negative refracting power, and the fourth lens unit G4 with positive refracting power. The lens units arranged on the image side of the aperture stop S are constructed as a triplet with positive, negative, and positive refracting powers.

The first lens unit G1 includes, in order from the object side, the path-bending prism P and the cemented lens L11" of the biconcave negative lens L11$_1$' and the biconvex positive lens L11$_2$'.

The second lens unit G2 includes, in order from the object side, the biconvex positive lens L21 and the cemented lens L22' of the biconvex positive lens L22$_1$ and the biconcave negative lens L22$_2$.

The third lens unit G3 is constructed with the biconcave negative lens L31'.

The fourth lens unit G4 is constructed with the biconvex positive lens L4.

In the ninth embodiment, when the magnification is changed in the range from the wide-angle position to the telephoto position, the first lens unit G1 is fixed, the aperture stop S and the second lens unit G2 are integrally moved toward the object side, the third lens unit G3 is moved toward the object side while widening the spacing between the second and third lens units G2 and G3, and the fourth lens unit G4 remains fixed together with the filters F.

In the ninth embodiment, when the object point approaches the imaging optical system from infinity, the third lens unit G3 is moved toward the image plane along the optical axis to thereby carry out focusing.

Aspherical surfaces are used for five ones: the entrance surface of the path-bending prism P in the first lens unit G1, the object-side surface of the negative lens L11$_1$' in the first lens unit G1, the most object-side surface of the second lens unit G2, the most image-side surface of the second lens unit G2, and the image-side surface of the fourth lens unit G4.

Subsequently, numerical data of optical members constituting the path-bending zoom optical system of the ninth embodiment are shown below.

Numerical data 9

| | | | |
| --- | --- | --- | --- |
| $r_1 = -14.95$ (aspherical surface [1]) | $d_1 = 8.30$ | $n_{d1} = 1.5091$ | $v_{d1} = 56.2$ |
| $r_2 = \infty$ | $d_2 = 0.95$ | | |
| $r_3 = -5.99$ (aspherical surface [2]) | $d_3 = 1.10$ | $n_{d3} = 1.7440$ | $v_{d3} = 44.8$ |
| $r_4 = 7.13$ | $d_4 = 2.31$ | $n_{d4} = 1.6989$ | $v_{d4} = 30.1$ |
| $r_5 = -13.83$ | $d_5 = D5$ | | |
| $r_6 =$ stop surface | $d_6 = 0.00$ | | |
| $r_7 = 7.08$ (aspherical surface [3]) | $d_7 = 4.85$ | $n_{d7} = 1.4875$ | $v_{d7} = 70.2$ |
| $r_8 = -14.63$ | $d_8 = 0.10$ | | |
| $r_9 = 8.21$ | $d_9 = 2.01$ | $n_{d9} = 1.4875$ | $v_{d9} = 70.2$ |
| $r_{10} = -13.78$ | $d_{10} = 1.10$ | $n_{d10} = 1.7552$ | $v_{d10} = 27.5$ |
| $r_{11} = 20.22$ (aspherical surface [4]) | $d_{11} = D11$ | | |
| $r_{12} = -42.57$ | $d_{12} = 1.30$ | $n_{d12} = 1.5174$ | $v_{d12} = 52.4$ |
| $r_{13} = 5.57$ | $d_{13} = D13$ | | |
| $r_{14} = 16.84$ | $d_{14} = 2.30$ | $n_{d14} = 1.5750$ | $v_{d14} = 41.5$ |
| $r_{15} = -8.09$ (aspherical surface [5]) | $d_{15} = 0.11$ | | |
| $r_{16} = \infty$ | $d_{16} = 1.20$ | $n_{d16} = 1.5163$ | $v_{d16} = 64.1$ |
| $r_{17} = \infty$ | $d_{17} = 1.34$ | $n_{d17} = 1.5477$ | $v_{d17} = 62.8$ |
| $r_{18} = \infty$ | $d_{18} = 0.30$ | | |
| $r_{19} = \infty$ | $d_{19} = 0.75$ | $n_{d19} = 1.5163$ | $v_{d19} = 64.1$ |
| $r_{20} = \infty$ | $d_{20} = 1.19$ | | |
| $r_{21} = \infty$ (image plane) | $d_{21} = 0.00$ | | |

Aspherical coefficients

Aspherical surface [1]

First surface k = 0.0000
$A_4 = 4.7371 \times 10^{-4}$    $A_6 = -2.6614 \times 10^{-6}$    $A_8 = 2.9454 \times 10^{-8}$ Aspherical surface [2]

Third embodiment k = 0.0000
$A_4 = -2.5676 \times 10^{-6}$    $A_6 = 7.7820 \times 10^{-6}$    $A_8 = 6.0244 \times 10^{-8}$ Aspherical surface [3]

Seventh surface k = 0.0000
$A_4 = -1.8388 \times 10^{-4}$    $A_6 = -4.5929 \times 10^{-6}$    $A_8 = -4.2610 \times 10^{-8}$ -continued Numerical data 9

Aspherical surface [4]

Eleventh surface k = 0.0000
$A_4 = 7.3720 \times 10^{-4}$   $A_6 = 4.4404 \times 10^{-6}$   $A_8 = 6.3359 \times 10^{-7}$ Aspherical surface [5]

Fifteenth surface k = 0.0000
$A_4 = 9.4980 \times 10^{-4}$   $A_6 = -1.6010 \times 10^{-5}$   $A_8 = 2.0355 \times 10^{-7}$ Zoom Data (Infinite Object Point)

|  | Wide-angle | Middle | Telephoto |
|---|---|---|---|
| f (mm) | 5.600 | 9.699 | 16.800 |
| Fno | 2.800 | 3.850 | 5.085 |
| 2 ω (°) | 58.58 | 33.81 | 19.37 |
| D5 | 12.6628 | 7.1073 | 2.0000 |
| D11 | 3.0000 | 4.2914 | 8.5836 |
| D13 | 3.1077 | 7.3718 | 8.1869 |

TENTH EMBODIMENT

Figure 11A:
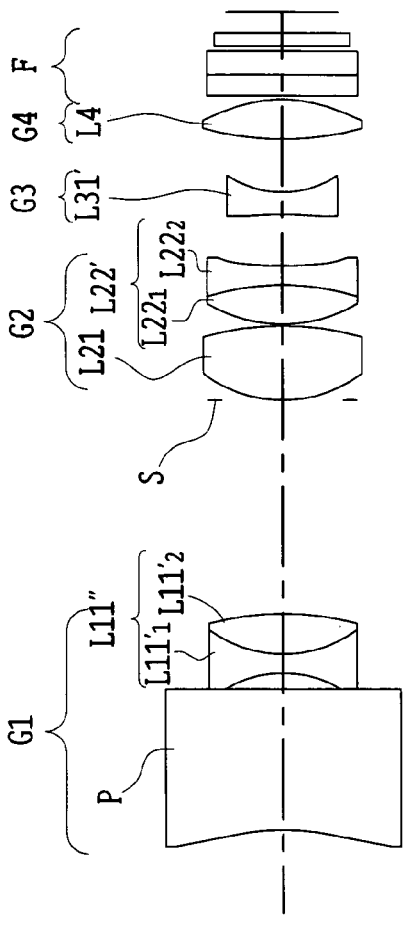
FIGS. 11A, 11B, and 11C are sectional views showing optical arrangements, developed along the optical axis, at wide-angle, middle, and telephoto positions, respectively, in focusing of the infinite object point, of a second embodiment of the path-bending zoom optical system according to the present invention.
Figure 11B:
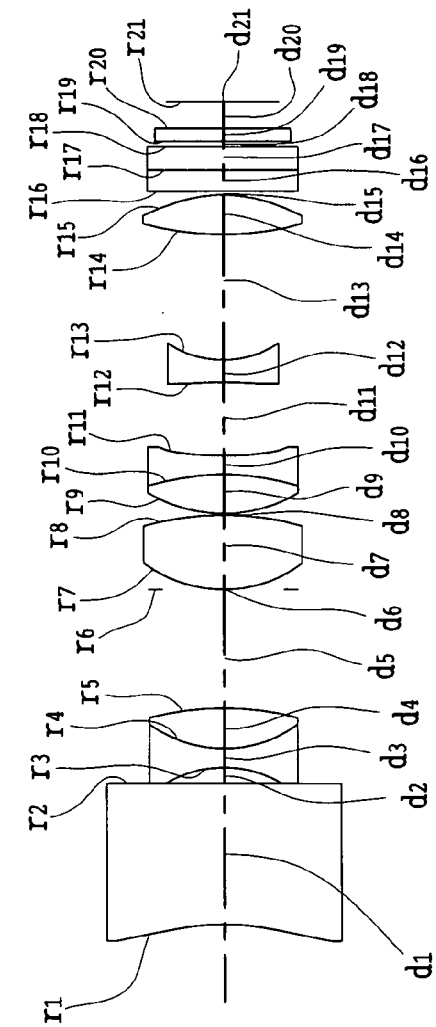
Figure 11C:
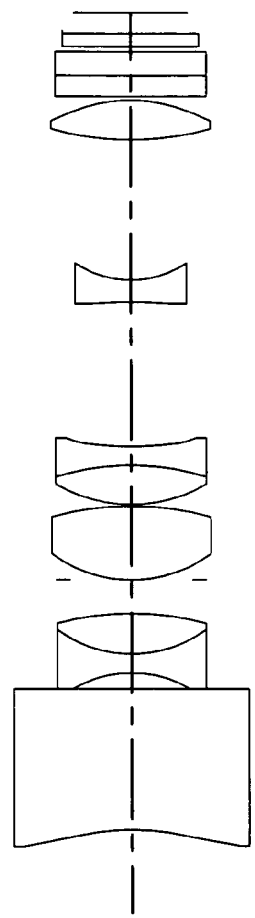

FIGS. 11A, 11B, and 11C show optical arrangements, developed along the optical axis, at wide-angle, middle, and telephoto positions, respectively, in focusing of an infinite object point, of the tenth embodiment of the path-bending zoom optical system according to the present invention.

The path-bending optical system of the tenth embodiment is constructed so that the F-number in the arrangement of the fifth embodiment is reduced. That is, the path-bending optical system of this embodiment comprises four lens units: in order from the object side, the first lens unit G1 with negative refracting power, the second lens unit G2 with positive refracting power, the third lens unit G3 with negative refracting power, and the fourth lens unit G4 with positive refracting power. The lens units arranged on the image side of the aperture stop S are constructed as a triplet with positive, negative, and positive refracting powers.

The first lens unit G1 includes, in order from the object side, the path-bending prism P and the cemented lens L11" of the biconcave negative lens $L11_1'$ and the biconvex positive lens $L11_2'$.

The second lens unit G2 includes, in order from the object side, the biconvex positive lens L21 and the cemented lens L22' of the biconvex positive lens $L22_1$ and the biconcave negative lens $L22_2$.

The third lens unit G3 is constructed with the biconcave negative lens L31'.

The fourth lens unit G4 is constructed with the biconvex positive lens L4.

In the tenth embodiment, when the magnification is changed in the range from the wide-angle position to the telephoto position, the first lens unit G1 is fixed, the aperture stop S and the second lens unit G2 are integrally moved toward the object side, the third lens unit G3 is moved toward the object side while widening the spacing between the second and third lens units G2 and G3, and the fourth lens unit G4 remains fixed together with the filters F.

In the tenth embodiment, when the object point approaches the imaging optical system from infinity, the third lens unit G3 is moved toward the image plane along the optical axis to thereby carry out focusing.

Aspherical surfaces are used for five ones: the entrance surface of the path-bending prism P in the first lens unit G1, the object-side surface of the negative lens $L11_1'$ in the first lens unit G1, the most object-side surface of the second lens unit G2, the most image-side surface of the second lens unit G2, and the image-side surface of the fourth lens unit G4.

Subsequently, numerical data of optical members constituting the path-bending zoom optical system of the tenth embodiment are shown below.

Numerical data 10

| $r_1 = -12.60$ (aspherical surface [1]) | $d_1 = 8.30$ | $n_{d1} = 1.5091$ | $\nu_{d1} = 56.2$ |
|---|---|---|---|
| $r_2 = \infty$ | $d_2 = 0.99$ | | |
| $r_3 = -6.55$ (aspherical surface [2]) | $d_3 = 1.10$ | $n_{d3} = 1.7200$ | $\nu_{d3} = 43.7$ |
| $r_4 = 7.04$ | $d_4 = 2.40$ | $n_{d4} = 1.6989$ | $\nu_{d4} = 30.1$ |
| $r_5 = -16.71$ | $d_5 = D5$ | | |
| $r_6 =$ stop surface | $d_6 = 0.00$ | | |
| $r_7 = 6.99$ (aspherical surface [3]) | $d_7 = 4.41$ | $n_{d7} = 1.4875$ | $\nu_{d7} = 70.2$ |
| $r_8 = -17.03$ | $d_8 = 0.10$ | | |
| $r_9 = 8.46$ | $d_9 = 2.28$ | $n_{d9} = 1.4875$ | $\nu_{d9} = 70.2$ |
| $r_{10} = -14.46$ | $d_{10} = 1.10$ | $n_{d10} = 1.7552$ | $\nu_{d10} = 27.5$ |
| $r_{11} = 23.37$ (aspherical surface [4]) | $d_{11} = D11$ | | |
| $r_{12} = -39.21$ | $d_{12} = 1.30$ | $n_{d12} = 1.5317$ | $\nu_{d12} = 48.8$ |
| $r_{13} = 5.50$ | $d_{13} = D13$ | | |
| $r_{14} = 16.93$ | $d_{14} = 2.30$ | $n_{d14} = 1.5481$ | $\nu_{d14} = 45.8$ |
| $r_{15} = -7.38$ (aspherical surface [5]) | $d_{15} = 0.19$ | | |
| $r_{16} = \infty$ | $d_{16} = 1.20$ | $n_{d16} = 1.5163$ | $\nu_{d16} = 64.1$ |
| $r_{17} = \infty$ | $d_{17} = 1.34$ | $n_{d17} = 1.5477$ | $\nu_{d17} = 62.8$ |
| $r_{18} = \infty$ | $d_{18} = 0.30$ | | |
| $r_{19} = \infty$ | $d_{19} = 0.75$ | $n_{d19} = 1.5163$ | $\nu_{d19} = 64.1$ |
| $r_{20} = \infty$ | $d_{20} = 1.19$ | | |
| $r_{21} = \infty$ (image plane) | $d_{21} = 0.00$ | | |

Aspherical coefficients

Aspherical surface [1]

First surface k = 0.0000
$A_4 = 5.2950 \times 10^{-4}$   $A_6 = -2.6805 \times 10^{-6}$   $A_8 = 2.7734 \times 10^{-8}$ Aspherical surface [2]

Third surface k = 0.0000
$A_4 = -1.4071 \times 10^{-4}$   $A_6 = 3.4928 \times 10^{-6}$   $A_8 = -9.3216 \times 10^{-8}$ Aspherical surface [3]

Seventh surface k = 0.0000
$A_4 = -1.6185 \times 10^{-4}$   $A_6 = -3.6336 \times 10^{-6}$   $A_8 = -7.5749 \times 10^{-8}$ Aspherical surface [4]

Eleventh surface k = 0.0000
$A_4 = 8.2266 \times 10^{-4}$   $A_6 = 5.0436 \times 10^{-6}$   $A_8 = 9.0937 \times 10^{-7}$ Aspherical surface [5]

Fifteenth surface k = 0.0000
$A_4 = 1.0804 \times 10^{-3}$   $A_6 = -1.5197 \times 10^{-5}$   $A_8 = 1.9078 \times 10^{-7}$ Zoom Data (Infinite Object Point)

|  | Wide-angle | Middle | Telephoto |
|---|---|---|---|
| f (mm) | 5.600 | 9.699 | 16.800 |
| Fno | 2.465 | 3.395 | 4.495 |
| 2 ω (°) | 58.87 | 33.85 | 19.39 |
| D5 | 12.6391 | 7.0815 | 2.0000 |
| D11 | 3.0000 | 4.3406 | 8.5681 |
| D13 | 3.0998 | 7.3169 | 8.1709 |

ELEVENTH EMBODIMENT

Figure 12A:
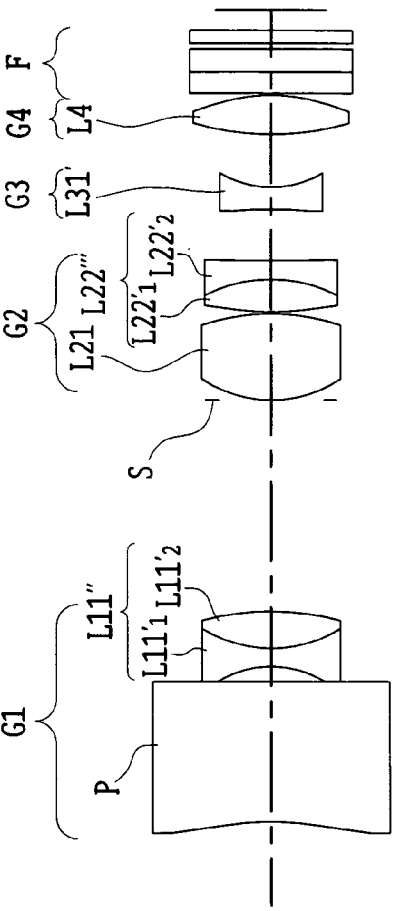
FIGS. 12A, 12B, and 12C are sectional views showing optical arrangements, developed along the optical axis, at wide-angle, middle, and telephoto positions, respectively, in focusing of the infinite object point, of an eleventh embodiment of the path-bending zoom optical system according to the present invention.
Figure 12B:
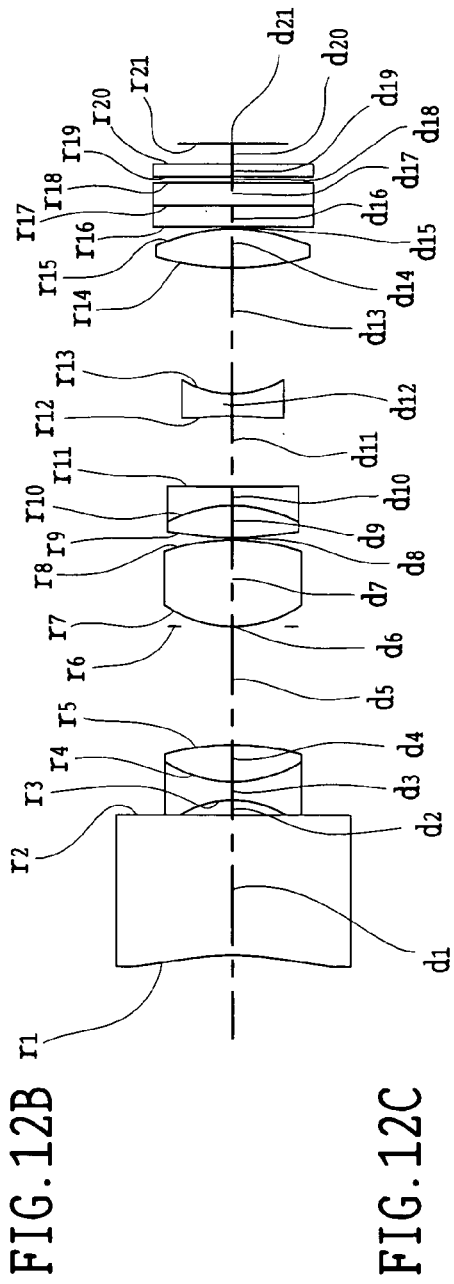
Figure 12C:
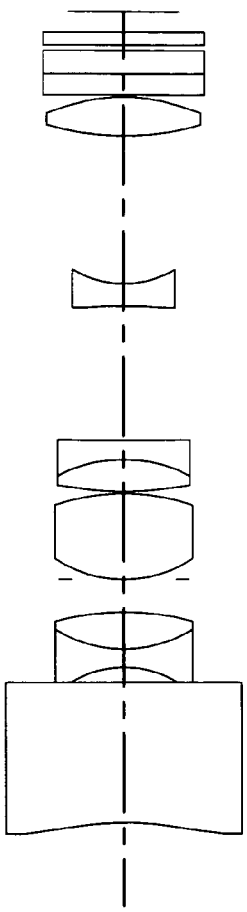

FIGS. 12A, 12B, and 12C show optical arrangements, developed along the optical axis, at wide-angle, middle, and telephoto positions, respectively, in focusing of an infinite object point, of the eleventh embodiment of the path-bending zoom optical system according to the present invention.

The path-bending optical system of the eleventh embodiment is chiefly constructed so that aspherical surfaces are added to the arrangement of the fifth embodiment. That is, the path-bending optical system of this embodiment comprises four lens units: in order from the object side, the first lens unit G1 with negative refracting power, the second lens unit G2 with positive refracting power, the third lens unit G3 with negative refracting power, and the fourth lens unit G4 with positive refracting power. The lens units arranged on the image side of the aperture stop S are constructed as a triplet with positive, negative, and positive refracting powers.

The first lens unit G1 includes, in order from the object side, the path-bending prism P and the cemented lens L11″ of the biconcave negative lens L11$_1$' and the biconvex positive lens L11$_2$'.

The second lens unit G2 includes, in order from the object side, the biconvex positive lens L21 and a cemented lens L22‴ of a biconvex positive lens L22$_1$' and a negative meniscus lens L22$_2$' with a concave surface directed toward the object side.

The third lens unit G3 is constructed with the biconcave negative lens L31'.

The fourth lens unit G4 is constructed with the biconvex positive lens L4.

In the eleventh embodiment, when the magnification is changed in the range from the wide-angle position to the telephoto position, the first lens unit G1 is fixed, the aperture stop S and the second lens unit G2 are integrally moved toward the object side, the third lens unit G3 is moved toward the object side while widening the spacing between the second and third lens units G2 and G3, and the fourth lens unit G4 remains fixed together with the filters F.

In the eleventh embodiment, when the object point approaches the imaging optical system from infinity, the third lens unit G3 is moved toward the image plane along the optical axis to thereby carry out focusing.

Aspherical surfaces are used for six ones: the entrance surface of the path-bending prism P in the first lens unit G1, the object-side surface of the negative lens L11$_1$' in the first lens unit G1, the most object-side surface of the second lens unit G2, a third lens surface from the most object-side surface of the second lens unit G2, the most image-side surface of the second lens unit G2, and the image-side surface of the fourth lens unit G4.

Subsequently, numerical data of optical members constituting the path-bending zoom optical system of the eleventh embodiment are shown below.

Numerical data 11

| | | | |
|---|---|---|---|
| $r_1 = -14.81$ (aspherical surface [1]) | $d_1 = 8.30$ | $n_{d1} = 1.5091$ | $v_{d1} = 56.2$ |
| $r_2 = \infty$ | $d_2 = 0.92$ | | |
| $r_3 = -6.00$ (aspherical surface [2]) | $d_3 = 1.10$ | $n_{d3} = 1.7440$ | $v_{d3} = 44.8$ |
| $r_4 = 6.94$ | $d_4 = 2.25$ | $n_{d4} = 1.6989$ | $v_{d4} = 30.1$ |
| $r_5 = -14.39$ | $d_5 = D5$ | | |
| $r_6 =$ stop surface | $d_6 = 0.00$ | | |
| $r_7 = 6.45$ (aspherical surface [3]) | $d_7 = 5.16$ | $n_{d7} = 1.4875$ | $v_{d7} = 70.2$ |
| $r_8 = -12.14$ | $d_8 = 0.11$ | | |
| $r_9 = 14.58$ (aspherical surface [4]) | $d_9 = 1.89$ | $n_{d9} = 1.4875$ | $v_{d9} = 70.2$ |
| $r_{10} = -8.26$ | $d_{10} = 1.10$ | $n_{d10} = 1.7552$ | $v_{d10} = 27.5$ |
| $r_{11} = -345.14$ (aspherical surface [5]) | $d_{11} = D11$ | | |
| $r_{12} = -29.10$ | $d_{12} = 1.30$ | $n_{d12} = -1.5174$ | $v_{d12} = 52.4$ |
| $r_{13} = 5.37$ | $d_{13} = D13$ | | |
| $r_{14} = 15.38$ | $d_{14} = 2.30$ | $n_{d14} = 1.5750$ | $v_{d14} = 41.5$ |
| $r_{15} = -8.98$ (aspherical surface [6]) | $d_{15} = 0.10$ | | |
| $r_{16} = \infty$ | $d_{16} = 1.20$ | $n_{d16} = 1.5163$ | $v_{d16} = 64.1$ |
| $r_{17} = \infty$ | $d_{17} = 1.34$ | $n_{d17} = 1.5477$ | $v_{d17} = 62.8$ |
| $r_{18} = \infty$ | $d_{18} = 0.30$ | | |
| $r_{19} = \infty$ | $d_{19} = 0.75$ | $n_{d19} = 1.5163$ | $v_{d19} = 64.1$ |
| $r_{20} = \infty$ | $d_{20} = 1.19$ | | |
| $r_{21} = \infty$ (image plane) | $d_{21} = 0.00$ | | |

Aspherical coefficients

Aspherical surface [1]

First surface $k = 0.0000$
$A_4 = 5.2966 \times 10^{-4}$  $A_6 = -3.2275 \times 10^{-6}$  $A_8 = 3.2445 \times 10^{-8}$ Aspherical surface [2]

Third surface $k = 0.0000$
$A_4 = -7.8501 \times 10^{-5}$  $A_6 = 8.0603 \times 10^{-6}$  $A_8 = 1.1573 \times 10^{-7}$ Aspherical surface [3]

Seventh surface $k = 0.0000$
$A_4 = -1.9690 \times 10^{-4}$  $A_6 = -8.8848 \times 10^{-6}$  $A_8 = -6.6063 \times 10^{-8}$ Aspherical surface [4]

Ninth surface $k = 0.0000$
$A_4 = -6.8429 \times 10^{-4}$  $A_6 = 1.4970 \times 10^{-6}$ Aspherical surface [5]

Eleventh surface $k = 0.0000$
$A_4 = 1.3869 \times 10^{-5}$  $A_6 = 1.6034 \times 10^{-5}$  $A_8 = 2.1760 \times 10^{-7}$ Aspherical surface [6]

Fifteenth surface $k = 0.0000$
$A_4 = 7.7082 \times 10^{-4}$  $A_6 = -1.4520 \times 10^{-5}$  $A_8 = 1.6931 \times 10^{-7}$ Zoom Data (Infinite Object Point)

|  | Wide-angle | Middle | Telephoto |
|---|---|---|---|
| f (mm) | 5.600 | 9.699 | 16.800 |
| Fno | 2.800 | 3.838 | 5.029 |
| 2 ω (°) | 58.10 | 33.93 | 19.53 |
| D5 | 12.5913 | 7.0773 | 2.0000 |
| D11 | 3.0000 | 4.1993 | 8.0212 |
| D13 | 3.0935 | 7.4081 | 8.6636 |

TWELFTH EMBODIMENT

Figure 13A:
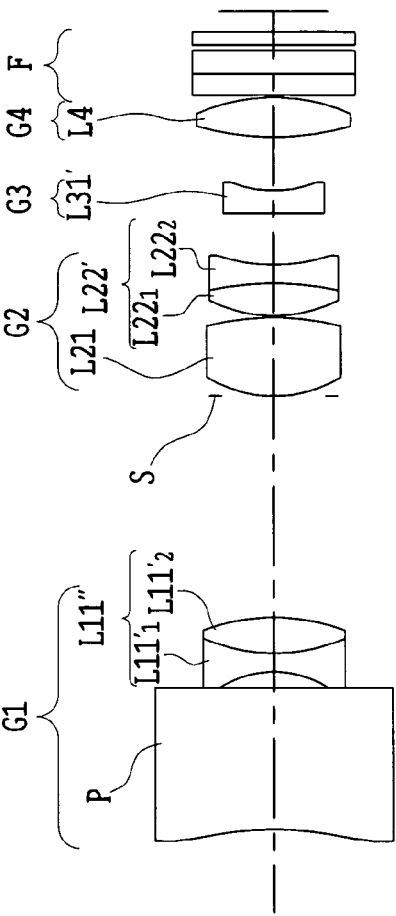
FIGS. 13A, 13B, and 13C are sectional views showing optical arrangements, developed along the optical axis, at wide-angle, middle, and telephoto positions, respectively, in focusing of the infinite object point, of a twelfth embodiment of the path-bending zoom optical system according to the present invention.
Figure 13B:
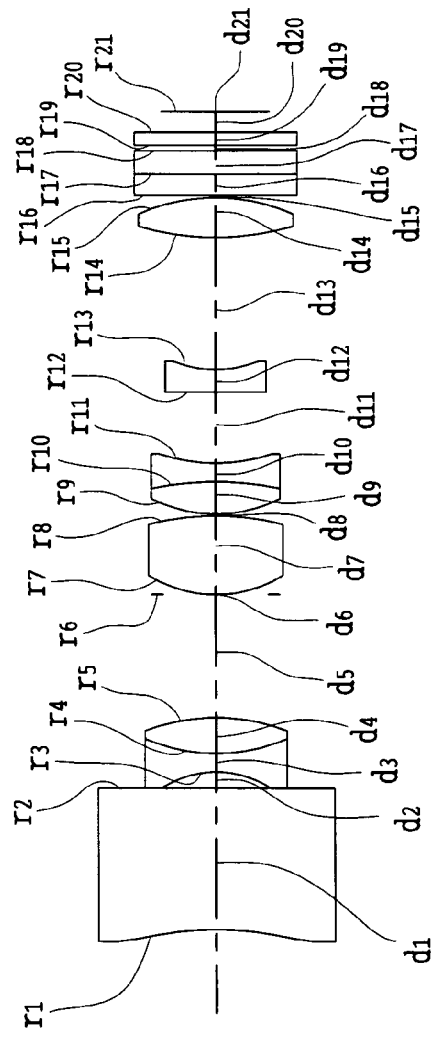
Figure 13C:
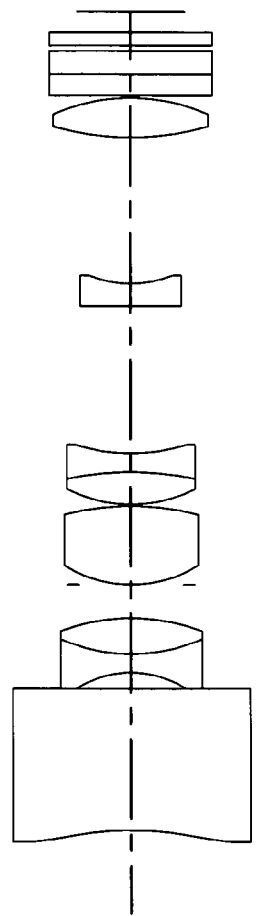

FIGS. 13A, 13B, and 13C show optical arrangements, developed along the optical axis, at wide-angle, middle, and telephoto positions, respectively, in focusing of an infinite object point, of the twelfth embodiment of the path-bending zoom optical system according to the present invention.

The path-bending optical system of the twelfth embodiment is constructed so that aspherical surfaces are added to the arrangement of the fifth embodiment. That is, the path-bending optical system of this embodiment comprises four lens units: in order from the object side, the first lens unit G1 with negative refracting power, the second lens unit G2 with positive refracting power, the third lens unit G3 with negative refracting power, and the fourth lens unit G4 with positive refracting power. The lens units arranged on the image side of the aperture stop S are constructed as a triplet with positive, negative, and positive refracting powers.

The first lens unit G1 includes, in order from the object side, the path-bending prism P and the cemented lens L11″ of the biconcave negative lens $L11_1'$ and the biconvex positive lens $L11_2'$.

The second lens unit G2 includes, in order from the object side, the biconvex positive lens L21 and the cemented lens L22′ of the biconvex positive lens $L22_1$ and the biconcave negative lens $L22_2$.

The third lens unit G3 is constructed with the biconcave negative lens L31′.

The fourth lens unit G4 is constructed with the biconvex positive lens L4.

In the twelfth embodiment, when the magnification is changed in the range from the wide-angle position to the telephoto position, the first lens unit G1 is fixed, the aperture stop S and the second lens unit G2 are integrally moved toward the object side, the third lens unit G3 is moved toward the object side while widening the spacing between the second and third lens units G2 and G3, and the fourth lens unit G4 remains fixed together with the filters F.

In the twelfth embodiment, when the object point approaches the imaging optical system from infinity, the third lens unit G3 is moved toward the image plane along the optical axis to thereby carry out focusing.

Aspherical surfaces are used for six ones: the entrance surface of the path-bending prism P in the first lens unit G1, the object-side surface of the negative lens $L11_1'$ in the first lens unit G1, the image-side surface of the positive lens $L11_2'$ in the first lens unit G1, the most object-side surface of the second lens unit G2, the most image-side surface of the second lens unit G2, and the image-side surface of the fourth lens unit G4.

Subsequently, numerical data of optical members constituting the path-bending zoom optical system of the twelfth embodiment are shown below.

Numerical data 12

| | | | |
|---|---|---|---|
| $r_1 = -12.60$ (aspherical surface [1]) | $d_1 = 8.30$ | $n_{d1} = 1.5091$ | $v_{d1} = 56.2$ |
| $r_2 = \infty$ | $d_2 = 0.96$ | | |
| $r_3 = -6.20$ (aspherical surface [2]) | $d_3 = 1.10$ | $n_{d3} = 1.7440$ | $v_{d3} = 44.8$ |
| $r_4 = 9.52$ | $d_4 = 2.17$ | $n_{d4} = 1.6989$ | $v_{d4} = 30.1$ |
| $r_5 = -12.30$ (aspherical surface [3]) | $d_5 = D5$ | | |
| $r_6 =$ stop surface | $d_6 = 0.00$ | | |
| $r_7 = 6.78$ (aspherical surface [4]) | $d_7 = 4.66$ | $n_{d7} = 1.4875$ | $v_{d7} = 70.2$ |
| $r_8 = -15.31$ | $d_8 = 0.10$ | | |
| $r_9 = 8.11$ | $d_9 = 1.87$ | $n_{d9} = 1.4875$ | $v_{d9} = 70.2$ |
| $r_{10} = -18.34$ | $d_{10} = 1.10$ | $n_{d10} = 1.7552$ | $v_{d10} = 27.5$ |
| $r_{11} = 13.29$ (aspherical surface [5]) | $d_{11} = D11$ | | |
| $r_{12} = -94.42$ | $d_{12} = 1.30$ | $n_{d12} = 1.5174$ | $v_{d12} = 52.4$ |
| $r_{13} = 6.26$ | $d_{13} = D13$ | | |
| $r_{14} = 16.23$ | $d_{14} = 2.30$ | $n_{d14} = 1.5750$ | $v_{d14} = 41.5$ |
| $r_{15} = -8.77$ (aspherical surface [6]) | $d_{15} = 0.10$ | | |
| $r_{16} = \infty$ | $d_{16} = 1.20$ | $n_{d16} = 1.5163$ | $v_{d16} = 64.1$ |
| $r_{17} = \infty$ | $d_{17} = 1.34$ | $n_{d17} = 1.5477$ | $v_{d17} = 62.8$ |
| $r_{18} = \infty$ | $d_{18} = 0.30$ | | |
| $r_{19} = \infty$ | $d_{19} = 0.75$ | $n_{d19} = 1.5163$ | $v_{d19} = 64.1$ |
| $r_{20} = \infty$ | $d_{20} = 1.19$ | | |
| $r_{21} = \infty$ (image plane) | $d_{21} = 0.00$ | | |

Aspherical coefficients

Aspherical surface [1]

First surface $k = 0.0000$
$A_4 = 7.4046 \times 10^{-4}$  $A_6 = -5.7812 \times 10^{-6}$  $A_8 = 5.3552 \times 10^{-8}$ Aspherical surface [2]

Third surface $k = 0.0000$
$A_4 = -9.0819 \times 10^{-4}$  $A_6 = 8.9650 \times 10^{-6}$  $A_8 = 5.2146 \times 10^{-7}$ Aspherical surface [3]

Fifth surface $k = 0.0000$
$A_4 = -3.4829 \times 10^{-4}$  $A_6 = 6.0387 \times 10^{-6}$ Aspherical surface [4]

Seventh surface $k = 0.0000$
$A_4 = -1.9198 \times 10^{-4}$  $A_6 = -5.5795 \times 10^{-6}$  $A_8 = -6.9818 \times 10^{-8}$ Aspherical surface [5]

Eleventh surface $k = 0.0000$
$A_4 = 9.6806 \times 10^{-4}$  $A_6 = 1.0247 \times 10^{-5}$  $A_8 = 1.1016 \times 10^{-6}$ Aspherical surface [6]

Fifteenth surface $k = 0.0000$
$A_4 = 8.6109 \times 10^{-4}$  $A_6 = -1.5173 \times 10^{-5}$  $A_8 = 2.0575 \times 10^{-7}$ Zoom Data (Infinite Object Point)

|  | Wide-angle | Middle | Telephoto |
|---|---|---|---|
| f (mm) | 5.600 | 9.699 | 16.800 |
| Fno | 2.800 | 3.882 | 5.174 |
| 2 ω (°) | 57.01 | 33.64 | 19.37 |

-continued

|  | Wide-angle | Middle | Telephoto |
|---|---|---|---|
| D5 | 13.1161 | 7.3494 | 2.0000 |
| D11 | 3.0000 | 4.1675 | 8.7177 |
| D13 | 3.1402 | 7.7394 | 8.5385 |

THIRTEENTH EMBODIMENT

Figure 14A:
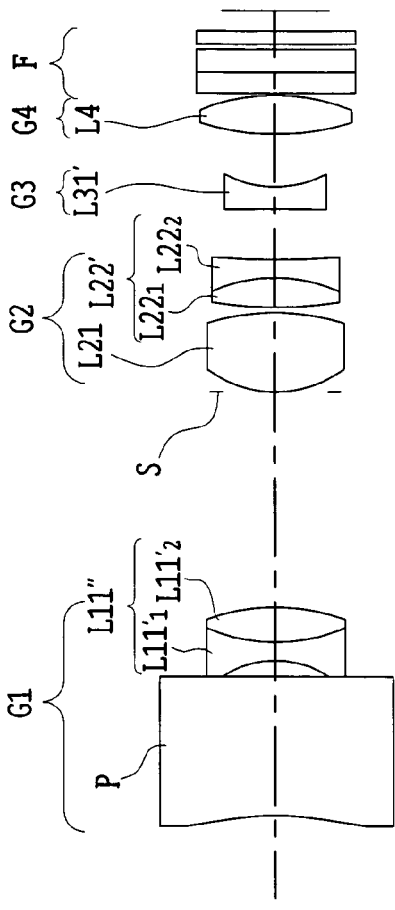
FIGS. 14A, 14B, and 14C are sectional views showing optical arrangements, developed along the optical axis, at wide-angle, middle, and telephoto positions, respectively, in focusing of the infinite object point, of a thirteenth embodiment of the path-bending zoom optical system according to the present invention.
Figure 14B:
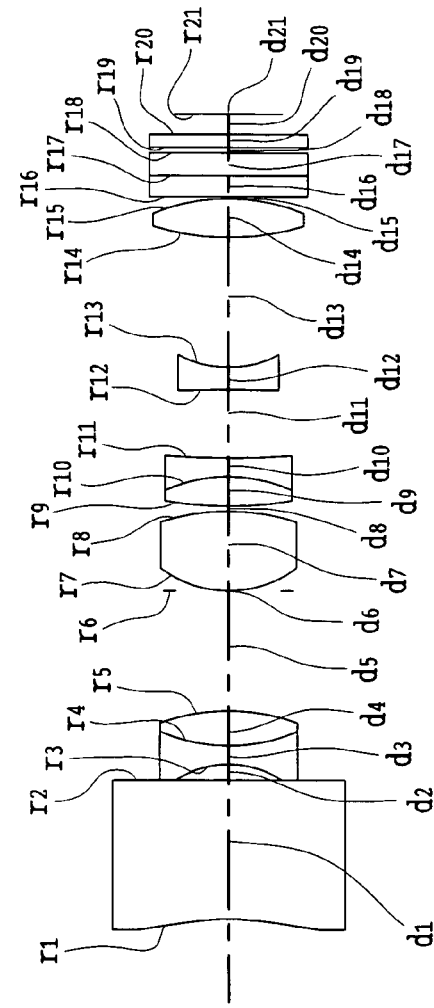
Figure 14C:
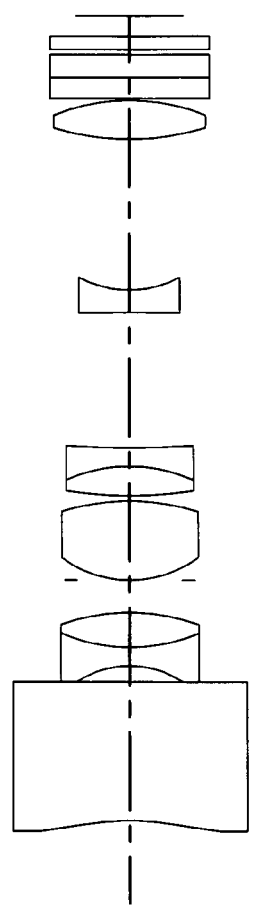

FIGS. 14A, 14B, and 14C show optical arrangements, developed along the optical axis, at wide-angle, middle, and telephoto positions, respectively, in focusing of an infinite object point, of the thirteenth embodiment of the path-bending zoom optical system according to the present invention.

The path-bending optical system of the thirteenth embodiment is constructed so that aspherical surfaces are added to the arrangement of the fifth embodiment. That is, the path-bending optical system of this embodiment comprises four lens units: in order from the object side, the first lens unit G1 with negative refracting power, the second lens unit G2 with positive refracting power, the third lens unit G3 with negative refracting power, and the fourth lens unit G4 with positive refracting power. The lens units arranged on the image side of the aperture stop S are constructed as a triplet with positive, negative, and positive refracting powers.

The first lens unit G1 includes, in order from the object side, the path-bending prism P and the cemented lens L11" of the biconcave negative lens L11$_1$' and the biconvex positive lens L11$_2$'.

The second lens unit G2 includes, in order from the object side, the biconvex positive lens L21 and the cemented lens L22' of the biconvex positive lens L22$_1$ and the biconcave negative lens L22$_2$.

The third lens unit G3 is constructed with the biconcave negative lens L31'. The fourth lens unit G4 is constructed with the biconvex positive lens L4. In the thirteenth embodiment, when the magnification is changed in the range from the wide-angle position to the telephoto position, the first lens unit G1 is fixed, the aperture stop S and the second lens unit G2 are integrally moved toward the object side, the third lens unit G3 is moved toward the object side while widening the spacing between the second and third lens units G2 and G3, and the fourth lens unit G4 remains fixed together with the filters F.

In the thirteenth embodiment, when the object point approaches the imaging optical system from infinity, the third lens unit G3 is moved toward the image plane along the optical axis to thereby carry out focusing.

Aspherical surfaces are used for eight ones: the entrance surface of the path-bending prism P in the first lens unit G1, the object-side surface of the negative lens L11$_1$' in the first lens unit G1, the image-side surface of the positive lens L11$_2$' in the first lens unit G1, the most object-side surface of the second lens unit G2, the third lens surface from the most object-side surface of the second lens unit G2, the most image-side surface of the second lens unit G2, the object-side surface of the third lens unit G3, and the image-side surface of the fourth lens unit G4.

Subsequently, numerical data of optical members constituting the path-bending zoom optical system of the thirteenth embodiment are shown below.

Numerical data 13

| | | | |
|---|---|---|---|
| $r_1 = -13.51$ (aspherical surface [1]) | $d_1 = 8.30$ | $n_{d1} = 1.5091$ | $v_{d1} = 56.2$ |
| $r_2 = \infty$ | $d_2 = 0.99$ | | |
| $r_3 = -5.56$ (aspherical surface [2]) | $d_3 = 1.10$ | $n_{d3} = 1.7440$ | $v_{d3} = 44.8$ |
| $r_4 = 9.93$ | $d_4 = 2.12$ | $n_{d4} = 1.6989$ | $v_{d4} = 30.1$ |
| $r_5 = -11.37$ (aspherical surface [3]) | $d_5 = D5$ | | |
| $r_6 = $ stop surface | $d_6 = 0.00$ | | |
| $r_7 = 6.16$ (aspherical surface [4]) | $d_7 = 4.75$ | $n_{d7} = 1.4875$ | $v_{d7} = 70.2$ |
| $r_8 = -13.15$ | $d_8 = 0.30$ | | |
| $r_9 = 15.74$ (aspherical surface [5]) | $d_9 = 1.76$ | $n_{d9} = 1.4875$ | $v_{d9} = 70.2$ |
| $r_{10} = -8.87$ | $d_{10} = 1.10$ | $n_{d10} = 1.7552$ | $v_{d10} = 27.5$ |
| $r_{11} = 87.65$ (aspherical surface [6]) | $d_{11} = D11$ | | |
| $r_{12} = -41.68$ (aspherical surface [7]) | $d_{12} = 1.30$ | $n_{d12} = 1.5174$ | $v_{d12} = 52.4$ |
| $r_{13} = 5.90$ | $d_{13} = D13$ | | |
| $r_{14} = 14.82$ | $d_{14} = 2.30$ | $n_{d14} = 1.5750$ | $v_{d14} = 41.5$ |
| $r_{15} = -9.43$ (aspherical surface [8]) | $d_{15} = 0.10$ | | |
| $r_{16} = \infty$ | $d_{16} = 1.20$ | $n_{d16} = 1.5163$ | $v_{d16} = 64.1$ |
| $r_{17} = \infty$ | $d_{17} = 1.34$ | $n_{d17} = 1.5477$ | $v_{d17} = 62.8$ |
| $r_{18} = \infty$ | $d_{18} = 0.30$ | | |
| $r_{19} = \infty$ | $d_{19} = 0.75$ | $n_{d19} = 1.5163$ | $v_{d19} = 64.1$ |
| $r_{20} = \infty$ | $d_{20} = 1.19$ | | |
| $r_{21} = \infty$ (image plane) | $d_{21} = 0.00$ | | |

Aspherical coefficients

Aspherical surface [1]

First surface $k = 0.0000$
$A_4 = 6.9472 \times 10^{-4}$   $A_6 = -5.4053 \times 10^{-6}$   $A_8 = 5.1866 \times 10^{-8}$ Aspherical surface [2]

Third surface $k = 0.0000$
$A_4 = -5.0023 \times 10^{-4}$   $A_6 = 1.8221 \times 10^{-5}$   $A_8 = 6.0189 \times 10^{-7}$ Aspherical surface [3]

Fifth surface $k = 0.0000$
$A_4 = -1.7464 \times 10^{-4}$   $A_6 = 5.5553 \times 10^{-6}$   $A_8 = 5.3151 \times 10^{-9}$ Aspherical surface [4]

Seventh surface $k = 0.0000$
$A_4 = -2.0837 \times 10^{-4}$   $A_6 = -8.2132 \times 10^{-6}$   $A_8 = -1.6579 \times 10^{-7}$ Aspherical surface [5]

Ninth surface $k = 0.0000$
$A_4 = -7.2693 \times 10^{-4}$   $A_6 = 3.0907 \times 10^{-6}$ Aspherical surface [6]

Eleventh surface $k = 0.0000$
$A_4 = 1.8884 \times 10^{-4}$   $A_6 = 2.2856 \times 10^{-5}$   $A_8 = 3.9989 \times 10^{-7}$ Aspherical surface [7]

Twelfth surface $k = 0.0000$
$A_4 = -4.4109 \times 10^{-5}$   $A_6 = 2.4768 \times 10^{-5}$   $A_8 = -2.9436 \times 10^{-6}$ -continued Numerical data 13

Aspherical surface [8]

Fifteenth surface k = 0.0000
$A_4 = 8.0172 \times 10^{-4}$   $A_6 = -1.4789 \times 10^{-5}$   $A_8 = 1.5511 \times 10^{-7}$ Zoom Data (Infinite Object Point)

|  | Wide-angle | Middle | Telephoto |
|---|---|---|---|
| f (mm) | 5.600 | 9.699 | 16.800 |
| Fno | 2.800 | 3.867 | 5.119 |
| 2 ω (°) | 57.03 | 33.65 | 19.41 |
| D5 | 12.9899 | 7.2872 | 2.0000 |
| D11 | 3.0000 | 4.1435 | 8.1715 |
| D13 | 3.1151 | 7.6742 | 8.9335 |

FOURTEENTH EMBODIMENT

Figure 15A:
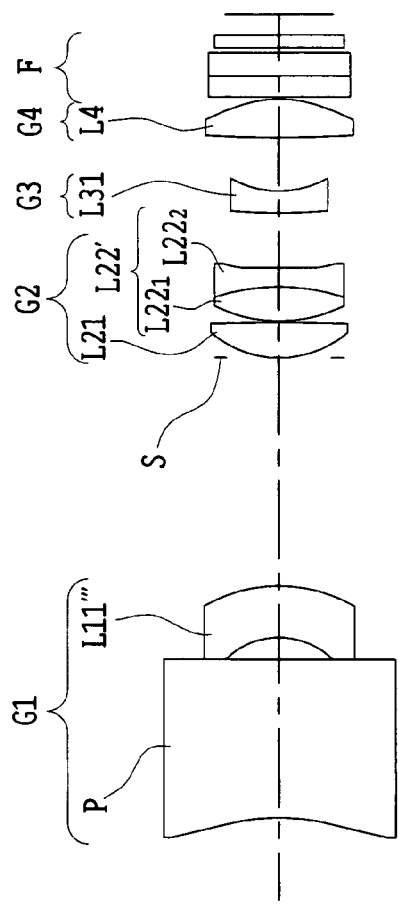
FIGS. 15A, 15B, and 15C are sectional views showing optical arrangements, developed along the optical axis, at wide-angle, middle, and telephoto positions, respectively, in focusing of the infinite object point, of a fourteenth embodiment of the path-bending zoom optical system according to the present invention.
Figure 15B:
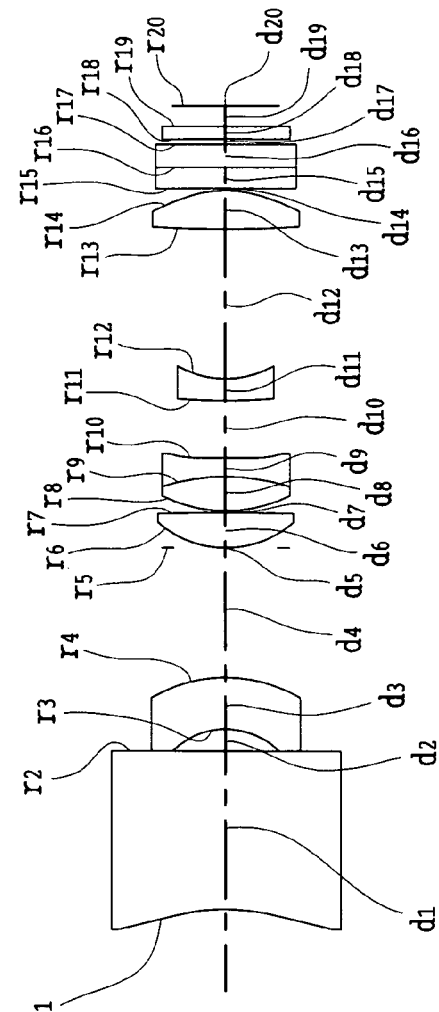
Figure 15C:
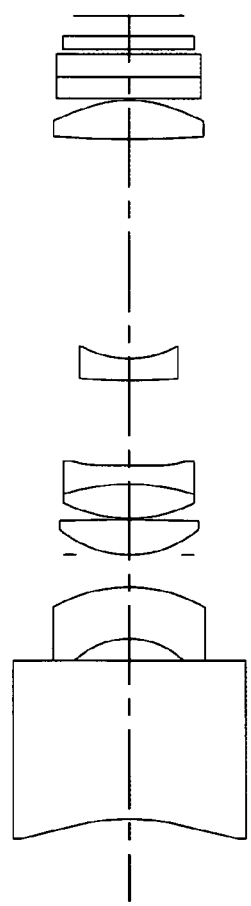

FIGS. 15A, 15B, and 15C show optical arrangements, developed along the optical axis, at wide-angle, middle, and telephoto positions, respectively, in focusing of an infinite object point, of the fourteenth embodiment of the path-bending zoom optical system according to the present invention.

The path-bending optical system of the fourteenth embodiment is constructed so that the first lens unit G1 does not include the cemented lens. That is, the path-bending optical system of this embodiment comprises four lens units: in order from the object side, the first lens unit G1 with negative refracting power, the second lens unit G2 with positive refracting power, the third lens unit G3 with negative refracting power, and the fourth lens unit G4 with positive refracting power. The lens units arranged on the image side of the aperture stop S are constructed as a triplet with positive, negative, and positive refracting powers.

The first lens unit G1 includes, in order from the object side, the path-bending prism P and a negative meniscus lens L11''' with a concave surface directed toward the object side.

The second lens unit G2 includes, in order from the object side, the biconvex positive lens L21 and the cemented lens L22' of the biconvex positive lens $L22_1$ and the biconcave negative lens $L22_2$.

The third lens unit G3 has the negative meniscus lens L31 with a concave surface directed toward the image side.

The fourth lens unit G4 is constructed with the biconvex positive lens L4.

In the fourteenth embodiment, when the magnification is changed in the range from the wide-angle position to the telephoto position, the first lens unit G1 is fixed, the aperture stop S and the second lens unit G2 are integrally moved toward the object side, the third lens unit G3 is moved toward the object side while widening the spacing between the second and third lens units G2 and G3, and the fourth lens unit G4 remains fixed together with the filters F.

In the fourteenth embodiment, when the object point approaches the imaging optical system from infinity, the third lens unit G3 is moved toward the image plane along the optical axis to thereby carry out focusing.

Aspherical surfaces are used for six ones: the entrance surface of the path-bending prism P in the first lens unit G1, the object-side surface of the negative lens L11''' in the first lens unit G1, the most object-side surface of the second lens unit G2, the most image-side surface of the second lens unit G2, the object-side surface of the third lens unit G3, and the image-side surface of the fourth lens unit G4.

Subsequently, numerical data of optical members constituting the path-bending zoom optical system of the fourteenth embodiment are shown below.

Numerical data 14

| | | | |
|---|---|---|---|
| $r_1 = -10.62$ (aspherical surface [1]) | $d_1 = 9.50$ | $n_{d1} = 1.5091$ | $v_{d1} = 56.2$ |
| $r_2 = \infty$ | $d_2 = 1.31$ | | |
| $r_3 = -4.65$ (aspherical surface [2]) | $d_3 = 3.18$ | $n_{d3} = 1.6204$ | $v_{d3} = 60.3$ |
| $r_4 = -8.42$ | $d_4 = D4$ | | |
| $r_5 = $ stop surface | $d_5 = 0.00$ | | |
| $r_6 = 6.41$ (aspherical surface [3]) | $d_6 = 2.10$ | $n_{d6} = 1.4875$ | $v_{d6} = 70.2$ |
| $r_7 = -126.49$ | $d_7 = 0.10$ | | |
| $r_8 = 8.39$ | $d_8 = 2.04$ | $n_{d8} = 1.4875$ | $v_{d8} = 70.2$ |
| $r_9 = -12.69$ | $d_9 = 1.10$ | $n_{d9} = 1.7440$ | $v_{d9} = 44.8$ |
| $r_{10} = 155.62$ (aspherical surface [4]) | $d_{10} = D10$ | | |
| $r_{11} = 48.08$ (aspherical surface [5]) | $d_{11} = 1.30$ | $n_{d11} = 1.7552$ | $v_{d11} = 27.5$ |
| $r_{12} = 5.55$ | $d_{12} = D12$ | | |
| $r_{13} = 73.06$ | $d_{13} = 2.30$ | $n_{d13} = 1.5163$ | $v_{d13} = 64.1$ |
| $r_{14} = -6.30$ (aspherical surface [6]) | $d_{14} = 0.10$ | | |
| $r_{15} = \infty$ | $d_{15} = 1.20$ | $n_{d15} = 1.5163$ | $v_{d15} = 64.1$ |
| $r_{16} = \infty$ | $d_{16} = 1.34$ | $n_{d16} = 1.5477$ | $v_{d16} = 62.8$ |
| $r_{17} = \infty$ | $d_{17} = 0.30$ | | |
| $r_{18} = \infty$ | $d_{18} = 0.75$ | $n_{d18} = 1.5163$ | $v_{d18} = 64.1$ |
| $r_{19} = \infty$ | $d_{19} = 1.19$ | | |
| $r_{20} = \infty$ (image plane) | $d_{20} = 0.0$ | | |

Aspherical coefficients

Aspherical surface [1]

First surface k = 0.0000
$A_4 = 6.3240 \times 10^{-4}$   $A_6 = -3.0230 \times 10^{-6}$   $A_8 = 3.5951 \times 10^{-8}$ Aspherical surface [2]

Third surface k = 0.0000
$A_4 = 9.4485 \times 10^{-5}$   $A_6 = 8.4808 \times 10^{-6}$   $A_8 = 1.5854 \times 10^{-6}$ Aspherical surface [3]

Sixth surface k = 0.0000
$A_4 = 2.1520 \times 10^{-4}$   $A_6 = 3.4385 \times 10^{-6}$   $A_8 = 2.4664 \times 10^{-7}$ Aspherical surface [4]

Tenth surface k = 0.0000
$A_4 = 1.3580 \times 10^{-3}$   $A_6 = 8.6931 \times 10^{-6}$   $A_8 = 3.7581 \times 10^{-6}$ Aspherical surface [5]

Eleventh surface k = 0.0000
$A_4 = 1.6983 \times 10^{-4}$   $A_6 = 1.5586 \times 10^{-5}$   $A_8 = -1.2654 \times 10^{-6}$ Aspherical surface [6]

Fourteenth surface k = 0.0000
$A_4 = 1.6678 \times 10^{-3}$   $A_6 = -2.3101 \times 10^{-5}$   $A_8 = 4.7849 \times 10^{-7}$ Zoom Data (Infinite Object Point)

|  | Wide-angle | Middle | Telephoto |
|---|---|---|---|
| f (mm) | 5.600 | 9.699 | 16.800 |
| Fno | 2.800 | 3.977 | 5.404 |
| 2 ω (°) | 58.93 | 33.53 | 19.32 |
| D4 | 13.7365 | 7.8302 | 2.0000 |
| D10 | 3.2864 | 3.4873 | 5.1058 |
| D12 | 3.1620 | 8.8674 | 13.0791 |

FIFTEENTH EMBODIMENT

Figure 16A:
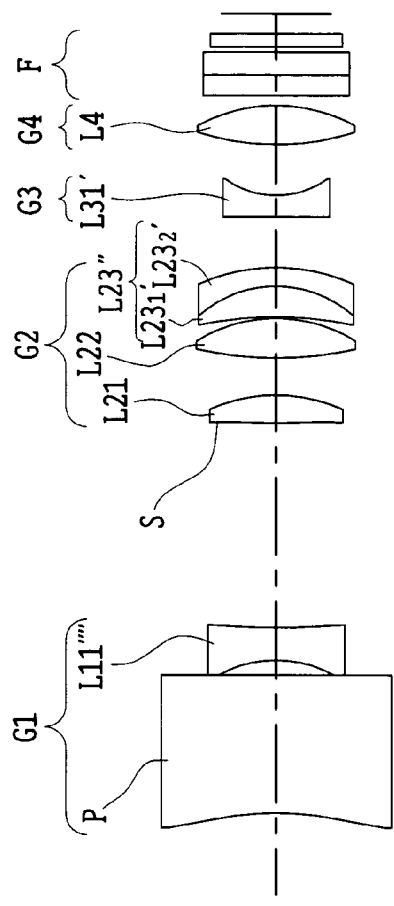
FIGS. 16A, 16B, and 16C are sectional views showing optical arrangements, developed along the optical axis, at wide-angle, middle, and telephoto positions, respectively, in focusing of the infinite object point, of a fifteenth embodiment of the path-bending zoom optical system according to the present invention.
Figure 16B:
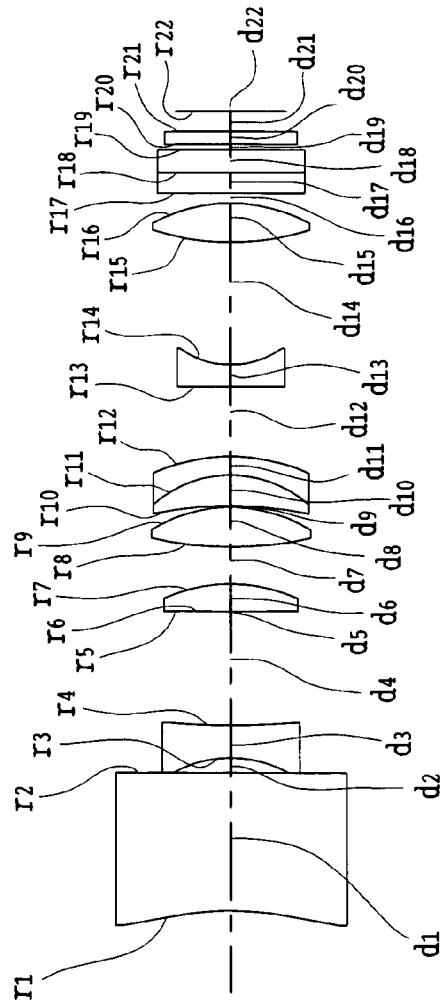
Figure 16C:
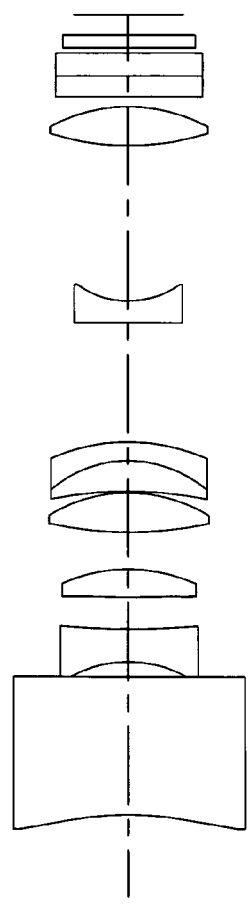

FIGS. 16A, 16B, and 16C show optical arrangements, developed along the optical axis, at wide-angle, middle, and telephoto positions, respectively, in focusing of an infinite object point, of the fifteenth embodiment of the path-bending zoom optical system according to the present invention.

The path-bending optical system of the fifteenth embodiment, like the fourteenth embodiment, is constructed so that the first lens unit G1 does not include the cemented lens. That is, the path-bending optical system of this embodiment comprises four lens units: in order from the object side, the first lens unit G1 with negative refracting power, the second lens unit G2 with positive refracting power, the third lens unit G3 with negative refracting power, and the fourth lens unit G4 with positive refracting power. The lens units arranged on the image side of the aperture stop S are constructed as a triplet with positive, negative, and positive refracting powers.

The first lens unit G1 includes, in order from the object side, the path-bending prism P and a biconcave negative lens L11"".

The second lens unit G2 includes, in order from the object side, the biconvex positive lens L21, the biconvex positive lens L22, and a cemented lens L23" of a positive meniscus lens L23$_1$' with a concave surface directed toward the object side and a negative meniscus lens L23$_2$' with a concave surface directed toward the object side.

The third lens unit G3 is constructed with the biconcave negative lens L31'.

The fourth lens unit G4 is constructed with the biconvex positive lens L4.

In the fifteenth embodiment, when the magnification is changed in the range from the wide-angle position to the telephoto position, the first lens unit G1 is fixed, the aperture stop S and the second lens unit G2 are integrally moved toward the object side, the third lens unit G3 is moved toward the object side while widening the spacing between the second and third lens units G2 and G3, and the fourth lens unit G4 remains fixed together with the filters F. In the fifteenth embodiment, when the object point approaches the imaging optical system from infinity, the third lens unit G3 is moved toward the image plane along the optical axis to thereby carry out focusing.

Aspherical surfaces are used for four ones: the entrance surface of the path-bending prism P in the first lens unit G1, the object-side surface of the negative lens L11"" in the first lens unit G1, the most object-side surface of the second lens unit G2, and the image-side surface of the fourth lens unit G4.

Subsequently, numerical data of optical members constituting the path-bending zoom optical system of the fifteenth embodiment are shown below.

Numerical data 15

| | | | |
|---|---|---|---|
| $r_1 = -13.97$ (aspherical surface [1]) | $d_1 = 8.30$ | $n_{d1} = 1.5091$ | $v_{d1} = 56.2$ |
| $r_2 = \infty$ | $d_2 = 0.90$ | | |
| $r_3 = -7.37$ (aspherical surface [2]) | $d_3 = 2.00$ | $n_{d3} = 1.4875$ | $v_{d3} = 70.2$ |
| $r_4 = 49.37$ | $d_4 = D4$ | | |
| $r_5 =$ stop surface | $d_5 = 0.00$ | | |
| $r_6 = 38.07$ (aspherical surface [3]) | $d_6 = 1.68$ | $n_{d6} = 1.4875$ | $v_{d6} = 70.2$ |
| $r_7 = -9.39$ | $d_7 = 2.25$ | | |
| $r_8 = 20.50$ | $d_8 = 2.39$ | $n_{d8} = 1.4875$ | $v_{d8} = 70.2$ |
| $r_9 = -8.65$ | $d_9 = 0.10$ | | |
| $r_{10} = -19.81$ | $d_{10} = 1.83$ | $n_{d10} = 1.4875$ | $v_{d10} = 70.2$ |
| $r_{11} = -6.70$ | $d_{11} = 1.10$ | $n_{d11} = 1.7234$ | $v_{d11} = 38.0$ |
| $r_{12} = -11.20$ | $d_{12} = D12$ | | |
| $r_{13} = -242.43$ | $d_{13} = 1.30$ | $n_{d13} = 1.7552$ | $v_{d13} = 27.5$ |
| $r_{14} = 4.89$ | $d_{14} = D14$ | | |
| $r_{15} = 14.89$ | $d_{15} = 2.30$ | $n_{d15} = 1.5182$ | $v_{d15} = 58.9$ |
| $r_{16} = -8.10$ (aspherical surface [4]) | $d_{16} = 0.58$ | | |
| $r_{17} = \infty$ | $d_{17} = 1.20$ | $n_{d17} = 1.5163$ | $v_{d17} = 64.1$ |
| $r_{18} = \infty$ | $d_{18} = 1.34$ | $n_{d18} = 1.5477$ | $v_{d18} = 62.8$ |
| $r_{19} = \infty$ | $d_{19} = 0.30$ | | |
| $r_{20} = \infty$ | $d_{20} = 0.75$ | $n_{d20} = 1.5163$ | $v_{d20} = 64.1$ |
| $r_{21} = \infty$ | $d_{21} = 1.19$ | | |
| $r_{22} = \infty$ (image plane) | $d_{22} = 0.00$ | | |

Aspherical coefficients

Aspherical surface [1]

First surface $k = 0.0000$
$A_4 = 4.3597 \times 10^{-4}$   $A_6 = -1.6456 \times 10^{-6}$   $A_8 = 1.0643 \times 10^{-8}$ Aspherical surface [2]

Third surface $k = 0.0000$
$A_4 = -2.6427 \times 10^{-4}$   $A_6 = -1.8889 \times 10^{-7}$   $A_8 = 1.8385 \times 10^{-7}$ Aspherical surface [3]

Sixth surface $k = 0.0000$
$A_4 = -7.6973 \times 10^{-4}$   $A_6 = -3.9503 \times 10^{-7}$   $A_8 = -3.2204 \times 10^{-7}$ Aspherical surface [4]

Sixteenth surface $k = 0.0000$
$A_4 = 7.2127 \times 10^{-4}$   $A_6 = -1.1524 \times 10^{-5}$   $A_8 = 1.7886 \times 10^{-7}$ Zoom Data (Infinite Object Point)

|  | Wide-angle | Middle | Telephoto |
|---|---|---|---|
| f (mm) | 5.600 | 9.699 | 16.800 |
| Fno | 2.800 | 3.699 | 4.588 |
| 2 ω (°) | 58.87 | 34.21 | 19.78 |
| D4 | 12.4258 | 6.9489 | 2.0000 |
| D12 | 3.0000 | 4.1809 | 7.2377 |
| D14 | 3.0558 | 7.3519 | 9.2439 |

SIXTEENTH EMBODIMENT

Figure 17A:
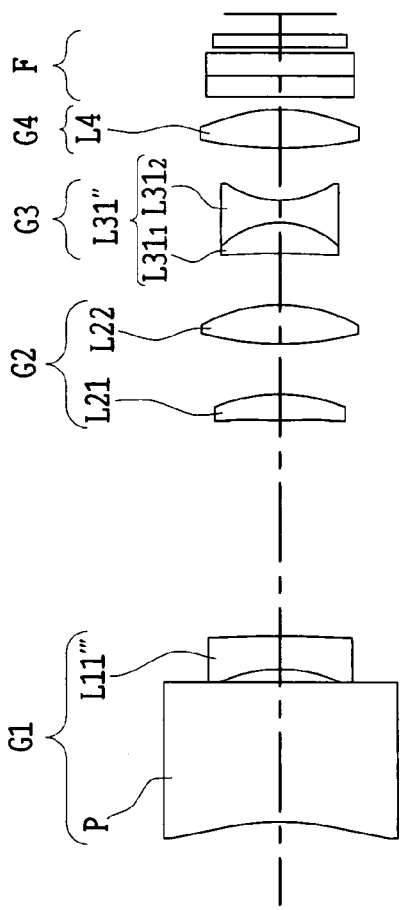
FIGS. 17A, 17B, and 17C are sectional views showing optical arrangements, developed along the optical axis, at wide-angle, middle, and telephoto positions, respectively, in focusing of the infinite object point, of a sixteenth embodiment of the path-bending zoom optical system according to the present invention.
Figure 17B:
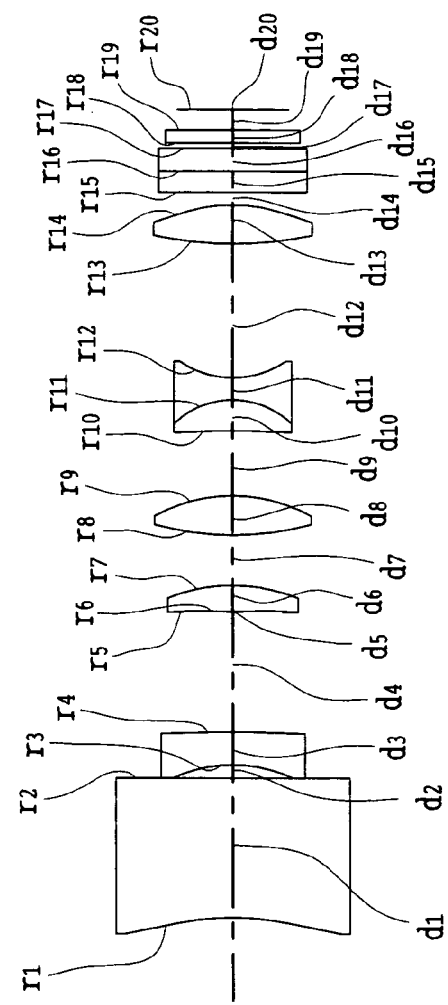
Figure 17C:
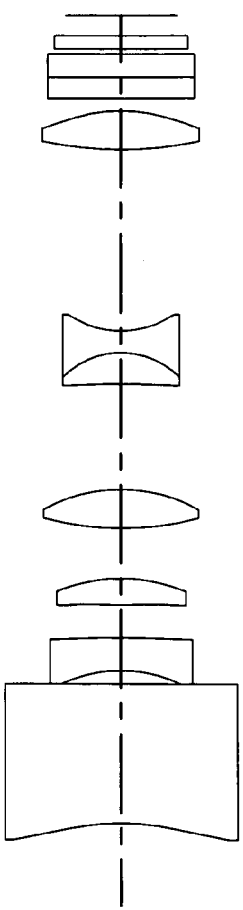

FIGS. 17A, 17B, and 17C show optical arrangements, developed along the optical axis, at wide-angle, middle, and telephoto positions, respectively, in focusing of an infinite object point, of the sixteenth embodiment of the path-bending zoom optical system according to the present invention.

The path-bending optical system of the sixteenth embodiment, like the fourteenth embodiment, is constructed so that the first lens unit G1 does not include the cemented lens. That is, the path-bending optical system of this embodiment comprises four lens units: in order from the object side, the first lens unit G1 with negative refracting power, the second lens unit G2 with positive refracting power, the third lens unit G3 with negative refracting power, and the fourth lens unit G4 with positive refracting power. The lens units arranged on the image side of the aperture stop S are constructed as a triplet with positive, negative, and positive refracting powers.

The first lens unit G1 includes, in order from the object side, the path-bending prism P and the negative meniscus lens L11‴ with a concave surface directed toward the object side.

The second lens unit G2 includes, in order from the object side, the biconvex positive lens L21 and the biconvex positive lens L22.

The third lens unit G3 is constructed with a cemented lens L31″ of a negative meniscus lens L31$_1$ with a concave surface directed toward the object side and a biconcave negative lens L31$_2$.

The fourth lens unit G4 is constructed with the biconvex positive lens L4.

In the sixteenth embodiment, when the magnification is changed in the range from the wide-angle position to the telephoto position, the first lens unit G1 is fixed, the aperture stop S and the second lens unit G2 are integrally moved toward the object side, the third lens unit G3 is moved toward the object side while widening the spacing between the second and third lens units G2 and G3, and the fourth lens unit G4 remains fixed together with the filters F.

In the sixteenth embodiment, when the object point approaches the imaging optical system from infinity, the third lens unit G3 is moved toward the image plane along the optical axis to thereby carry out focusing.

Aspherical surfaces are used for five ones: the entrance surface of the path-bending prism P in the first lens unit G1, the object-side surface of the negative lens L11‴ in the first lens unit G1, the most object-side surface of the second lens unit G2, the most image-side surface of the second lens unit G2, and the image-side surface of the fourth lens unit G4.

Subsequently, numerical data of optical members constituting the path-bending zoom optical system of the sixteenth embodiment are shown below.

| Numerical data 16 | | | |
|---|---|---|---|
| $r_1$ = −13.23 (aspherical surface [1]) | $d_1$ = 8.30 | $n_{d1}$ = 1.5091 | $v_{d1}$ = 56.2 |
| $r_2$ = ∞ | $d_2$ = 0.82 | | |
| $r_3$ = −8.64 (aspherical surface [2]) | $d_3$ = 2.00 | $n_{d3}$ = 1.6204 | $v_{d3}$ = 60.3 |
| $r_4$ = −81.26 | $d_4$ = D4 | | |
| $r_5$ = stop surface | $d_5$ = 0.00 | | |
| $r_6$ = 56.39 (aspherical surface [3]) | $d_6$ = 1.58 | $n_{d6}$ = 1.4875 | $v_{d6}$ = 70.2 |
| $r_7$ = −9.44 | $d_7$ = 3.01 | | |
| $r_8$ = 17.57 | $d_8$ = 2.33 | $n_{d8}$ = 1.4875 | $v_{d8}$ = 70.2 |
| $r_9$ = −8.81 (aspherical surface [4]) | $d_9$ = D9 | | |
| $r_{10}$ = −53.26 | $d_{10}$ = 1.85 | $n_{d10}$ = 1.7440 | $v_{d10}$ = 44.8 |
| $r_{11}$ = −4.65 | $d_{11}$ = 1.30 | $n_{d11}$ = 1.7215 | $v_{d11}$ = 29.2 |

| -continued | | | |
|---|---|---|---|
| Numerical data 16 | | | |
| $r_{12}$ = 5.30 | $d_{12}$ = D12 | | |
| $r_{13}$ = 20.72 | $d_{13}$ = 2.30 | $n_{d13}$ = 1.5814 | $v_{d13}$ = 40.7 |
| $r_{14}$ = −8.37 (aspherical surface [5]) | $d_{14}$ = 0.71 | | |
| $r_{15}$ = ∞ | $d_{15}$ = 1.20 | $n_{d15}$ = 1.5163 | $v_{d15}$ = 64.1 |
| $r_{16}$ = ∞ | $d_{16}$ = 1.34 | $n_{d16}$ = 1.5477 | $v_{d16}$ = 62.8 |
| $r_{17}$ = ∞ | $d_{17}$ = 0.30 | | |
| $r_{18}$ = ∞ | $d_{18}$ = 0.75 | $n_{d18}$ = 1.5163 | $v_{d18}$ = 64.1 |
| $r_{19}$ = ∞ | $d_{19}$ = 1.19 | | |
| $r_{20}$ = ∞ (image plane) | $d_{20}$ = 0.00 | | |

Aspherical coefficients

Aspherical surface [1]

First surface k = 0.0000
$A_4$ = 4.6277 × 10$^{-4}$   $A_6$ = −2.4616 × 10$^{-6}$   $A_8$ = 1.7993 × 10$^{-8}$ Aspherical surface [2]

Third surface k = 0.0000
$A_4$ = −2.8367 × 10$^{-4}$   $A_6$ = 8.9044 × 10$^{-7}$   $A_8$ = 8.5061 × 10$^{-9}$ Aspherical surface [3]

Sixth surface k = 0.0000
$A_4$ = −7.1689 × 10$^{-4}$   $A_6$ = −2.8745 × 10$^{-6}$   $A_8$ = −1.3665 × 10$^{-7}$ Aspherical surface [4]

Ninth surface k = 0.0000
$A_4$ = 7.3664 × 10$^{-5}$   $A_6$ = 7.9709 × 10$^{-7}$   $A_8$ = 5.3264 × 10$^{-8}$ Aspherical surface [5]

Fourteenth surface k = 0.0000
$A_4$ = 8.1588 × 10$^{-4}$   $A_6$ = −9.3284 × 10$^{-6}$   $A_8$ = 6.0642 × 10$^{-8}$ Zoom Data (Infinite Object Point)

| | Wide-angle | Middle | Telephoto |
|---|---|---|---|
| f (mm) | 5.600 | 9.699 | 16.800 |
| Fno | 2.800 | 3.740 | 4.712 |
| 2 ω (°) | 58.87 | 33.65 | 19.38 |
| D4 | 12.9471 | 7.2263 | 2.0000 |
| D9 | 3.0000 | 3.8982 | 6.3423 |
| D15 | 3.0590 | 7.8816 | 10.6639 |

SEVENTEENTH EMBODIMENT

FIGS. 18A, 18B, and 18C show optical arrangements, developed along the optical axis, at wide-angle, middle, and telephoto positions, respectively, in focusing of an infinite object point, of the seventeenth embodiment of the path-bending zoom optical system according to the present invention.

The path-bending optical system of the seventeenth embodiment is constructed so that the second lens unit G2 includes, in order from the object side, the positive lens, the aperture stop, and the cemented lens of a positive lens and a negative lens. That is, the path-bending optical system of this embodiment comprises four lens units: in order from the object side, the first lens unit G1 with negative refracting power, the second lens unit G2 with positive refracting power, the third lens unit G3 with negative refracting power, and the fourth lens unit G4 with positive refracting power. The lens units arranged on the image side of the aperture stop S are constructed as a triplet with positive, negative, and positive refracting powers.

The first lens unit G1 includes, in order from the object side, the path-bending prism P and the cemented lens L11″ of the biconcave negative lens L11$_1$′ and the biconvex positive lens L11$_2$′.

The second lens unit G2 includes, in order from the object side, the biconvex positive lens L21 and the cemented lens L22′ of the biconvex positive lens L22$_1$ and the biconcave negative lens L22$_2$.

The third lens unit G3 has the negative meniscus lens L31 with a concave surface directed toward the image side.

The fourth lens unit G4 is constructed with the biconvex positive lens L4.

In the seventeenth embodiment, when the magnification is changed in the range from the wide-angle position to the telephoto position, the first lens unit G1 is fixed, the aperture stop S and the second lens unit G2 are integrally moved toward the object side, the third lens unit G3 is moved toward the object side while widening the spacing between the second and third lens units G2 and G3, and the fourth lens unit G4 remains fixed together with the filters F.

In the seventeenth embodiment, when the object point approaches the imaging optical system from infinity, the third lens unit G3 is moved toward the image plane along the optical axis to thereby carry out focusing.

Aspherical surfaces are used for four ones: the entrance surface of the path-bending prism P in the first lens unit G1, the object-side surface of the cemented lens L22′ in the second lens unit G2, the image-side surface of the cemented lens L22′ in the second lens unit G2, and the image-side surface of the fourth lens unit G4.

Subsequently, numerical data of optical members constituting the path-bending zoom optical system of the seventeenth embodiment are shown below.

| Numerical data 17 | | | |
|---|---|---|---|
| $r_1 = -11.81$ (aspherical surface [1]) | $d_1 = 11.00$ | $n_{d1} = 1.5091$ | $v_{d1} = 56.2$ |
| $r_2 = \infty$ | $d_2 = 0.78$ | | |
| $r_3 = -7.63$ | $d_3 = 1.10$ | $n_{d3} = 1.7440$ | $v_{d3} = 44.8$ |
| $r_4 = 7.85$ | $d_4 = 2.11$ | $n_{d4} = 1.6889$ | $v_{d4} = 31.1$ |
| $r_5 = -20.65$ | $d_5 = D5$ | | |
| $r_6 = 6.33$ | $d_6 = 2.04$ | $n_{d6} = 1.5163$ | $v_{d6} = 64.1$ |
| $r_7 = -97.15$ | $d_7 = 0.10$ | | |
| $r_8 = $ stop surface | $d_8 = 1.40$ | | |
| $r_9 = 6.95$ (aspherical surface [2]) | $d_9 = 1.97$ | $n_{d9} = 1.4875$ | $v_{d9} = 70.2$ |

-continued

| Numerical data 17 | | | |
|---|---|---|---|
| $r_{10} = -14.09$ | $d_{10} = 1.10$ | $n_{d10} = 1.7552$ | $v_{d10} = 27.5$ |
| $r_{11} = 48.49$ (aspherical surface [3]) | $d_{11} = D11$ | | |
| $r_{12} = 39.94$ | $d_{12} = 1.30$ | $n_{d12} = 1.7552$ | $v_{d12} = 27.5$ |
| $r_{13} = 4.42$ | $d_{13} = D13$ | | |
| $r_{14} = 35.19$ | $d_{14} = 2.30$ | $n_{d14} = 1.6727$ | $v_{d14} = 32.1$ |
| $r_{15} = -7.17$ (aspherical surface [4]) | $d_{15} = 0.10$ | | |
| $r_{16} = \infty$ | $d_{16} = 1.20$ | $n_{d16} = 1.5163$ | $v_{d16} = 64.1$ |
| $r_{17} = \infty$ | $d_{17} = 1.34$ | $n_{d17} = 1.5477$ | $v_{d17} = 62.8$ |
| $r_{18} = \infty$ | $d_{18} = 0.30$ | | |
| $r_{19} = \infty$ | $d_{19} = 0.75$ | $n_{d19} = 1.5163$ | $v_{d19} = 64.1$ |
| $r_{20} = \infty$ | $d_{20} = 1.19$ | | |
| $r_{21} = \infty$ (image plane) | $d_{21} = 0.00$ | | |

Aspherical coefficients

Aspherical surface [1]

First surface $k = 0.0000$
$A_4 = 4.2589 \times 10^{-4}$   $A_6 = -1.7596 \times 10^{-6}$   $A_8 = 1.3861 \times 10^{-8}$ Aspherical surface [2]

Ninth surface $k = 0.0000$
$A_4 = -3.6948 \times 10^{-4}$   $A_6 = -7.2199 \times 10^{-7}$   $A_8 = -2.2995 \times 10^{-6}$ Aspherical surface [3]

Eleventh surface $k = 0.0000$
$A_4 = 1.0175 \times 10^{-3}$   $A_6 = 2.5026 \times 10^{-6}$   $A_8 = 3.6653 \times 10^{-8}$ Aspherical surface [4]

Fifteenth surface $k = 0.0000$
$A_4 = 9.3996 \times 10^{-4}$   $A_6 = -1.6153 \times 10^{-5}$   $A_8 = 2.5735 \times 10^{-7}$ Zoom Data (Infinite Object Point)

| | Wide-angle | Middle | Telephoto |
|---|---|---|---|
| f (mm) | 5.600 | 9.699 | 16.800 |
| Fno | 2.800 | 3.923 | 5.305 |
| 2 ω (°) | 57.96 | 33.68 | 19.42 |
| D5 | 11.8478 | 6.7318 | 2.0000 |
| D11 | 3.0000 | 4.2371 | 7.7149 |
| D13 | 3.0702 | 6.9491 | 8.2032 |

Subsequently, values relating to Conditions (1)–(5) in individual embodiments are listed in the following table.

| | Condition (1) | Condition (2) | Condition (3) | Condition (4) | Condition (5) |
|---|---|---|---|---|---|
| 1st embodiment | −1.12 | 2.02 | 0.51 | 1.06 | 1.12 |
| 2nd embodiment | −1.09 | 1.94 | 0.53 | 1.00 | 1.00 |
| 3rd embodiment | −0.94 | 2.25 | 0.49 | 0.94 | 1.00 |
| 4th embodiment | −1.14 | 2.09 | 0.56 | 0.98 | 1.03 |
| 5th embodiment | −0.93 | 3.28 | 0.57 | 0.90 | 1.02 |
| 6th embodiment | −0.92 | 2.43 | 0.54 | 0.94 | 0.97 |
| 7th embodiment | −0.93 | 3.06 | 0.63 | 0.88 | 1.00 |

-continued

|  | Condition (1) | Condition (2) | Condition (3) | Condition (4) | Condition (5) |
|---|---|---|---|---|---|
| 8th embodiment | −0.93 | 2.73 | 0.56 | 0.90 | 1.01 |
| 9th embodiment | −0.91 | 3.32 | 0.50 | 0.92 | 1.01 |
| 10th embodiment | −0.90 | 2.84 | 0.50 | 0.93 | 1.00 |
| 11th embodiment | −0.88 | 3.40 | 0.53 | 0.87 | 1.05 |
| 12th embodiment | −0.98 | 2.61 | 0.52 | 0.93 | 1.06 |
| 13th embodiment | −0.94 | 2.92 | 0.53 | 0.89 | 1.07 |
| 14th embodiment | −1.07 | 2.01 | 0.84 | 0.78 | 1.17 |
| 15th embodiment | −0.78 | 3.62 | 0.59 | 0.80 | 1.08 |
| 16th embodiment | −0.88 | 3.04 | 0.69 | 0.79 | 1.09 |
| 17th embodiment | −0.80 | 2.98 | 0.52 | 0.91 | 0.93 |

Figure 19:
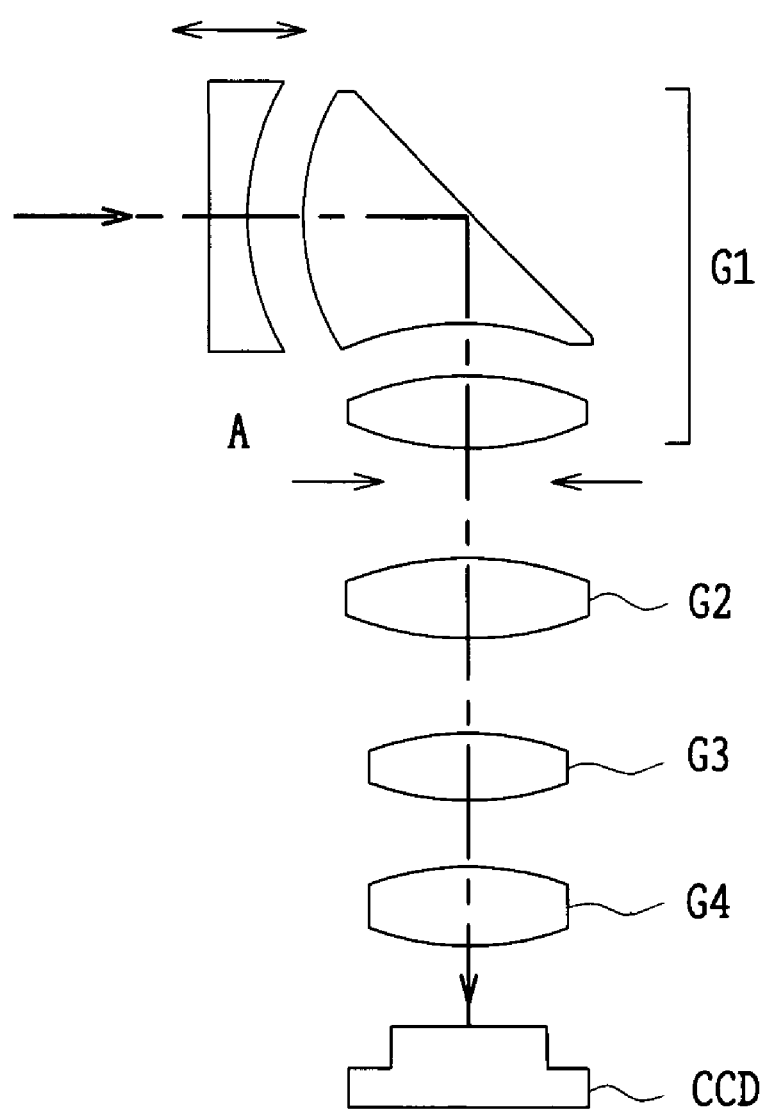
FIG. 19 is a view showing schematically a modified example of the path-bending zoom optical system of the present invention.

In each of the above embodiments, although the path-bending prism P is constructed so that the entrance surface is aspherical, the exit surface may be aspherical. Moreover, the prism P is used as the primary element located at the most object-side position of the optical system, but as schematically shown in FIG. 19, a lens unit A including a single lens or a plurality of lenses, or a plurality of lens units, may be located ahead of (on the object side of) the prism P so that they are moved along the optical axis for focusing or zooming.

Now, the path-bending zoom optical system of the present invention described above can be used in the imaging device in which an object image is formed by the imaging optical system such as a zoom lens, and this image is received by an imaging element, such as the CCD or a silver halide film, to photograph, notably in a digital camera and a video camera, and a personal computer, a telephone, and a personal digital assistant, each of which is an example of an information processor, and a mobile phone which is handy to carry. Their embodiments are shown below.

Figure 20:
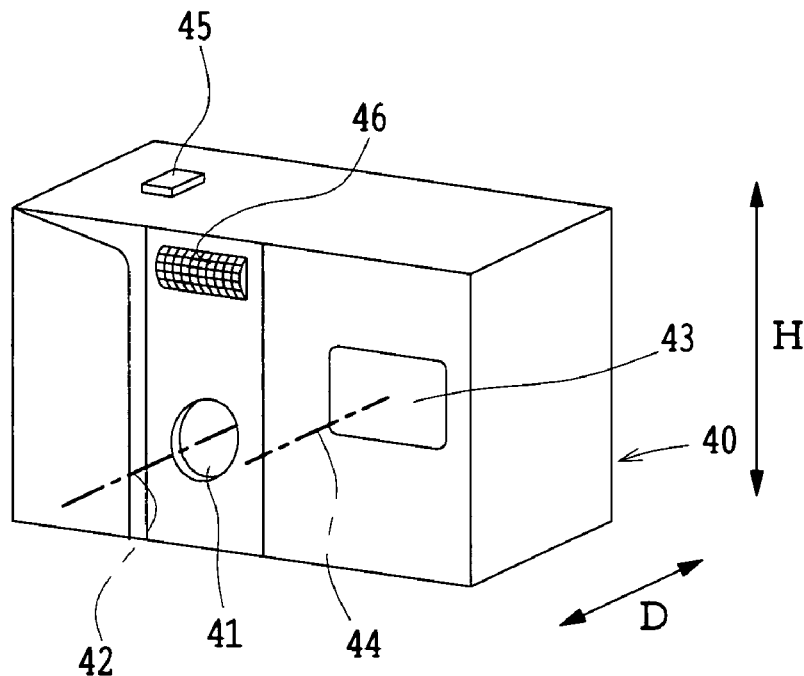
FIG. 20 is a perspective front view showing the appearance of a digital camera incorporating the path-bending zoom optical system of the present invention.
Figure 21:
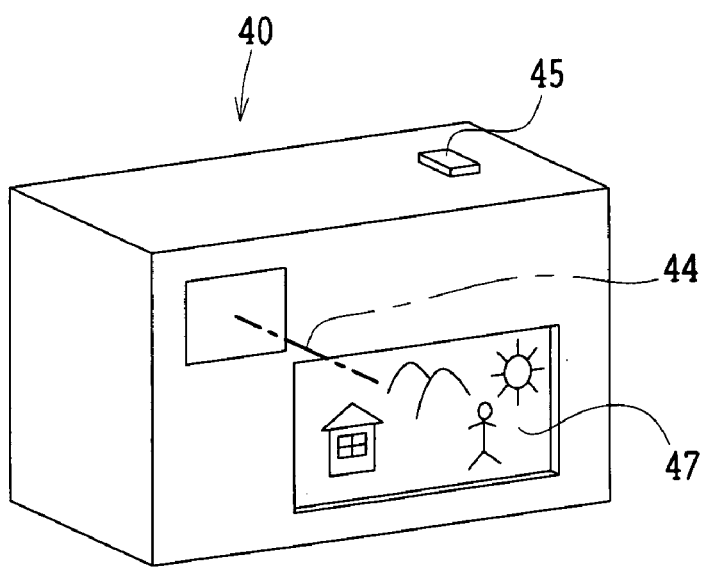
FIG. 21 is a perspective rear view showing the digital camera of FIG. 20.
Figure 22:
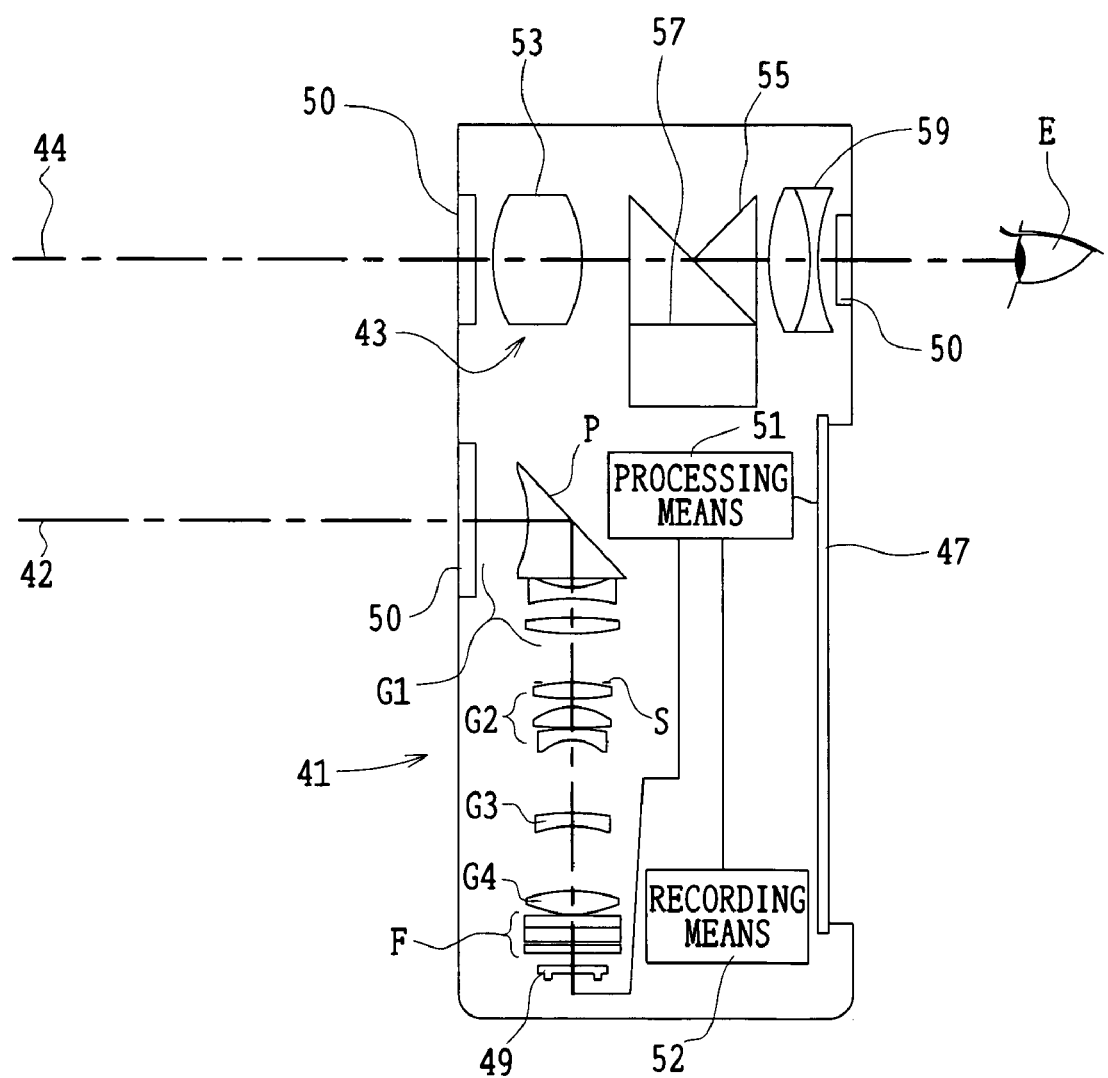
FIG. 22 is a sectional view showing the digital camera of FIG. 20.

FIGS. 20–22 show a digital camera in which the path-bending zoom optical system of the present invention is incorporated in a photographing optical system 41.

A digital camera 40, in this example, includes the photographing optical system 41 having a photographing optical path 42, a finder optical system 43 having a finder optical path 44, a shutter 45, a flash lamp 46, and a liquid crystal display monitor 47. When the shutter 45 provided on the upper portion of the camera 40 is pushed, photographing is performed through the photographing optical system 41, for example, the path-bending zoom optical system of the fifth embodiment.

An object image formed by the photographing optical system 41 is provided on the imaging surface of a CCD 49 through the near-infrared cutoff filter and the optical low-pass filter in the plane-parallel plate unit F.

The object image received by the CCD 49 is displayed as an electronic image on the liquid crystal display monitor 47 provided on the back face of the camera through a processing means 51. A recording means 52 is connected to the processing means 51 and a photographed electronic image can be recorded. Also, the recording means 52 may be provided to be independent of the processing means 51, or may be constructed so that the image is electronically recorded and written by a flexible disk, memory card, or MO. A silver halide film camera using a silver halide film instead of the CCD 49 may be employed.

A finder objective optical system 53 is located on the finder optical path 44. An object image formed by the finder objective optical system 53 is provided on a field frame 57 of a Porro prism 55 which is an image erecting member. Behind the Porro prism 55, an eyepiece optical system 59 introducing an erect image into an observer's eye E is located. Also, cover members 50 are placed on the entrance sides of the photographing optical system 41 and the finder objective optical system 53 and on the exit side of the eyepiece optical system 59.

In the digital camera 40 constructed as mentioned above, the photographing optical system 41 is a zoom lens which has a wide angle of view and a high variable magnification ratio, is favorable for correction for aberration and bright, and is provided with a long back focal distance that the filters can be placed, and thus high performance and a cost reduction can be achieved.

In FIG. 22, plane-parallel plates are used as the cover members 50, but lenses with powers may be used.

Figure 23:
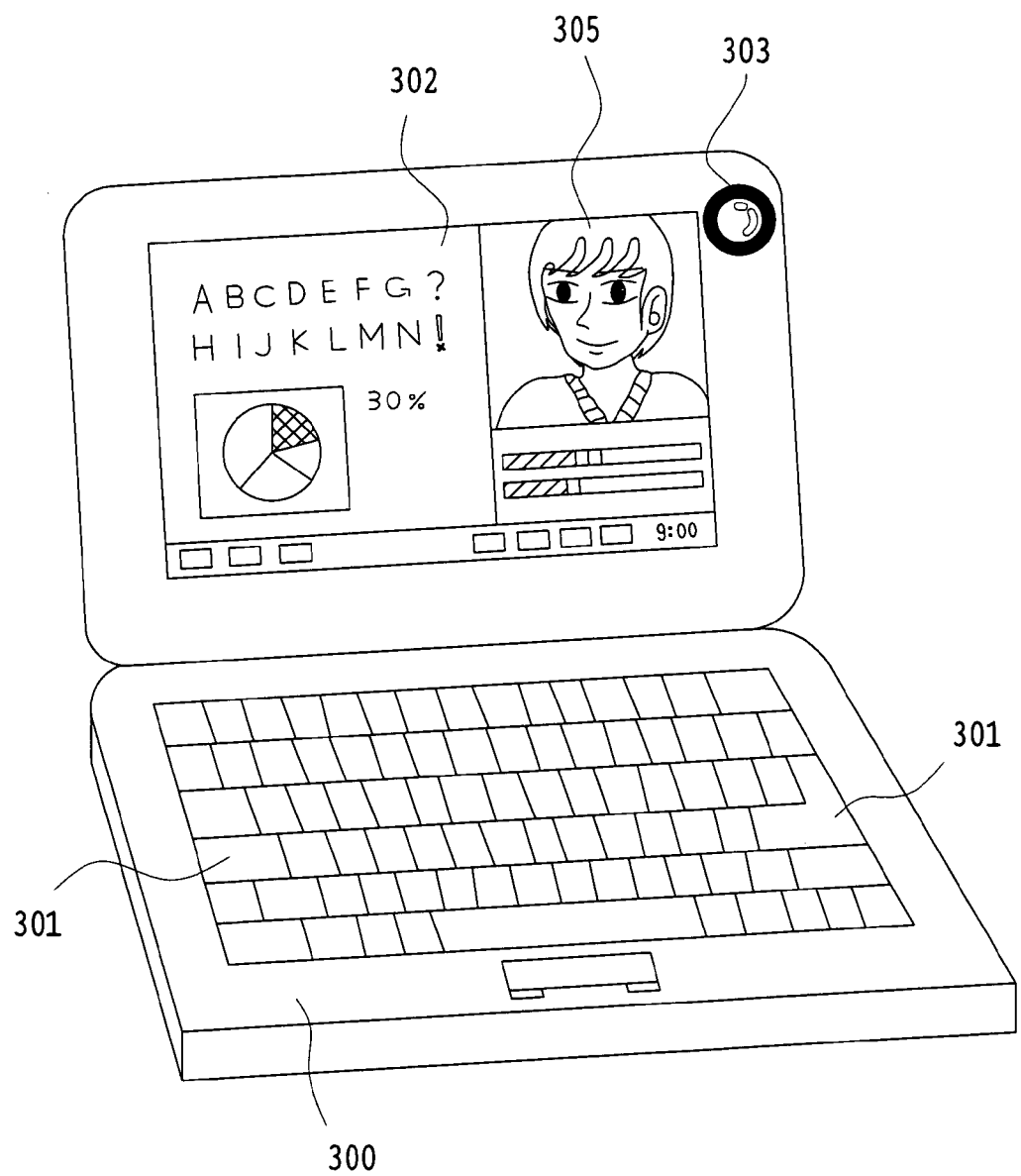
FIG. 23 is a perspective front view showing a personal computer in which the path-bending zoom optical system of the present invention is incorporated as a photographing optical system.
Figure 24:
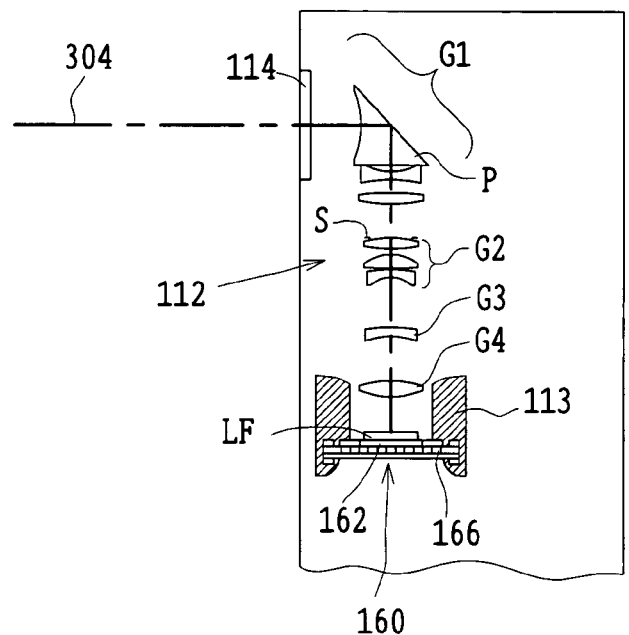
FIG. 24 is a sectional view showing the photographing optical system of the personal computer.
Figure 25:
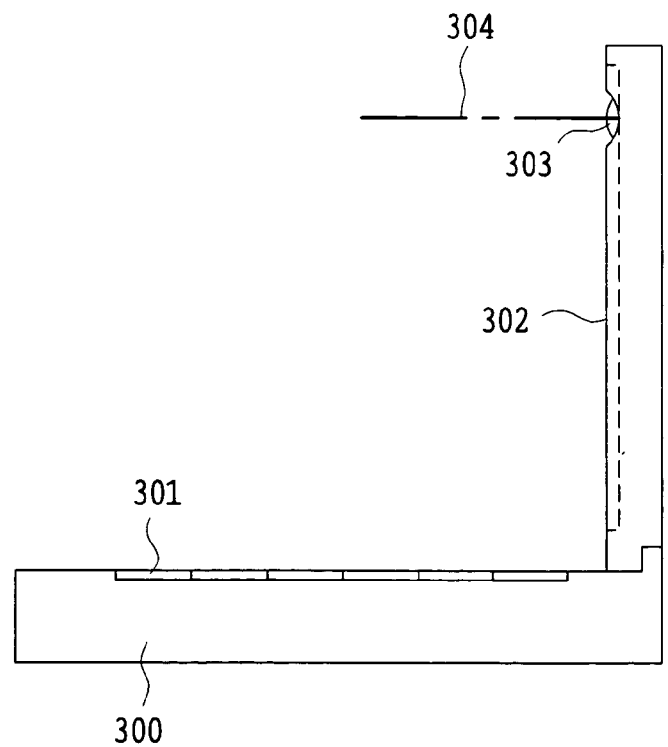
FIG. 25 is a side view in FIG. 23.

Subsequently, a personal computer of an example of an information processor in which the path-bending zoom optical system of the present invention is incorporated as the photographing optical system is shown in FIGS. 23–25.

As shown in FIGS. 23–25, a personal computer 300 has a keyboard 301 for inputting information from the exterior by an operator; an information processing means or recording means, not shown; a monitor 302 displaying information for the operator; and an photographing optical system 303 for photographing the operator himself or a surrounding image. Here, the monitor 302 may be a transmission-type liquid crystal display element illuminated with backlight, not shown, from the back face, a reflection-type liquid crystal display element reflecting light from the front for display, or a CRT display. In these figures, the photographing optical system 303 is housed in the monitor 302 upper-right, but it may be located, not to speak of this place, on the periphery of the monitor 302 or the keyboard 301.

The photographing optical system 303 has an objective lens 112 including the path-bending zoom optical system (not shown) of the present invention and an imaging element chip 162 receiving an image. These are housed in the personal computer 300.

Here, an optical low-pass filter LF is additionally cemented to the chip 162, and these are integrally constructed as an imaging unit 160, which is fitted into the rear end of a lens frame 113 of the objective lens 112 and can be mounted in a single operation. Therefore, the alignment of the objective lens 112 and the chip 162 and the adjustment of face-to-face spacing are not required, and assembly is simplified. At the top (not shown) of the lens frame 113, a cover glass 114 for protecting the objective lens 112 is placed. Also, the driving mechanism of the zoom lens in the lens frame 113 is not shown in the figure.

An object image received by the chip 162 is input into the processing means of the personal computer 300 through a terminal 166 and is displayed as an electronic image on the monitor 302. In FIG. 23, a photographed image 305 of the operator is shown as an example. The image 305 can also be displayed on the personal computer of his communication mate from a remote place, by the processing means, through the internet or the telephone.

Figure 26A:
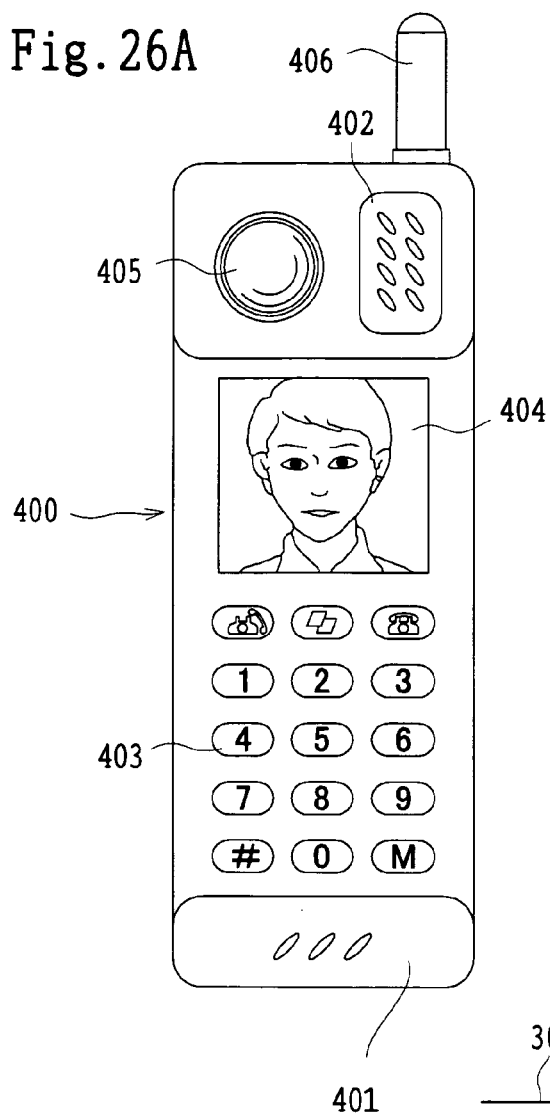
FIG. 26A is a front view showing an example of a mobile phone in which the path-bending zoom optical system of the present invention is incorporated as the photographing optical system.
Figure 26B:
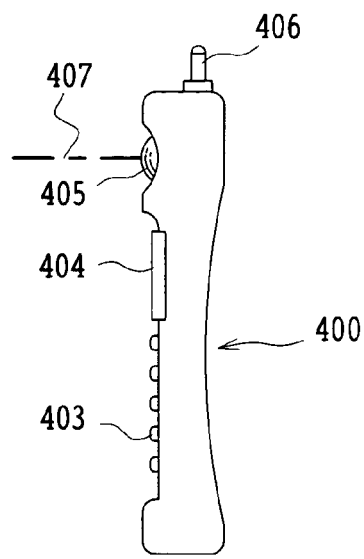
FIG. 26B is a side view in FIG. 26A.
Figure 26C:
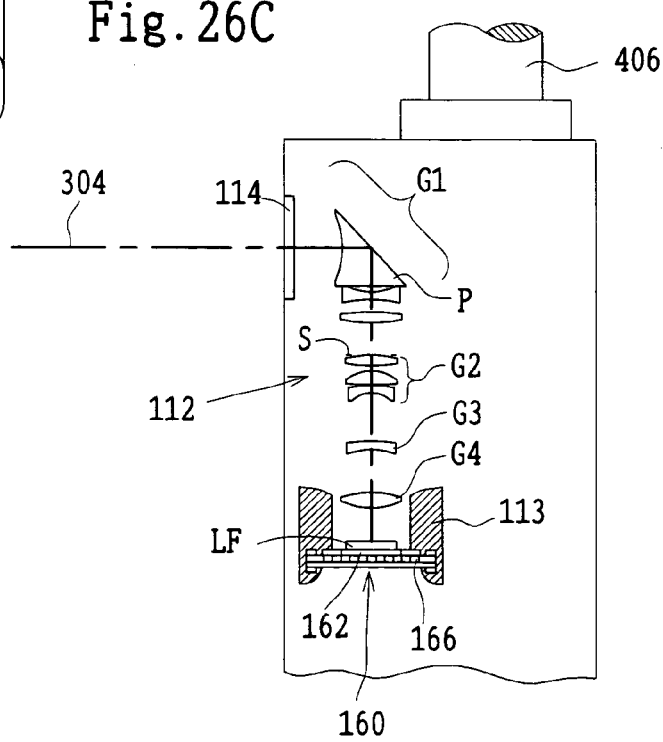
FIG. 26C is a sectional view showing the photographing optical system.

FIGS. 26A–26C show a telephone which is an example of the information processor in which the path-bending zoom optical system of the present invention is housed as the photographing optical system, notably a mobile phone which is handy to carry.

A mobile phone 400, as shown in these figures, includes a microphone section 401 inputting an operator's voice as information; a speaker section 402 outputting the voice of a communication mate; input dials 403 in which an operator inputs information; a monitor 404 displaying information, such as photographing images of the operator himself and the communication mate, and telephone numbers; a photographing optical system 405; an antenna 406 transmitting and receiving electric waves for communication; and a processing means (not shown) processing image information, communication information, and an input signal. Here, the monitor 404 is a liquid crystal display element. In these figures, the arrangement of individual parts is not limited to the above description. The photographing optical system 405 has the objective lens 112 including the path-bending zoom optical system (not shown) of the present invention, located on a photographing optical path 407, and the chip 162 receiving the object image. These are incorporated in the mobile phone 400.

Here, the optical low-pass filter LF is additionally cemented to the chip 162, and these are integrally constructed as the imaging unit 160, which is fitted into the rear end of the lens frame 113 of the objective lens 112 and can be mounted in a single operation. Therefore, the alignment of the objective lens 112 and the chip 162 and the adjustment of face-to-face spacing are not required, and assembly is simplified. At the top (not shown) of the lens frame 113, the cover glass 114 for protecting the objective lens 112 is placed. Also, the driving mechanism of the zoom lens in the lens frame 113 is not shown in the figure.

An object image received by the chip 162 is input into the processing means, not shown, through the terminal 166 and is displayed as the electronic image on either the monitor 404 or the monitor of the communication mate, or both. Also, the processing means includes a signal processing function that when the image is transmitted to the communication mate, the information of the object image received by the chip 162 is converted into a transmittable signal.

What is claimed is:

1. A zoom optical system comprising, in order from an object side:
   a first lens unit with negative refracting power;
   a second lens unit with positive refracting power; and
   another lens unit with negative refracting power,
   wherein when a magnification of the zoom optical system is changed in a range from a wide-angle position to a telephoto position, at least the second lens unit is moved along an optical axis,
   wherein the first lens unit includes a path-bending element for bending an optical path, and
   wherein the zoom optical system satisfies the following condition:

$-5 < f1/\sqrt{(fW \times fT)} < -0.2$ where f1 is a focal length of the first lens unit, fW is a focal length of an entire system under a condition where an infinite object point is in focus at the wide-angle position, and fT is a focal length of the entire system under a condition where the infinite object point is in focus at the telephoto position.

2. A zoom optical system according to claim 1, satisfying the following condition:

$0.2 < M3/M2 < 2.0$ where M2 is a range of movement of the second lens unit and M3 is a range of movement of the another lens unit with negative refracting power.

3. A zoom optical system comprising, in order from an object side:
   a first lens unit with negative refracting power;
   a second lens unit with positive refracting power; and
   a lens unit with negative refracting power,
   wherein when a magnification of the zoom optical system is changed in a range from a wide-angle position to a telephoto position, at least the second lens unit is moved along an optical axis,
   wherein the first lens unit includes a path-bending element for bending an optical path, and
   wherein the first lens unit includes moving lens components and satisfies the following condition:

$-5 < f1/\sqrt{(fW \times fT)} < -0.2$ where f1 is a focal length of the first lens unit, fW is a focal length of an entire system under a condition where an infinite object point is in focus at the wide-angle position, and fT is a focal length of the entire system under a condition where the infinite object point is in focus at the telephoto position, and f1 is defined by:

$f1 = \sqrt{(f1W \times f1T)}$ where f1W is a focal length of the first lens unit at the wide-angle position and f1T is a focal length of the first lens unit at the telephoto position.

4. A zoom optical system comprising, in order from an object side:
   a first lens unit with negative refracting power;
   a second lens unit with positive refracting power; and
   a lens unit with negative refracting power,
   wherein when a magnification of the zoom optical system is changed in a range from a wide-angle position to a telephoto position, at least the second lens unit is moved along an optical axis,
   wherein the first lens unit includes a path-bending element for bending an optical path, and
   wherein a lens unit located at a most image-side position is provided and satisfies the following condition:

$0.3 < f4/\sqrt{(fW \times fT)} < 4$ where f4 is a focal length of the lens unit located at a most image-side position, fW is a focal length of an entire system under a condition where an infinite object point is in focus at the wide-angle position, and fT is a focal length of the entire system under a condition where the infinite object point is in focus at the telephoto position.

5. An information processor comprising:
   a zoom optical system according to any one of claims 1, 3 and 4;
   an electronic image sensor located at a position of an image formed by the zoom optical system;
   a processing device for processing an electronic signal;
   an input section for inputting information;

a display element displaying an output from the processing device; and a recording medium recording the output from the processing device.

6. An information processor according to claim 5, wherein the zoom optical system is housed in a periphery of the display element or of the input section.

7. A telephone comprising:

a zoom optical system, according to any one of claims 1, 3 and 4;

an electronic image sensor located at a position of an image formed by the zoom optical system;

an input section for inputting information;

a processing device for processing an electronic signal; and an antenna for transmitting and receiving the electronic signal.

* * * * *